(12) United States Patent
Berman et al.

(10) Patent No.: US 11,308,462 B2
(45) Date of Patent: Apr. 19, 2022

(54) SECURE ELECTRONIC PAYMENT

(71) Applicant: Clear Token Inc., Denver, CO (US)

(72) Inventors: Lawrence Berman, Delray Beach, FL (US); Stanley J. Wolfson, Denver, CO (US)

(73) Assignee: Clear Token Inc, Denver, CO (US)

( * ) Notice: Subject to any disclaimer, the term of this patent is extended or adjusted under 35 U.S.C. 154(b) by 766 days.

(21) Appl. No.: 15/416,367

(22) Filed: Jan. 26, 2017

(65) Prior Publication Data

US 2017/0140347 A1    May 18, 2017

Related U.S. Application Data

(63) Continuation-in-part of application No. 15/099,508, filed on Apr. 14, 2016, now abandoned, and a
(Continued)

(51) Int. Cl.
*G06Q 20/08*      (2012.01)
*G06Q 20/20*      (2012.01)
(Continued)

(52) U.S. Cl.
CPC ......... *G06Q 20/0855* (2013.01); *G06Q 20/18* (2013.01); *G06Q 20/20* (2013.01);
(Continued)

(58) Field of Classification Search
None
See application file for complete search history.

(56) References Cited

U.S. PATENT DOCUMENTS

D157,930 S     3/1950   Wilken et al.
3,631,538 A    12/1971  Kohn
(Continued)

FOREIGN PATENT DOCUMENTS

WO    WO 01/26048     4/2001
WO    WO 02/073512    9/2002
(Continued)

OTHER PUBLICATIONS

Unpublished—pending Design U.S. Appl. No. 29/492,342, filed May 30, 2014 titled "Parking Meter" of Berman, et al.
(Continued)

*Primary Examiner* — Steven S Kim
*Assistant Examiner* — Jason B Fenstermacher
(74) *Attorney, Agent, or Firm* — Trenner Law Firm, LLC; Mark D. Trenner

(57) ABSTRACT

Secure electronic payment is disclosed as it may be implemented for a point of sale machine such as but not limited to, vending machines/devices, parking devices/facilities, and laundry machines/facilities. An example secure electronic payment system includes a remote payment processor to confirm payment for a transaction at a point of sale device and issue a token to a mobile device for completing the transaction. A wireless interface module at the point of sale device is configured to receive the token from the mobile device for the transaction via a wireless communications protocol. A token processing module at the point of sale device confirms validity of the token. A transaction processing module negotiates the transaction at the point of sale device by actuating the point of sale device.

16 Claims, 32 Drawing Sheets

Related U.S. Application Data continuation-in-part of application No. 15/099,465, filed on Apr. 14, 2016, now abandoned, and a continuation-in-part of application No. 14/709,001, filed on May 11, 2015, now abandoned, said application No. 15/099,465 is a continuation-in-part of application No. 14/709,001, filed on May 11, 2015, now abandoned, said application No. 15/099,508 is a continuation-in-part of application No. 14/709,001.

(60) Provisional application No. 61/992,260, filed on May 13, 2014.

(51) Int. Cl.
   *G06Q 20/32*   (2012.01)
   *G06Q 50/18*   (2012.01)
   *G06Q 20/38*   (2012.01)
   *G06Q 20/18*   (2012.01)
   *G06Q 20/36*   (2012.01)

(52) U.S. Cl.
   CPC ......... *G06Q 20/202* (2013.01); *G06Q 20/325* (2013.01); *G06Q 20/36* (2013.01); *G06Q 20/367* (2013.01); *G06Q 20/3821* (2013.01); *G06Q 50/188* (2013.01)

(56) References Cited

U.S. PATENT DOCUMENTS

| | | |
|---|---|---|
| 3,905,460 A | 9/1975 | Greenwald |
| 4,885,571 A | 12/1989 | Pauley et al. |
| 5,012,224 A | 4/1991 | Drucker |
| D336,860 S | 6/1993 | Clough |
| D342,209 S | 12/1993 | Clough |
| 5,367,289 A | 11/1994 | Baro et al. |
| 5,448,220 A | 9/1995 | Levy |
| 5,524,463 A | 6/1996 | Schenkel et al. |
| 5,550,547 A | 8/1996 | Chan et al. |
| 5,640,002 A | 6/1997 | Ruppert et al. |
| 5,664,113 A | 9/1997 | Worger et al. |
| 5,732,812 A | 3/1998 | Graigner |
| 5,745,049 A | 4/1998 | Akiyama et al. |
| 5,748,085 A | 5/1998 | Davis et al. |
| 5,774,876 A | 6/1998 | Woolley et al. |
| 5,841,350 A | 11/1998 | Appalucci et al. |
| 5,852,411 A | 12/1998 | Jacobs |
| D404,025 S | 1/1999 | Van Horne |
| 5,887,176 A | 3/1999 | Griffith et al. |
| 5,920,287 A | 7/1999 | Belcher et al. |
| 5,936,527 A | 8/1999 | Isaacman et al. |
| 5,977,913 A | 11/1999 | Christ |
| 5,990,791 A | 11/1999 | Andreasen et al. |
| 6,015,091 A | 1/2000 | Rockstein et al. |
| 6,081,205 A | 6/2000 | Williams |
| 6,128,549 A | 10/2000 | Swartz et al. |
| 6,144,848 A | 11/2000 | Walsh et al. |
| 6,150,921 A | 11/2000 | Werb et al. |
| 6,176,425 B1 | 1/2001 | Harrison et al. |
| 6,204,765 B1 | 3/2001 | Brady et al. |
| 6,324,311 B1 | 11/2001 | Gann |
| 6,356,881 B1 * | 3/2002 | Milch ............... G06Q 20/105 235/379 |
| 6,505,774 B1 | 1/2003 | Fulcher |
| 6,584,309 B1 | 6/2003 | Whigham |
| 6,657,535 B1 | 12/2003 | Magbie et al. |
| 6,662,068 B1 | 12/2003 | Ghaffari |
| 6,681,444 B2 | 1/2004 | Breed et al. |
| 6,804,578 B1 | 10/2004 | Ghaffari |
| 7,004,385 B1 | 2/2006 | Douglass |
| 7,082,344 B2 | 7/2006 | Ghaffari |
| 7,085,556 B2 | 8/2006 | Offer |
| 7,127,236 B2 | 10/2006 | Khan et al. |
| 7,207,846 B2 | 4/2007 | Caveney et al. |
| 7,221,900 B2 | 5/2007 | Reade et al. |
| 7,283,044 B2 | 10/2007 | Bandy |
| 7,522,905 B2 | 4/2009 | Hammad et al. |
| 7,576,650 B1 | 8/2009 | Ghaffari |
| 7,684,751 B2 | 3/2010 | Posamentier |
| 7,706,764 B2 | 4/2010 | Reynolds |
| 7,721,958 B2 | 5/2010 | Belfer et al. |
| 7,778,262 B2 | 8/2010 | Beagley et al. |
| 8,013,715 B2 | 9/2011 | Chiu et al. |
| 8,056,184 B2 | 11/2011 | Dimartino et al. |
| 8,065,186 B2 | 11/2011 | Broumand |
| 8,102,243 B2 | 1/2012 | Horne et al. |
| 8,237,549 B2 | 8/2012 | Horne |
| 8,244,169 B1 | 8/2012 | Dimartino et al. |
| 8,396,589 B2 | 3/2013 | Katzenstein Garibaldi et al. |
| 8,489,140 B2 | 7/2013 | Weiner et al. |
| 8,505,826 B2 | 8/2013 | Hackey |
| 8,600,786 B2 | 12/2013 | Stefik |
| 8,856,045 B1 | 10/2014 | Patel et al. |
| 9,134,994 B2 | 9/2015 | Patel et al. |
| 9,256,873 B2 | 2/2016 | Patel et al. |
| 9,262,771 B1 | 2/2016 | Patel |
| D755,183 S | 5/2016 | Patel et al. |
| D763,888 S | 8/2016 | Patel |
| D763,905 S | 8/2016 | Patel |
| D764,532 S | 8/2016 | Patel |
| D773,508 S | 12/2016 | Patel |
| 9,547,859 B2 | 1/2017 | Patel et al. |
| D782,482 S | 3/2017 | Patel et al. |
| D782,483 S | 3/2017 | Patel et al. |
| 9,659,296 B2 | 5/2017 | Patel |
| 2002/0032601 A1 | 3/2002 | Admasu |
| 2002/0038267 A1 | 3/2002 | Can et al. |
| 2002/0062172 A1 | 5/2002 | Bench |
| 2003/0001882 A1 | 1/2003 | Macer et al. |
| 2003/0014315 A1 * | 1/2003 | Jaalinoja ............ G06Q 20/322 705/18 |
| 2003/0200181 A1 * | 10/2003 | van Kessel ......... G06Q 20/382 705/73 |
| 2004/0094619 A1 | 5/2004 | Silberberg |
| 2004/0243526 A1 | 12/2004 | Krygler |
| 2005/0080566 A1 | 4/2005 | Vock et al. |
| 2005/0109838 A1 * | 5/2005 | Linlor ................... G06Q 20/04 235/380 |
| 2005/0109845 A1 | 5/2005 | Ghaffari |
| 2005/0283444 A1 * | 12/2005 | Ekberg ................. G06Q 20/02 705/67 |
| 2006/0015395 A1 | 1/2006 | Wolfson et al. |
| 2006/0132310 A1 | 6/2006 | Cox et al. |
| 2006/0152385 A1 | 7/2006 | Mandy |
| 2007/0063027 A1 * | 3/2007 | Belter ............... G06Q 20/3272 235/381 |
| 2007/0075145 A1 | 4/2007 | Arendonk |
| 2007/0271194 A1 * | 11/2007 | Walker ................. G06Q 50/188 705/80 |
| 2007/0276724 A1 | 11/2007 | Catt |
| 2008/0051934 A1 * | 2/2008 | Tedesco ............... G06Q 10/087 700/236 |
| 2008/0052254 A1 | 2/2008 | Al Amri |
| 2008/0071611 A1 * | 3/2008 | Lovett ................. G07B 15/063 705/13 |
| 2008/0126261 A1 | 3/2008 | Lovett |
| 2008/0068170 A1 | 8/2008 | Ehrman et al. |
| 2009/0041241 A1 | 2/2009 | Dobyns et al. |
| 2009/0076967 A1 | 3/2009 | Fields et al. |
| 2909/0109062 A1 | 4/2009 | An |
| 2009/0121832 A1 | 5/2009 | Mullin et al. |
| 2010/0026522 A1 | 2/2010 | Ward, II |
| 2010/0082491 A1 * | 4/2010 | Rosenblatt ........... G06Q 10/02 705/65 |
| 2010/0225445 A1 | 9/2010 | Huang |
| 2010/0268618 A1 | 10/2010 | McQuilken |
| 2011/0068739 A1 | 3/2011 | Smith |
| 2011/0133613 A1 | 6/2011 | Descamps |
| 2011/0187509 A1 | 8/2011 | Raptis et al. |
| 2011/0230243 A1 | 9/2011 | Hereford |
| 2011/0246328 A1 | 10/2011 | Dunwoody et al. |
| 2012/0016731 A1 * | 1/2012 | Smith ................... G06Q 20/20 705/14.33 |

(56) References Cited

U.S. PATENT DOCUMENTS

| | | |
|---|---|---|
| 2012/0130777 A1 | 5/2012 | Kaufman |
| 2012/0173431 A1 | 7/2012 | Ritchie et al. |
| 2012/0203700 A1 | 8/2012 | Ornce et al. |
| 2012/0235787 A1 | 9/2012 | Brient et al. |
| 2012/0286968 A1 | 11/2012 | Jones |
| 2012/0290376 A1 | 11/2012 | Dryer et al. |
| 2012/0292385 A1 | 11/2012 | MacKay et al. |
| 2013/0018705 A1 | 1/2013 | Heath |
| 2013/0095751 A1 | 4/2013 | Kasslin et al. |
| 2013/0167167 A1 | 6/2013 | Steyer et al. |
| 2013/0238406 A1 | 9/2013 | King |
| 2013/0246171 A1 | 9/2013 | Carapelli |
| 2014/0019367 A1 | 1/2014 | Khan et al. |
| 2014/0058951 A1 | 2/2014 | Kuppuswamy |
| 2014/0229246 A1 | 8/2014 | Ghaffari |
| 2014/0279541 A1 | 9/2014 | Castrechini et al. |
| 2014/0365781 A1 | 12/2014 | Dmitrienko et al. |
| 2015/0169312 A1 | 6/2015 | Patel |
| 2015/0170129 A1 | 6/2015 | Patel et al. |
| 2015/0170130 A1 | 6/2015 | Patel |
| 2015/0170132 A1 | 6/2015 | Patel |
| 2015/0170136 A1 | 6/2015 | Patel |
| 2015/0170145 A1 | 6/2015 | Patel |
| 2015/0178702 A1 | 6/2015 | Patel |
| 2015/0227928 A1 | 8/2015 | Patel et al. |
| 2015/0235202 A1 | 8/2015 | Zabala |
| 2015/0262154 A1 | 9/2015 | Wolfson |
| 2015/0262431 A1 | 9/2015 | Berman |
| 2015/0332259 A1 | 11/2015 | Wolfson |
| 2016/0098711 A1 | 4/2016 | Patel et al. |
| 2016/0217457 A1 | 7/2016 | Berman |
| 2016/0225010 A1 | 8/2016 | Patel |
| 2016/0232499 A1 | 8/2016 | Berman |
| 2016/0335620 A1 | 11/2016 | Lyons et al. |
| 2019/0188667 A1 | 6/2019 | Wolfson |
| 2020/0286077 A1 | 9/2020 | Berman |

FOREIGN PATENT DOCUMENTS

| | | |
|---|---|---|
| WO | WO 2004/029740 | 4/2004 |
| WO | 2008083025 | 7/2008 |

OTHER PUBLICATIONS

Unpublished—pending U.S. Appl. No. 14/048,100, filed Oct. 8, 2013 titled "Interactive Wireless Parking System" of Ghaffari, et al.
FCC Document, FCC 01-290, Oct. 2, 2001.
"The Battle Between HF and UHF RFID" by F. Mohd-Yasin, et al.; published in Microwave Journal, vol. 51, No. 5, May 2008.
"Designing A Crosspatch System to Interface between HF and VHF Radios Using RSSI" by Banerjee, et al.; published in International Journal of Information Systems and Communications, vol. 1, No. 1, Jun. 2011.

* cited by examiner

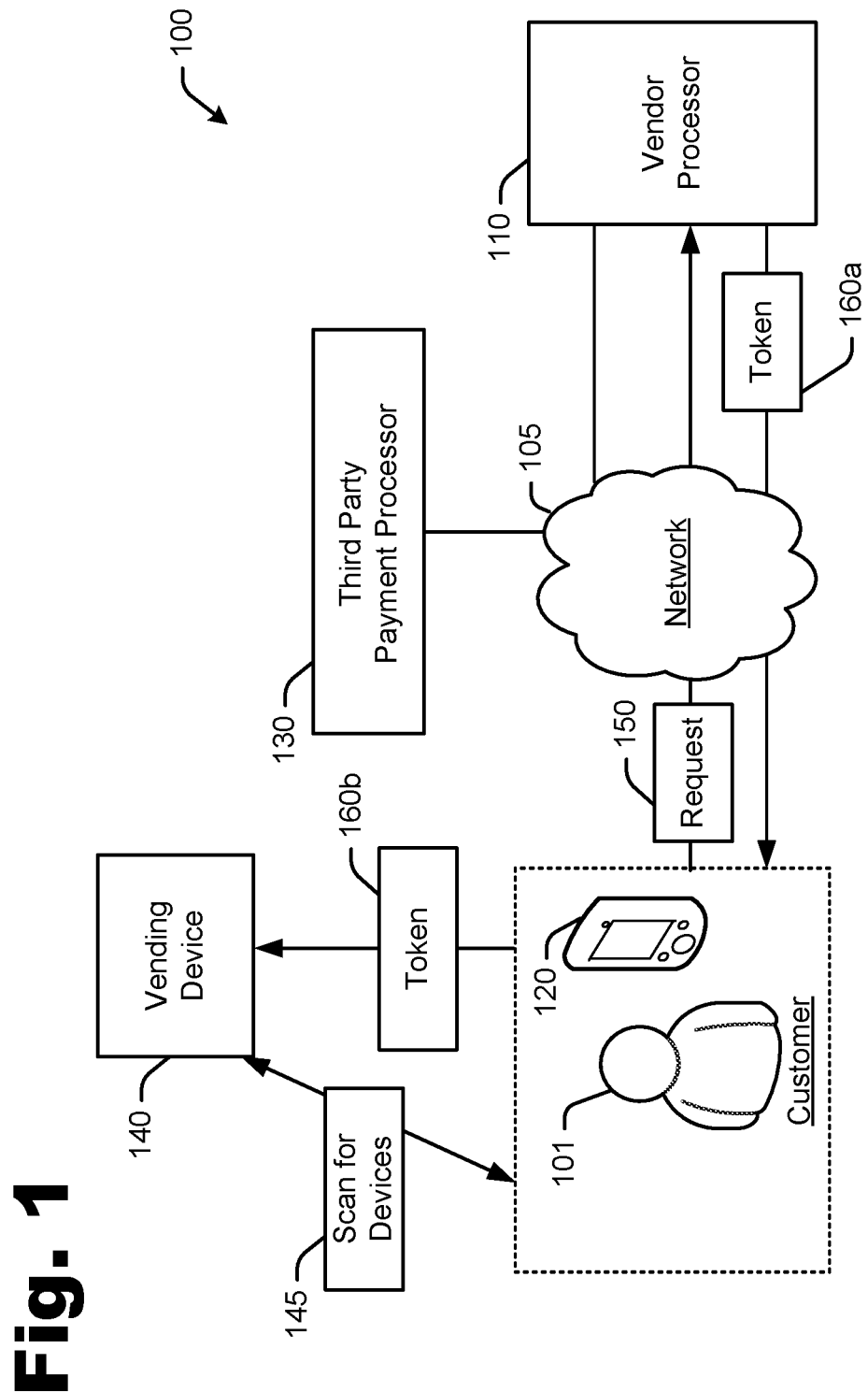

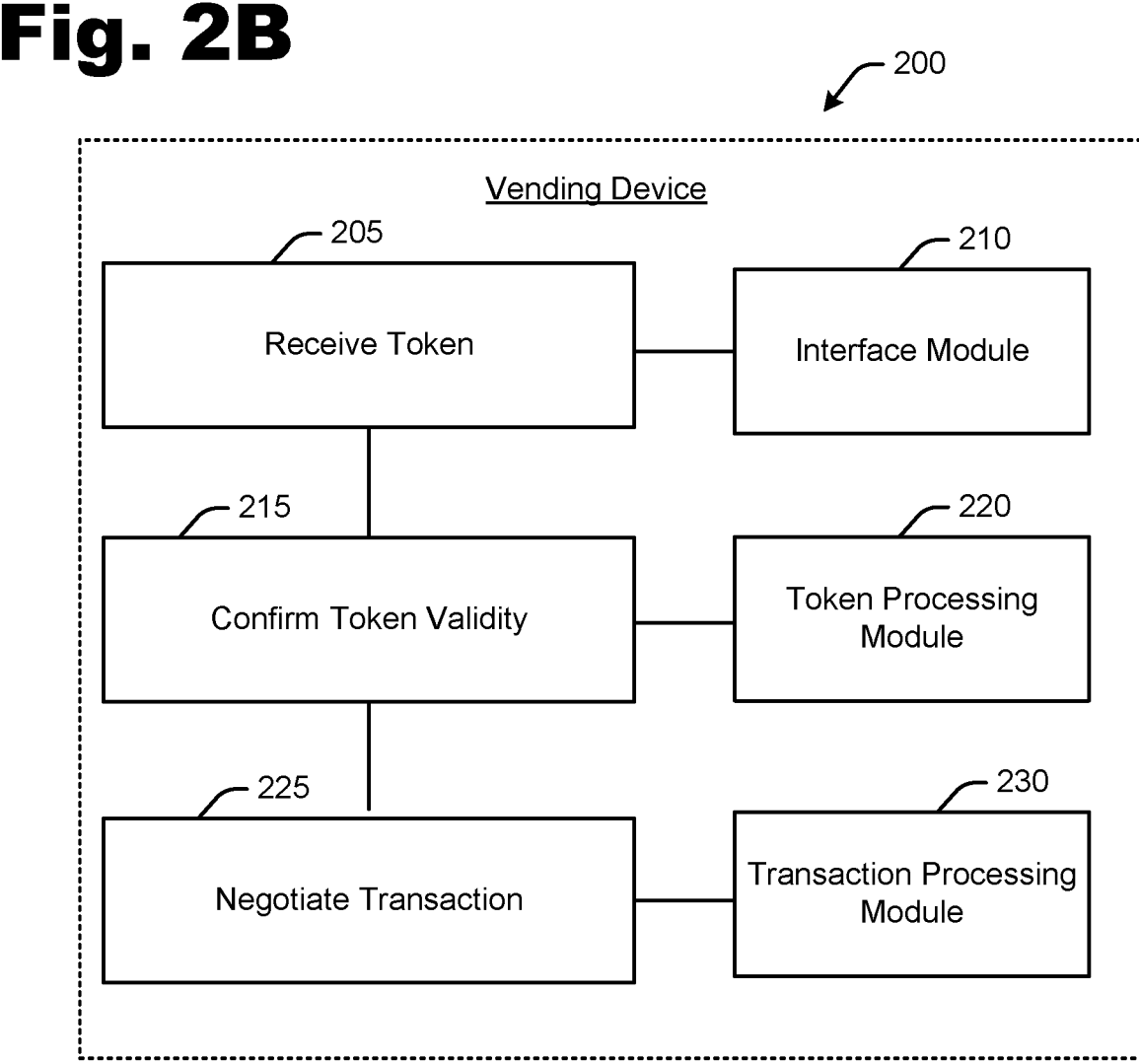

| @ | N | C | P | P | I | I | T | T |
|---|---|---|---|---|---|---|---|---|
| 40 | 07 | 02 | 00 | 34 | 00 | 67 | 47 | 00 |

320

| @ | N | C | H | M | R | I | I | T | T |
|---|---|---|---|---|---|---|---|---|---|
| 40 | 08 | 03 | 01 | 1E | 01 | 00 | 67 | 47 | 00 |
| 40 | 08 | 03 | 02 | 00 | 00 | 00 | 67 | 47 | 00 |

330

| @ | N | C | H | M | S | I | I | T | T |
|---|---|---|---|---|---|---|---|---|---|
| 40 | 09 | 05 | 0C | 2C | 00 | 00 | 67 | 47 | 00 |

340

| @ | N | C | P | P |
|---|---|---|---|---|
| 40 | 03 | 07 | 01 | 00 |

300

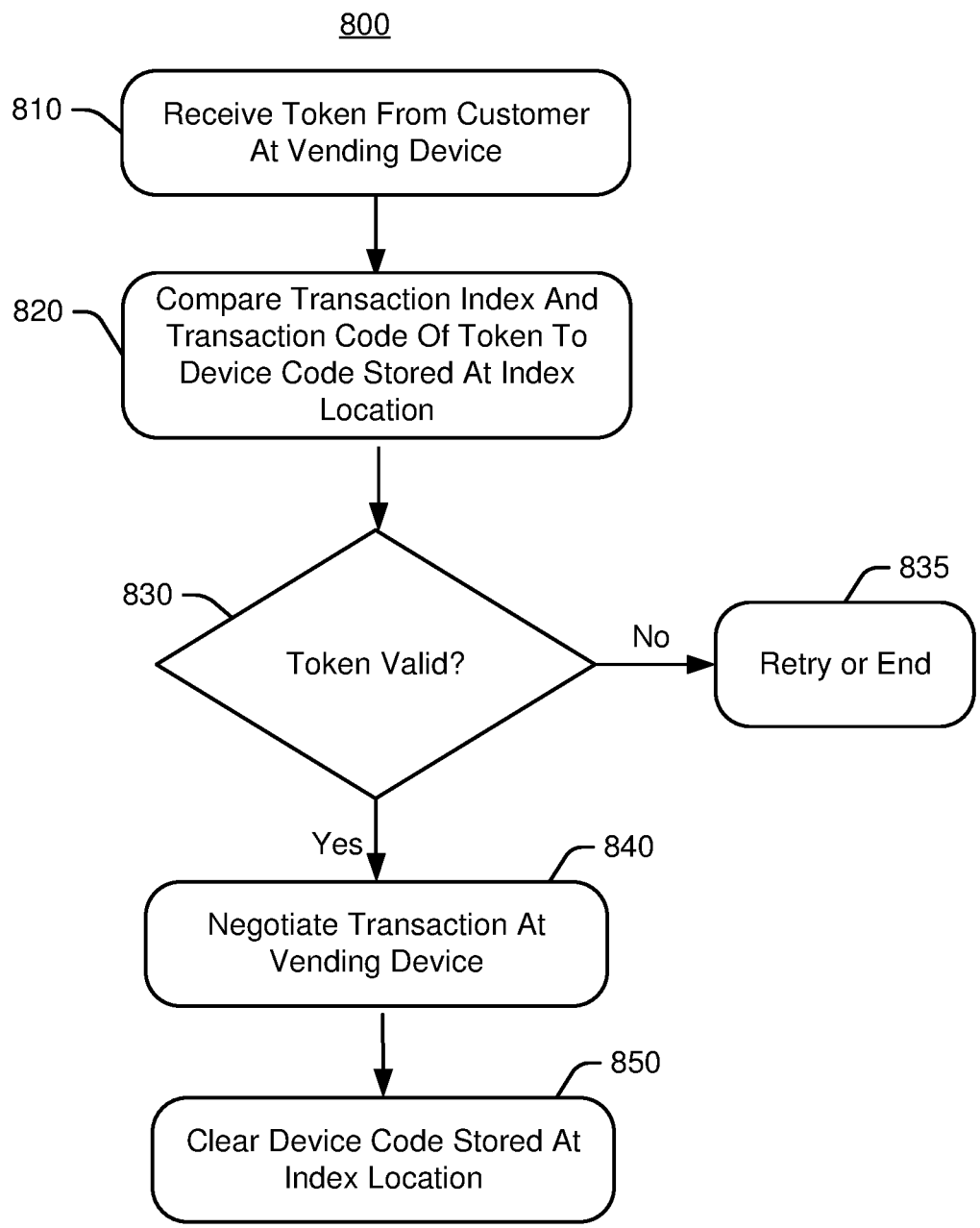

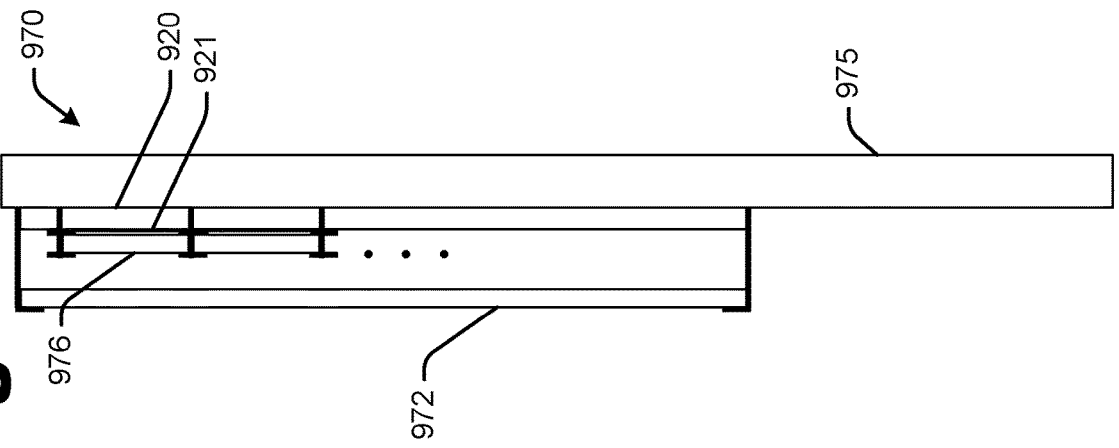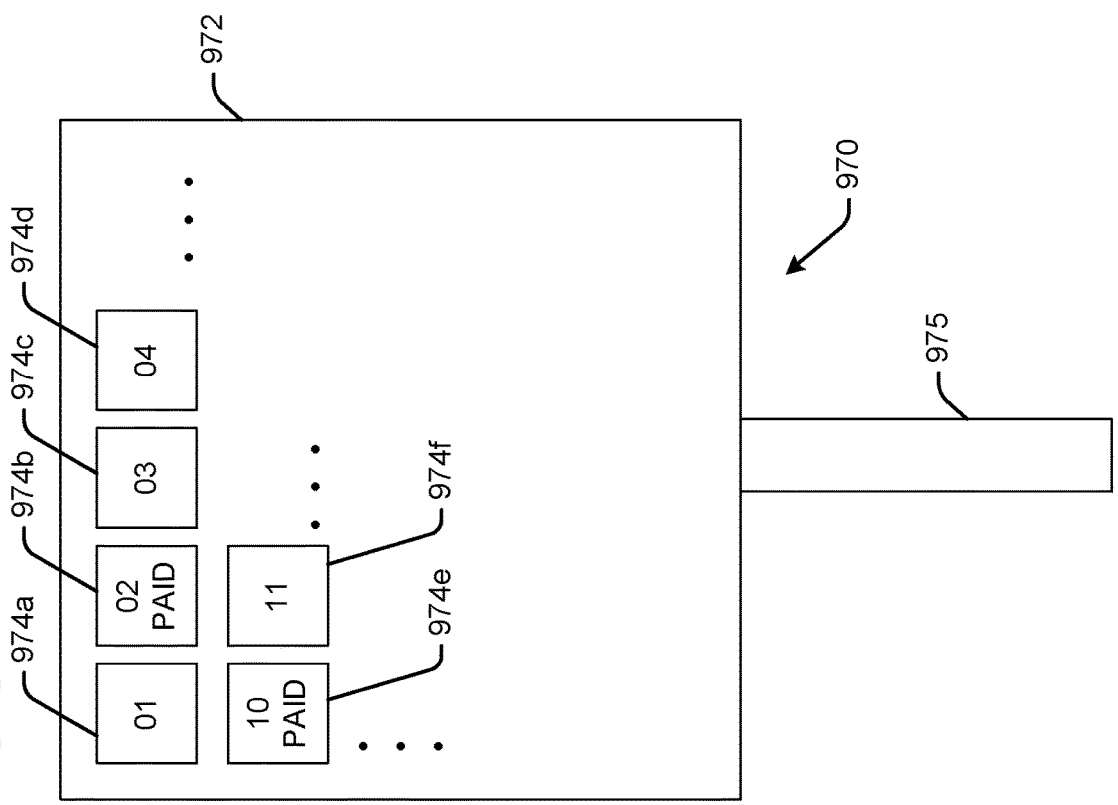

SECURE ELECTRONIC PAYMENT

RELATED APPLICATIONS

This application is a continuation-in-part (CIP) of U.S. patent application Ser. No. 14/709,001 filed May 11, 2015 which claims the priority benefit of U.S. Provisional Patent Application No. 61/992,260 filed on May 13, 2014; and this application is a continuation-in-part (CIP) of U.S. patent application Ser. No. 15/099,465 filed Apr. 14, 2016 which is a continuation-in-part (CIP) of U.S. patent application Ser. No. 14/709,001 filed May 11, 2015 which claims the priority benefit of U.S. Provisional Patent Application No. 61/992,260 filed on May 13, 2014; and this application is a continuation-in-part (CIP) of U.S. patent application Ser. No. 15/099,508 filed Apr. 14, 2016 which is a continuation-in-part (CIP) of U.S. patent application Ser. No. 14/709,001 filed May 11, 2015 which claims the priority benefit of U.S. Provisional Patent Application No. 61/992,260 filed on May 13, 2014; all of these applications hereby incorporated by reference for all that is disclosed as though fully set forth herein.

This Application is also related to U.S. Provisional Patent Application No. 61/951,875 titled "Secure payment system" of Stanley J. Wolfson, filed on Mar. 12, 2014 and corresponding U.S. patent application Ser. No. 14/645,196 filed on Mar. 11, 2015, and U.S. patent application Ser. No. 14/671,456 titled "Parking Meter Payment Device" of Berman, et al. filed on Mar. 27, 2015, each of which is hereby incorporated by reference for all that is disclosed as though fully set forth herein.

BACKGROUND

Increasingly, our global society is moving towards a culture in which transactions, whether social or business in nature, take place electronically via wireless devices including for example, mobile phones, tablets, computers and other electronic devices through connection to the Internet or wireless provider network (e.g., 3G, 4G networks). While these transactions can be easily implemented in an online environment, and even in a physical store environment by having a store clerk available to assist customers and/or reduce the occurrence of fraud (e.g., data processing and so-called "skimming" of credit card information), some purchases may lack such a facilitator, for example at a parking meter or vending machine. These purchases often require the buyer to have dollar bills or change available. Although credit card payment systems may be provided, these may be subject to fraud and identity theft.

BRIEF DESCRIPTION OF THE DRAWINGS

FIG. 1 is a block diagram of an example secure payment system.

FIG. 2B is a high-level diagram of a vending device of the secure payment system.

FIG. 3 illustrates example communication and commands which may be implemented by the secure payment system.

FIG. 8 is a flow chart illustrating example operations of a vending device to implement a secure payment method.

FIGS. 9C-9D show an example parking facility payment device, wherein C) is a front view and D) is a side view.

DETAILED DESCRIPTION

Figure 2A:
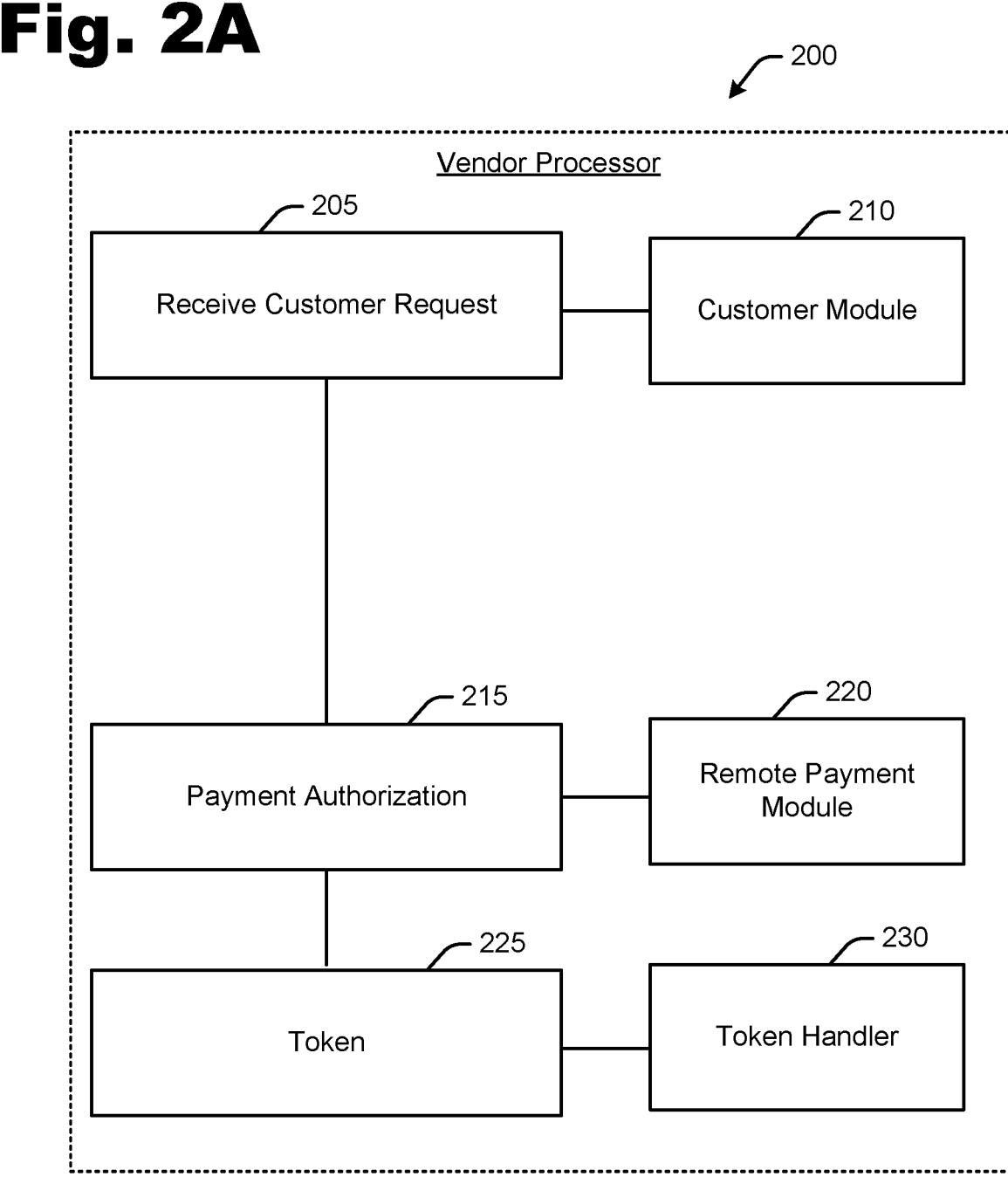
FIG. 2A is a high-level diagram of a vendor processor of the secure payment system.

Secure electronic payment is disclosed. In an example, secure electronic payment may be implemented to pay for products and/or services using an electronic device such as, but not limited to, a mobile phone, without needing to have a physical credit card or traditional cash on hand. In an example, a user (e.g., a customer) may issue a request for a transaction at a vending device (e.g., a parking meter or vending machine). The request is processed to confirm payment, and a token (e.g., a secure digital certificate such as an electronic data file) is issued to the customer.

The customer may then transmit (e.g., wirelessly transmit) the token to the vending device, whereupon the vending device validates the token and negotiates the transaction (e.g., adds time to a parking meter or dispenses products from a vending machine).

An example vending device of the secure payment system includes a wireless certificate reader configured to receive a digital certificate or "token" from a mobile computing device. In use, a mobile computing device (e.g., mobile phone) may include an installed application or "app". When the mobile computing device is activated via the app, it searches for any vending devices in the area which may be operated with the digital payment and vending system. In an example, the app may display a list of such devices (e.g., parking meters in the user's vicinity) which accept payment via the secure payment system. In other examples, the customer may manually identify the vending device (e.g., by entering a device ID in the app).

It is noted that the wireless certificate reader does not need to establish a connection to the payment provider or other entity. As such, the vending device does not need to be configured with an expensive to install and maintain modem or other communications system. The wireless certificate reader can instead be a BLUETOOTH™ or other near-field communication protocol for communicating with the mobile computing device in proximity to the vending device.

In an example, data to validate the token received at the vending device is stored in the local memory of the vending device before a transaction is initiated at the vending device. As such, no communication connection is required between the digital payment and vending system and the third party payment system. This enables use of the digital payment and vending system without having to provide expensive communication connections in each vending device.

The token may be a one-time-use digital certificate. In an example, after the token has been confirmed and the transaction negotiated, the corresponding information stored in the vending device may be "wiped" clean (e.g., the code set to zero or otherwise erased). This helps ensure that the goods and/or services delivered by the vending device have been paid for and that the same digital certificate is not being re-used. In another example, the token may include an expiration, so that a customer cannot purchase tokens in advance to avoid price increases.

It is noted that the secure payment system has a wide variety of applications, such as but not limited to parking meters, point of sale transactions, voucher printers, access control (e.g., to a parking garage), vending machines, access control (e.g., to gated communities), and car washes, to name only a few examples.

By way of further illustration, the secure payment system may also be implemented for, but is not limited to, the service of authorizing use of a product or access to a location, such as with rental cars (or any other rental, such as bikes, boats, etc.), lodging (e.g., hotel rooms), transportation (e.g., bus, taxi, or train), admission to a ball park or amusement park or museum or other attraction, and any other pay-for-use of goods and/or services. For example, the secure payment system may provide a lock combination or other code to the user so that a cable lock or the like may be unlocked to access a bicycle, scooter, or motorcycle. In an example, a combination code can be provided to a lock box which opens to provide the user with a key (e.g., for a car or house). In another example, the lock may automatically actuate to unlock upon receiving payment confirmation.

Still other applications may include, but are not limited to point of sale transactions, vouchers, access control, etc. Still other implementations may also be used to make a donation (e.g., wherein nothing is physically delivered to the end user), such as to take the place of a donation box.

Of course, the secure payment system may be implemented with any vending device. The examples described herein are merely illustrative, and other applications will also become apparent to those having ordinary skill in the art after becoming familiar with the teachings herein.

In an example, the secure payment system may operate with a third-party payment processor to handle payments for the user without the user having to provide any credit card or other form of payment (or personal or other information) to the secure payment system. For example, the user may have already provided payment information (e.g., credit card or bank account information) to the third-party payment processor, who is a trusted payment processor such as the user's bank, credit card issuer, direct carrier billing (e.g., billing to a cell phone account), digital currency, or other payment service, and therefore the user does not have to provide any payment information to the vending device (or anyone associated with the vending device). As such, the secure payment system reduces the occurrence for fraud, while providing the user with convenience of a so-called "cashless" transaction. Likewise, the owner of the vending device receives payment from a trusted third-party payment processor without risk that the payment form (e.g., credit card) is stolen or unauthorized.

It is noted that the systems and methods described herein are not limited to any particular type of vending device, mobile device, and/or payment processor. The digital payment and vending system may be used in an attended and/or unattended environment, and may be used to deliver any type and/or quantity of goods and/or services, whether or not those are for actual physical goods.

Before continuing, it is noted that as used herein, the terms "includes" and "including" mean, but is not limited to, "includes" or "including" and "includes at least" or "including at least." The term "based on" means "based on" and "based at least in part on."

The term "vendor" is used herein to refer to a provider of goods and/or services. The vendor may be the owner or operator or otherwise associated with a vending device (or devices). In an example, the vendor is the owner of a business or the business itself which operates the vending device. The vendor may also be an entity, such as a government entity. The vendor may also be a combination of individuals and/or entities. For example, the vendor may be the city government and/or a contractor hired to operate the vending device(s) such as a parking meter (or meters). In another example, the term vendor may refer to one or more of a single contractor which operates parking meters for multiple different cities (and their associated city governments). It is noted that the term "vending device" is used to designate a single device or may include multiple devices operatively associated with each other to carry out the operations disclosed herein.

The term "token" as it refers to a type of "digital certificate" (or "electronic information" or "data packet") is intended to broadly designate data or information provided by the system to a mobile device, which may or may not be further processed by the mobile device, and which is capable of being processed in conjunction with data or information provided at the vending device to verify or otherwise confirm payment.

The term "point of sale device" refers to any device (e.g., vending device, parking meter or other parking payment device, laundry machine, to name only a few examples) which accepts or is otherwise operable and/or actuated by payment, wherein the payment is by the secure electronic payment system and methods disclosed herein.

Vending Devices.

FIG. 1 is a block diagram of an example secure payment system 100. System 100 may be implemented with any of a wide variety of computing devices. Each of the computing devices may include memory, storage, and a degree of data processing capability at least sufficient to manage a communications connection either directly with one another or indirectly (e.g., via a network). At least one of the computing devices is also configured with sufficient processing capability to execute program code and/or other logic described herein.

In an example, the secure payment system 100 may be implemented by a vendor processor 110 providing a digital payment and vending service accessed by a user 101 via a client device 120 (referred to herein collectively as the "customer"). The client device 120 may be any suitable computer or computing device (e.g., laptop computer or other mobile device such as a phone or tablet) capable of accessing a third party payment processor 130.

Of course, the vendor processor 110 and client device 120 are not limited to any particular type of devices (e.g., watches and other wearable technology), and may also include other devices that are traditionally not considered to be a part of the mobile environment (e.g., desktop computing devices or terminals).

In an example, the secure payment system 100 may be implemented with one or more communication network 105, such as a local area network (LAN) and/or wide area network (WAN) and/or other communications platform such as a mobile communications network. In an example, the network includes the Internet and/or other mobile communications network (e.g., a 3G or 4G mobile device network).

In an example, the secure payment system 100 provides a way for the user 101 to pay for a product and/or service offered by a vendor at a vending device 140, using the user's own mobile device 120, via the digital payment service implemented by the vendor processor 110, but without having to provide the vending device 140 (or any other party such as the vendor or vendor processor) with access to payment information maintained by third party payment processor(s) 130 (e.g., a bank or credit card company).

In use, a mobile device 120 (e.g., a mobile phone) may include an installed application or "app". When the mobile device 120 is activated via the app, the mobile device 120 searches 145 for any vending devices 140 in the area which are configured for operation in the environment of the secure payment system 100. In an example, the app may display a list of such device(s) 140 (e.g., parking meters in the user's vicinity) on the mobile device 120 which accept payment via the payment technique described herein.

In an example, the user may issue a request 150 to the vendor processor 110. The request 150 may include the vending device ID (e.g., a number shown on the vending machine) or other identifying information. The request 150 may also include other information about the intended purchase (e.g., parking time, product ID) and a payment authorization. For example, the amount of payment may be displayed for the user by the app for the user to accept or approve the item and amount. The user may then select a third party payment processor 130 (e.g., a bank, credit card, or mobile phone service carrier) from the app. This information may be transmitted in the request 150 to the vendor processor.

The vendor processor 110 then confirms payment via the third party payment processor 130. For example, the vendor processor 110 may issue a payment authorization to a third-party payment processor 130, and receive payment approval from the third-party payment processor. After confirming payment, the vendor processor 110 may generate a token 160a and issue the token 160 to the user's mobile device 120.

After receiving the token 160a, the user may then complete the transaction at the vending device 140. In an example, the vending device 140 includes a wireless certificate reader configured to receive a token 160b from the mobile device 120. The token 160a and 160b may be the same token provided by the vendor processor 110, or token 160b may undergo at least some degree of processing at the mobile device 120 before being issued to the vending device 140.

The vending device 140 may then process the token 160b to confirm payment by the user 101. If payment is confirmed, then the vending device 140 may negotiate the transaction (e.g., validate parking or dispense an item from the vending device 140).

As such, the system 100 provides a way for the user 101 to pay for a product or service (e.g., parking) offered by a vending device 140, using the user's own mobile device 120, but without having to provide the vendor with access to payment details maintained by third party payment processor(s) 150 (e.g., a bank or credit card company).

In an example, various operations of the secure payment system 100 may be implemented at least in part by program code and/or logic circuitry. Program code and/or logic used to implement features of the system can be better understood with reference to the following discussion and corresponding figures of various example functions. To the extent program code is implemented, machine-readable instructions may be stored on a non-transient computer readable medium and are executable by one or more processor to perform the operations described herein. Examples of program code may include an end-user mobile device application (or "app"), payment processing application(s), host application (e.g., for generating the token in response to receiving confirmation of payment), and/or a vendor application (e.g., for validating the token received from the end-user device). Of course, the operations described herein are not limited to any specific implementation with any particular type of program code or logic.

It is noted, however, that the secure payment system 100 is not strictly program code in the traditional sense. That is, the secure payment system 100 may be implemented at least in part in program code (e.g., for generating the token and for various of the transmission protocols). It is to be understood that the secure payment system 100 is also implemented by device hardware which goes beyond a mere computing device provided to execute the program code. Example device hardware may include a wireless certificate reader with a communications interface (e.g., to the mobile device). Example device hardware may also include a vending device with associated electronic actuators, locks, motors, conveyors, timers, and/or other electronics operable to deliver goods and/or services in response to input from the wireless certificate reader and/or other processing device confirming payment for the goods and/or services.

These and other aspects of the secure payment system 100 will be described in more detail below such that the device hardware can be readily implemented by one having ordinary skill in the art after becoming familiar with the teachings herein.

FIG. 2A is a high-level diagram of a vendor processor 200 (e.g., vendor processor 110 in FIG. 1) of the secure payment system. The vendor processor 200 may receive a request 205 for a transaction (e.g., including a payment amount) at a vending device via a customer module 210. In an example, the request 205 may include information about the vending device (e.g., identifying information for the vending device). The vendor processor 200 issues a payment authorization 215 via a remote payment module 220 to a third-party payment processor. It is noted that the vendor processor does not actually receive any payment or other personal or confidential payment information from the customer. This information remains confidential as between the customer and the third party payment processor (e.g., the customer's bank or credit card processor). The vendor processor 200 receives payment approval from the third-party payment processor. The vendor processor 200 includes a token handler 230 to generate a token 225 and issues the token 225 to the customer so that the customer can complete the transaction at the vending device.

FIG. 2B is a high-level diagram of a vending device 300 (e.g., vending device 140 in FIG. 1) of the secure payment system. The vending device 300 receives a token 305 from the customer (e.g., the token 225 issued to the customer by the vendor processor 200 in FIG. 2A) via an interface module 310. In an example, vending device 300 may receive the token 305 from the customer's mobile device via a BLUETOOTH™ or other near-field communication protocol. A token processing module 320 at the vending device 300 compares data value(s) of the token 305 to data value(s) stored at the vending device 300. For example, the vending device may translate the hex value to determine the transaction code and the transaction index, and then compare these to the corresponding device code stored at the associated index location at the vending device.

The vending device 300 confirms that the token is valid at 315. If the token is valid, a transaction processing module 330 at the vending device 300 may negotiate the transaction 325. In an example where the vending device is a parking meter, the transaction processing module 330 may set (or add) a time duration for the customer to park in a designated parking space. In an example where the vending device is a vending machine, the transaction processing module 330 may operate the mechanics to dispense the purchased product. Other examples are also contemplated, e.g., wherein the vending device is a point-of-sale device, point-of-entry, or other type of device.

It is noted that the term "module" as used herein means electronic devices (e.g., logic circuitry) and/or machine readable instructions (e.g., firmware) specifically configured to carry out the operations described herein.

FIG. 3 illustrates example communication and commands 300 which may be implemented by the secure payment system. In an example, the commands and data are in arrays of bytes, with values from 0x00 to 0xFF. The number of bytes sent or received through the FIFO handle is 20 or less at a time. All commands to the CTD begin with a 0x40 (@). The next byte in the array is the number of remaining bytes in the command. In an example, the general format of a command is @ N C P P I I T T, where:
@=0x40
N=Number of bytes to follow
C=Command code (1 byte)
P=Parameters for the command (number of bytes varies with each command)
I=Index of the validating token (2 bytes, most significant first)
T=validating token (2 bytes, most significant first)

It is noted that the value T having 2 bytes can account for about 65,000 unique codes. Of course, other byte values may also be used. For example, a 3 byte code allows for 65K times 255, or about 16 million unique codes. A 4 byte code allows for about 4 billion unique codes.

In an example, the secure payment system uses a custom serial data service for commands. The custom serial data service is represented by a UUID of 0x2456e1b926e28f83e744f34f01e9d701. When the handle for that UUID is found, a "characteristic discover" is performed. This returns two more UUIDs and handles, for example:
0x2456e1b926e28f83e744f34f01e9d703 (serial data FIFO characteristic);
and
0x2456e1b926e28f83e744f34f01e9d704 (serial data Credits characteristic).

In an example, the hardware may support flow control which is related to the credits characteristic. The next step is to run a "descriptor discover" on the FIFO characteristic. This returns another handle and a short 0x2902 UUID, which is a Client Characteristic Configuration. A 0x01 (or 0x0100) is written to this handle. This sets up "notification" on the FIFO characteristic. Also, this is the final step in setting up a connection with the secure payment system. This "wakes up" the hardware for the secure payment system and the antenna symbol appears on the LCD. Another example is to set this up for "indication".

Commands and data can now be exchanged with the secure payment system (covered in more detail in the next section). Commands are sent to the secure payment system by writing up to 20 bytes to the FIFO characteristic handle. Data is received back through the same handle with notification.

After communication, the connection is disconnected (e.g., an antenna symbol disappears from the LCD), and the secure payment system finishes carrying out any tasks, then goes back to sleep. This minimizes connection time to the CTD device to conserve battery power.

To make the process even more secure, the code can be sent from the user's mobile device as a two part message, wherein part one is a gatekeeper command or message including a unique code and informing the vending device that part two is following, and then another unique code is sent as part two as an activating command or message. This technique implements two codes for each transaction.

In this example, all replies from the CTD begin with a 0x52. The next byte in the array is the remaining number of bytes in the reply. In an example, the general format of a reply is: R N S, where:
R=0x52
N=number of bytes to follow
S=status (0x01 if command was successful or 0x00 if there was an error)

Validating tokens may also be implemented with the commands. For example, there may be 65536 index positions (0-65535), with each index containing a token with a value from 1-65535. Once a token is used, it is zeroed to prevent re-use and thus reduce fraud.

If an incorrect index/token combination is received, the device responds with a status of 0x00, and not respond to further commands until some time has passed.

An example Query Command (not shown) verifies communication. It returns a Status of 0x01. Command: @ N C, where:
- @=0x40
- N=0x01, number of bytes to follow
- C=0x01
- Reply: R N S R=0x52
- N=0x01, number of bytes to follow
- S=0x01

In the drawings, the following abbreviations are used:
- @=0x40—Start of the command
- N=Number of bytes to follow
- C=Command Code
- P=Time (used in Closure & Backlight)
- I=Index Value
- T=Token Value
- H=Hours
- M=Minutes
- S=Seconds
- R=Reset (00=No Reset—01=Reset)

Command 310 is an example Contact Closure Command. This command closes the relay contact for the specified length of time. The length of time the contact remain closed is the number of 3.90625 millisecond units (1/256 of a second) specified with 2 bytes. For example, to close the contact for 1 second, a value of 0x0100 is used; to close the contact for a half second, a value of 0x0080 is used. A value of less than 0x0034 (200 mS) should not be used for this example. @N C P P I I T T, where:
- @=0x40
- N=0x07, number of bytes to follow
- C=0x02
- P=length of time for contact closure, MSB first, range 0x0034-0xFFFF I=index of validating token, MSB first
- T=validating token, MSB first
- Reply: R N S R=0x52, where:
- N=0x01, number of bytes to follow
- S=0x01 if command and token were successful, 0x00 if index/token was not valid or some other error.

Command 320 is an example Add Time Command. The first command (illustrated by row 1) puts a time of 1:30 on a parking meter and then resets to 0. The second command (illustrated by row 2) adds 2:00 without a reset.

The Add Time Command adds time to a countdown timer used in such applications as a parking meter. There are three parameters. The first two parameters are hour and minutes. The third parameter is a reset flag. If the reset flag is 0x01, any time already existing on the meter will be cleared. If the reset flag 0x00, the additional time may be added to the existing time and a new total determined. This can be used, for example, if the same customer is identified. @N C H M R I I T T, where:
- @=0x40
- N=0x08, number of bytes to follow
- C=0x03
- H=hours
- M=minutes
- R=reset flag: 0x01 resets any existing time, 0x00 adds to any existing time
- I=index of validating token, MSB first
- T=validating token, MSB first
- Reply: R N S R=0x52
- N=0x01
- S=0x01 if command and token were successful, 0x00 if index/token was not valid or some other error.

An example Time Status Command (not shown) returns the status of whether the countdown timer is zero. Can be used for enforcement. @N C where:
- @=0x40
- N=0x01, number of bytes to follow
- C=0x04
- Reply: R N S R=0x52
- N=0x01
- S=0x01 if time still remains on countdown timer. 0x00 if countdown timer has reached zero.

Command 330 is an example Set Time Command. This command sets the time to 12:44:00 (0C 2C 00). This command sets the current time of day, which is displayed in the upper right of the LCD display. @N C H M S I I T T, where:
- @=0x40
- N=0x08, number of bytes to follow
- C=0x05
- H=hours (0-23)
- M=minutes (0-59) S=seconds (0-59)
- I=index of validating token, MSB first
- T=validating token, MSB first
- Reply: R N S R=0x52
- N=0x01
- S=0x01 if command and token were successful, 0x00 if index/token was not valid or some other error.

An example Set Bluetooth Name Command (not shown) sets the Bluetooth name that is advertised by this device. @N C A A A A . . . I I T T, where:
- @=0x40
- N=number of bytes to follow
- C=0x06
- A=ASCII characters (8-bit) (up to 13)
- I=index of validating token, MSB first
- T=validating token, MSB first
- Reply: R N S R=0x52
- N=0x01
- S=0x01 if command and token were successful, 0x00 if index/token was not valid or some other error.

Command 340 is an LCD Backlight Command. This command sets the backlight on the parking meter for 1 second (e.g., so that the user can see the parking meter display).

The LCD Backlight Command turns on the LCD backlight for the specified length of time. The length of time the backlight remains on is the number of 3.90625 millisecond units (1/256 of a second) specified with 2 bytes. For example, to turn on the backlight for 1 second, a value of 0x0100 is used; to turn on the backlight for 30 seconds, a value of 0x1E00 is used. No validating token is used with this command (should be reassessed at a later time). @N C P P, where:
- @=0x40
- N=0x03, number of bytes to follow
- C=0x07
- P=length of time for backlight to be on, MSB first, range 0x0000-0xFFFF
- Reply: R N S R=0x52
- N=0x01, number of bytes to follow
- S=0x01 if command was successful, 0x00 if some other error.

Figure 4:
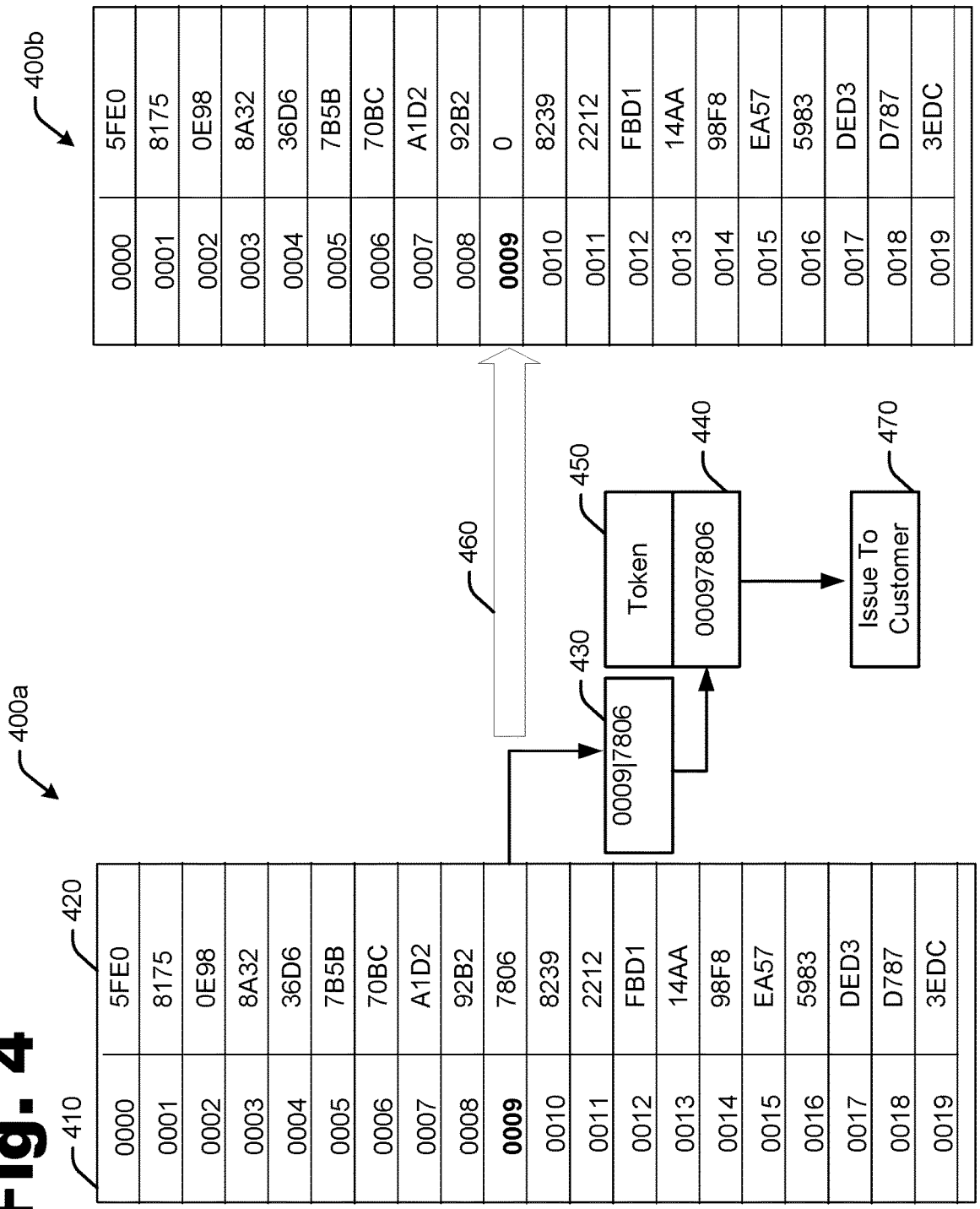
FIG. 4 illustrates an example coding scheme to build a token at a vendor processor.
Figure 5:
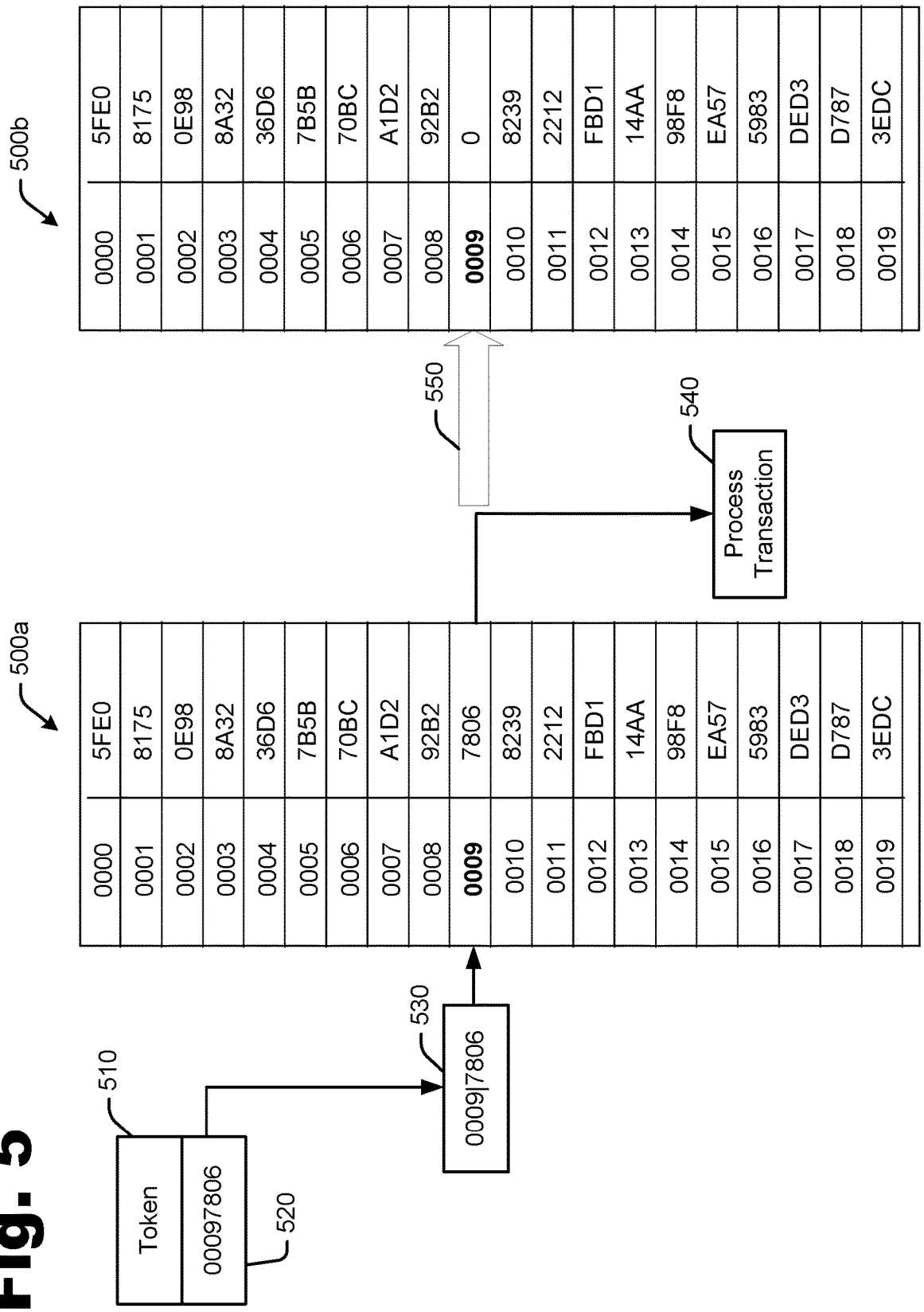
FIG. 5 illustrates an example coding scheme to validate a token and process a transaction at a vending device.

FIG. 4 illustrates an example coding scheme to build a token at a vendor processor. FIG. 5 illustrates an example coding scheme to validate the token illustrated in FIG. 4, and process a transaction at a vending device. The tables 400a-b in FIG. 4 and tables 500a-b in FIG. 5 illustrate a code sample (the first 20 entries of 65,536 entries are shown). The first column represents an index (1 through the number of entries), and the second column represents the corresponding code for the index entry. The codes shown in FIG. 4 may be stored at the vendor processor (e.g., vendor processor 110 shown in FIG. 1) and used to generate the token. These same codes (shown in FIG. 5) may also be written to the vending device (e.g., vending device 140 in FIG. 1) by "injecting" the codes in hardware stored in or associated with the vending device. Each vending device includes its own set of unique codes in an indexed array, stored in memory internally at the vending device.

During setup, the vending device may be read (e.g., for device ID or location number, and a corresponding code). The codes may be compared to a database record stored by the vendor processor. If there is a match, then the vending device has been properly set up, and is ready for use by the customer.

During use, the user may open a phone app and select the location or other ID of the vending device. The location or other ID of the vending device may be transmitted by nearby mobile devices (e.g., using Bluetooth or other communications protocol), or the user may manually enter the location or other ID. A request is generated on the user's mobile device, including the location and/or other information (e.g., type of device such as a parking meter, vending machine, access gate, etc.). Additional information may also be included in the request, e.g., based on location type such as time for a parking meter, locker number for a locker, bill amount for bill changing. The user may also select a payment processor (e.g., a bank, credit card processor, PayPal®, etc.) to be included in the request. The user may be prompted to use the last payment processor used or enter a new payment processor.

The request is sent to the vendor processor to authorize payment. The payment processor may charge the user's account and return "Approved" or "Declined" to the vendor processor. The digital payment service may notify the user (e.g., if payment was declined). But the vendor processor never receives personal or financial information or credit card information of the user.

If the payment is approved, then the vendor processor may build a token for the user to deliver to the vending device. In an example, the token may include a location code, duration or activation code, security code (FIG. 4), and optionally an advertisement or other information for the user to view. For example, the vendor processor may select transaction index (e.g., index location 0009) from the index column 410 and read a corresponding transaction code (e.g., hex 7806 representing decimal 30726) from the code column 420, as illustrated by the numbers 430 in FIG. 4. It is noted that any suitable system (e.g., alpha-numeric) may be used, and is not limited to a numbering system.

In this example, the numbers are in hexadecimal and added (e.g., as packet 440) to the token 450. The table 400a may be updated as illustrated by arrow 460 and shown as updated table 400b, wherein the code at index location 0009 is set to "0". The token 450 may then be issued to the customer as illustrated by block 460.

The user may then relay the token 510 including the hexadecimal 520 to the vending device, as illustrated in FIG. 5. The vending device receives the token, and validates the transaction code in the token (FIG. 5), for example by reading the token packet 520 and comparing the index and hex code 530 with the corresponding index location 0009 of the device index. If the device code at index location 0009 in table 500a matches the transaction code in the token 510, the vending device may negotiate or process the transaction 540 by executing a device command (e.g., activate a parking meter, activate an access device, vend a product, change a bill, etc.).

The vending device may also update/modify the table 500a stored at the vending device, as illustrated by arrow 550, to indicate that the code has been used (e.g., by setting the code in index 9 to all 0's) as shown by updated table 500b in FIG. 5. As such, the index location 9 cannot be re-used, thereby preventing fraudulent use.

In this example, a small 128K file contains 65,536 unique codes. For a parking meter application being used an average of 5 times every day, the original codes are predicted to last about 39 years. For an arcade game being use 20 times a day, the original codes are predicted to last about 9½ years. For a busy access control being accessed 100 times a day, the original codes are predicted to last about 2 years. In the event that the codes need to be changed or updated, a secure update procedure may be implemented to refresh the codes in the field.

It should be understood that the systems and techniques described above may be modified within the scope of the disclosure herein, and are not limited to any particular implementation. For example, the example code and indexing illustrated in the figures is illustrative and not limiting.

Figure 6:
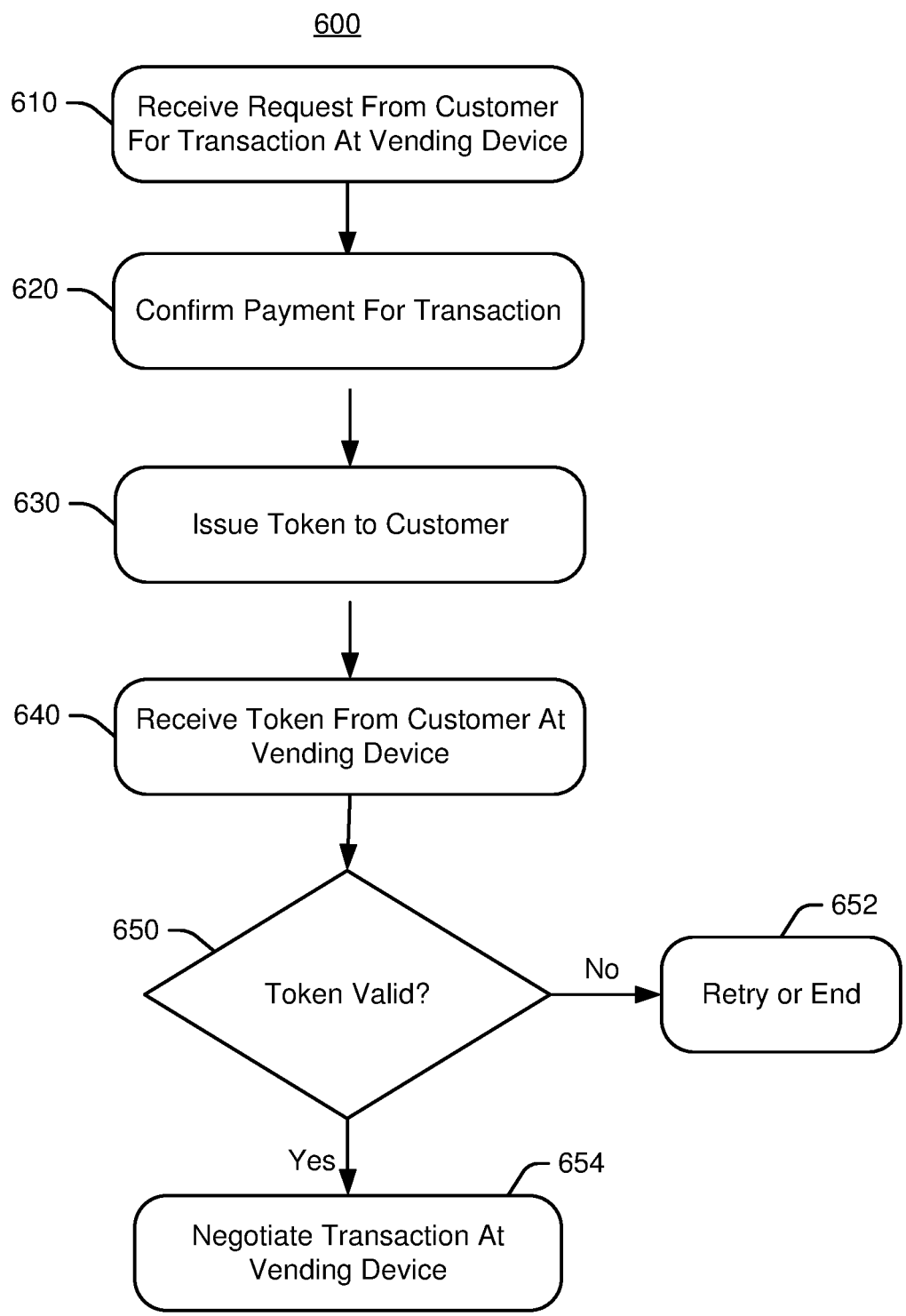
FIG. 6 is a flow chart illustrating example operations which may implement a secure payment method.

FIG. 6 is a flow chart illustrating example operations 600 which may implement a digital payment method. In example operation 610, a request for a transaction at a vending device may be received from a customer by a vendor processor. The vendor processor confirms payment for the transaction in operation 620, and then issues a token to the customer in operation 630. In an example, the token has a transaction index and a corresponding transaction code.

In operation 640, the token is received from the customer at a vending device. For example, the token may be received from the customer's mobile device via a BLUETOOTH™ or other near-field communication protocol with the vending device. In operation 650, the vending device confirms validity of the token, e.g., based on the transaction index and the transaction code. If the token is not valid, operations at the vending device may end with operation 652. In another example, the vending device may issue feedback to the user (e.g., to retry by sending a different token). If the token is valid, the vending device may negotiate the transaction at operation 654. In an example where the vending device is a parking meter, the vending device may set (or add) a time duration for the customer to park in a designated parking space. In an example where the vending device is a vending machine, the vending device may dispense the purchased product. Other examples are also contemplated wherein the vending device is a point-of-sale device, point-of-entry, or other type of device.

Figure 7:
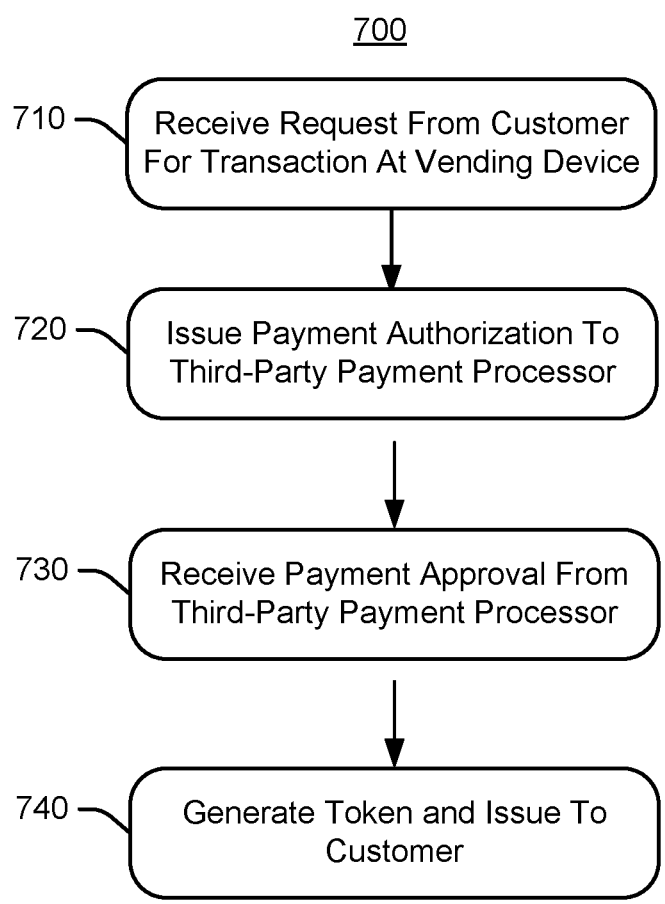
FIG. 7 is a flow chart illustrating example operations of a vendor processor to implement a secure payment method.

FIG. 7 is a flow chart illustrating example operations 700 of a vendor processor to implement a digital payment method. In operation 710, the vendor processor may receive a request for a transaction at a vending device from a customer. In an example, the request may include information about the vending device (e.g., identifying information for the vending device). In operation 720, the vendor processor issues a payment authorization to a third-party payment processor. It is noted that the vendor processor does not actually receive any payment or other personal or confidential payment information from the customer. This information remains confidential as between the customer and the third party payment processor (e.g., the customer's bank or credit card processor). In operation 730, the vendor processor receives payment approval from the third-party payment processor.

In operation 740, the vendor processor generates a token and issues the token to the customer so that the customer can complete the transaction at the vending device. In an example, the token includes a hex value representing the transaction code and the transaction index.

FIG. 8 is a flow chart illustrating example operations 800 of a vending device to implement a digital payment method. In operation 810, the vending device receives a token from the customer (e.g., the token issued to the customer by the vendor processor in operation 740). The vending device may receive the token from the customer's mobile device via a BLUETOOTH™ or other near-field communication protocol. In an example, the token includes a hex value representing the transaction code and the transaction index.

In operation 820, the vending device compares the transaction index and transaction code of the token to a device code stored at corresponding index location at the vending device. For example, the vending device may translate the hex value to determine the transaction code and the transaction index, and then compare these to the corresponding device code stored at the associated index location at the vending device.

In operation 830, the vending device determines whether the token is valid. If the token is not valid, operations at the vending device may end with operation 835. In another example, the vending device may issue feedback to the user (e.g., to retry by sending a different token).

If the token is valid, the vending device may negotiate the transaction at operation 840. In an example where the vending device is a parking meter, the vending device may set (or add) a time duration for the customer to park in a designated parking space. In an example where the vending device is a vending machine, the vending device may dispense the purchased product. Other examples are also contemplated wherein the vending device is a point-of-sale device, point-of-entry, or other type of device.

In operation 850, the vending device clears the device code stored at the index location so that the token cannot be reused.

Example operations shown in FIGS. 6-8 are illustrative and not intended to be limiting. The ordering of operations is not limited to the ordering shown in the drawings. Still other operations are also contemplated, as will become readily apparent to those having ordinary skill in the art after becoming familiar with the teachings herein.

Parking Facility.

Secure electronic payment is also disclosed as it may be implemented for a parking facility. In an example, the secure electronic payment may be implemented to pay for use of a parking facility (e.g., multi-space parking lot(s) or garage(s) and/or valet using the lot(s) or garage(s)). Payment is handled on-site by an electronic device such as, but not limited to, a mobile phone, without needing to have a physical credit card or traditional cash on hand. In an example, a user (e.g., a customer) may issue a request for a transaction for a parking facility. The request is processed to confirm payment, and a token (e.g., a secure digital certificate such as an electronic data file) is issued to the customer.

The customer may then transmit (e.g., wirelessly transmit) the token to a token handler for a parking facility. In an example, the token handler is provided on (or as an integral part of) a parking area access control device (e.g., a gate). In an example, the token handler may be utilized by a valet service, i.e., a service that parks vehicles for multiple customers. The token handler validates the token and negotiates the transaction, for example, by actuating operation of a gate or other parking area access control device to enable entry and/or exit of a vehicle from a designated parking area.

An example token handler includes a wireless certificate reader configured to receive a digital certificate or "token" from a mobile computing device. In use, a mobile computing device (e.g., mobile phone) may include an installed application or "app". When the mobile computing device is activated via the app, it searches for any token handlers in the area (e.g., a parking facility) which may be operated with the digital payment system. In an example, the app may display a list of token handlers in the user's vicinity which accept payment via the secure payment system. In other examples, the customer may manually identify the token handler (e.g., by entering an ID for a parking facility in the app).

In an example, where a parking facility with a valet or parking attendant implements the secure payment system, the user can pay securely without having to pay the individual valet or parking attendant. In addition, the owner or operator of the parking facility can retrieve space usage and availability reports, thereby enabling the owner to better understand customer needs and parking patterns.

It is noted that the wireless certificate reader does not need to establish a connection to the payment provider or other entity. As such, the token handler does not need to be configured with an expensive to install and maintain modem or other communications system. The wireless certificate reader can instead be a BLUETOOTH™ or other near-field communication protocol for communicating with the mobile computing device in proximity to the token handler.

In addition, the parking facility does not need to be in an area having mobile phone/data service. For example, the user may request a token at their home, and then use that token at a parking facility that is out of a service area by providing it to the token handler for the parking facility via the BLUETOOTH™ or other near-field communication protocol.

In an example, data to validate the token received at the token handler is stored in the local memory of the token handler before a transaction is initiated at the token handler. As such, no communication connection is required between the digital payment system and the third party payment system. This enables use of the digital payment system without having to provide expensive communication connections by the parking facility.

The token may be a one-time-use digital certificate. In an example, after the token has been confirmed and the transaction negotiated (i.e., the gate has been actuated), the corresponding information stored in the token handler may be "wiped" clean (e.g., the code set to zero or otherwise erased). This helps ensure that the goods and/or services delivered by the token handler have been paid for and that the same digital certificate is not being re-used. In another example, the token may include an expiration tag, so that a customer cannot purchase tokens in advance to avoid price increases.

In an example, the secure payment system may operate with a third-party payment processor to handle payments for the user without the user having to provide any credit card or other form of payment (or personal or other information) at the parking facility. For example, the user may have already provided payment information (e.g., credit card or bank account information) to the third-party payment processor, who is a trusted payment processor such as the user's bank, credit card issuer, direct carrier billing (e.g., billing to a cell phone account), digital currency, or other payment service, and therefore the user does not have to provide any payment information to the token handler or the token provider. As such, the secure payment system reduces the opportunity for fraud, while providing the user with the convenience of a so-called "cashless" transaction. Likewise, the owner of the parking facility receives payment from a trusted third-party payment processor without risk that the payment form (e.g., credit card) is stolen or unauthorized.

The secure payment system may support simple linear and/or complex dynamic rate structures. For example, the user may park prior to parking regulations starting, and have the unit only charge after the regulations go into effect. Example regulations may include higher prices during peak hours (e.g., congestion pricing).

The secure payment system may be implemented at parking facilities to accept a variable rate structure. For example, parking rates can change for special events. In an example, the secure payment system can be pre-programmed or programmed on the fly for these types of changes to the rate that is charged. In addition, discounts may be offered (e.g., a coupon could be applied via the app). Indeed, even free parking may be offered.

The secure payment system also enables parking facilities to designate all or portions of a parking area (e.g., designated for reserved parking, VIP parking, event parking, time-limited zones, etc.). Likewise, all or a portion of a parking area may be designated for permit parking, residential parking, airport or other area-specific parking (e.g., beach parking, street parking).

The secure payment system also enables the user to extend parking without having to go back to the lot or parking attendant. The time left is shown on the user's mobile phone. A warning message may be delivered to the user alerting the user that their paid for time is ending.

It is noted that the systems and methods described herein are not limited to any particular type of parking facility, mobile device, and/or payment processor. The digital payment system may be used in an attended and/or unattended environment, and may be used to enable operation of any type of parking facility.

Figure 9A:
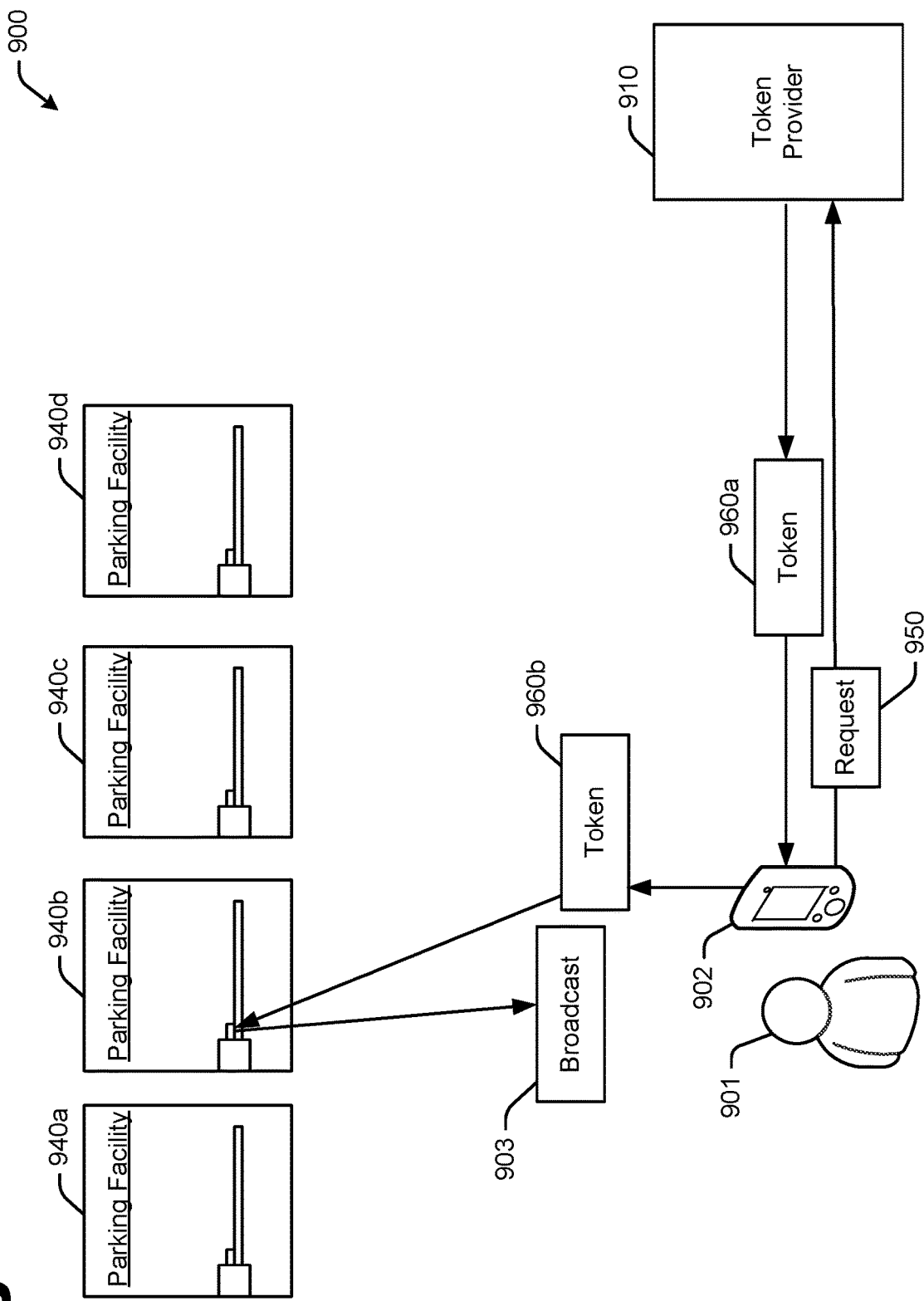
FIG. 9A is an illustration of an example secure payment system implemented by a parking facility.
Figure 9B:
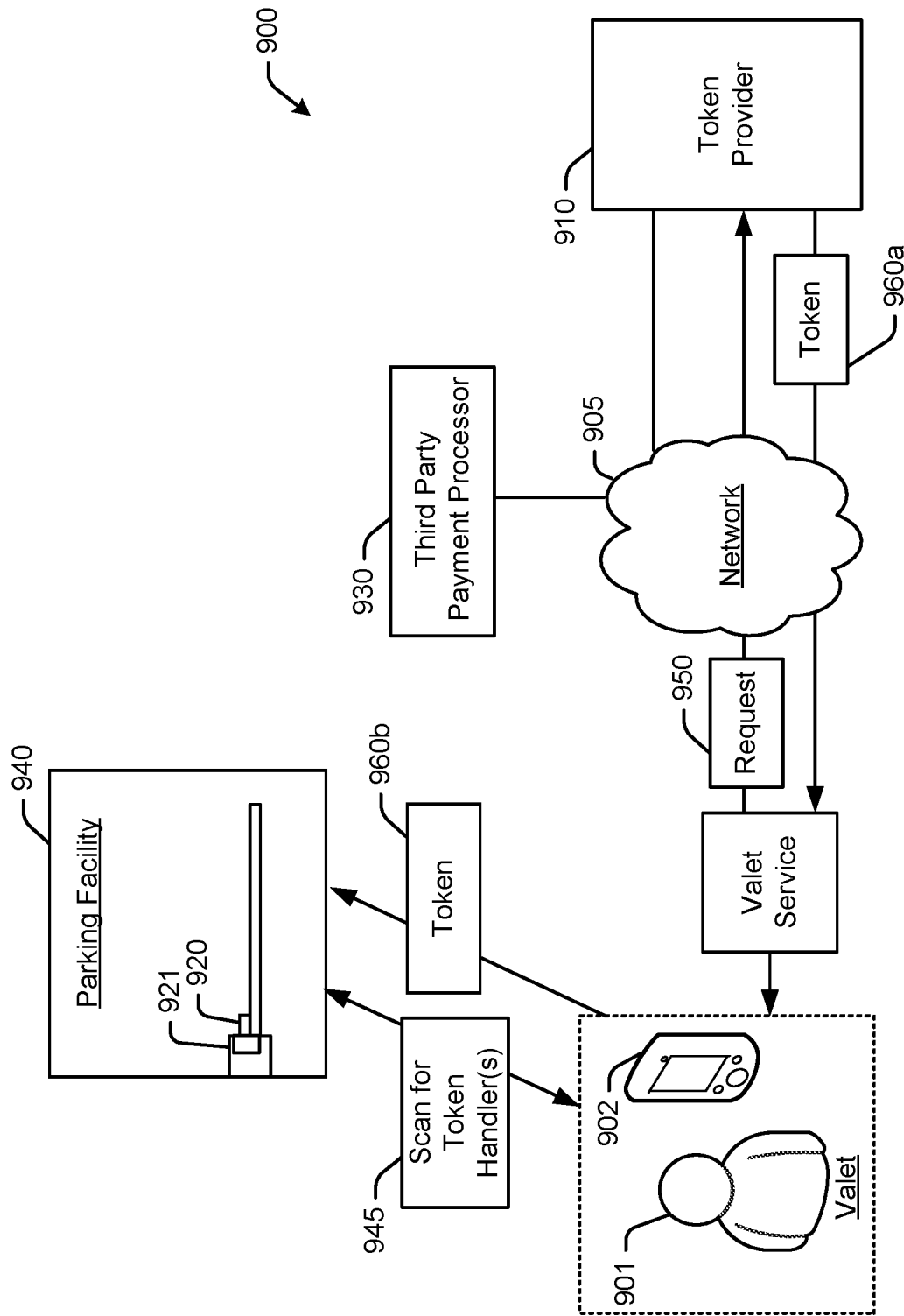
FIG. 9B is a block diagram of an example secure payment system for a parking facility.

FIG. 9A is an illustration of an example secure payment system 900 as it may be implemented for a parking facility. FIG. 9B is a block diagram of an example secure payment system 900. System 900 may be implemented with any of a wide variety of computing devices. Each of the computing devices may include memory, storage, and a degree of data processing capability at least sufficient to manage a communications connection either directly with one another or indirectly (e.g., via a network). At least one of the computing devices is also configured with sufficient processing capability to execute program code and/or other logic described herein.

In an example, the secure payment system 900 may be implemented by a token provider 910 providing a digital payment service accessed by a user 901 via a client device 902. The user may be a customer (e.g., the owner of the vehicle to be parked), or a valet (e.g., a person authorized to park a vehicle). The client device 902 may be any suitable computer or computing device (e.g., laptop computer or other mobile device such as a phone or tablet) capable of accessing a third party payment processor 930.

Of course, the token provider 910 and client device 902 are not limited to any particular type of devices (e.g., watches and other wearable technology), and may also include other devices that are traditionally not considered to be a part of the mobile environment (e.g., desktop computing devices or terminals).

In an example, the secure payment system 900 may be implemented with one or more communication network 905, such as a local area network (LAN) and/or wide area network (WAN) and/or other communications platform such as a mobile communications network. In an example, the network includes the Internet and/or other mobile communications network (e.g., a 3G or 4G mobile device network).

In an example, the secure payment system 900 provides a way for the user 901 to pay to park at a parking facility 940a-d (referred to generally herein as parking facility 940), using the user's own mobile device 902, via the digital payment service implemented by the token provider 910, but without having to provide payment at the parking facility 940 because access to payment information is maintained by third party payment processor(s) 930 (e.g., a bank or credit card company).

In use, a mobile device 902 (e.g., a mobile phone) may include an installed application or "app". When the mobile device 902 is activated via the app, the mobile device 902 searches 945 for any parking facilities 940 in the area which are configured for operation in the environment of the secure payment system 900. In an example, the parking facility 940 may broadcast 903 its presence. The mobile device 902 within range of the broadcast enables the app to display a list on the mobile device 902 of parking facilities in the user's vicinity which are configured to accept payment via the payment technique described herein. In another example, the identity of parking facilities 940 may be pre-stored in a database accessed by the app via the Internet.

In an example, the user may issue a request 950 to the token provider 910. The request 950 may include the parking facility ID (e.g., a number shown at or near the parking facility) or other identifying information. The request 950 may also include other information about the intended purchase (e.g., parking facility location and time of use) and a payment authorization. For example, the amount of payment may be displayed for the user by the app for the user to accept or approve the item and amount. The user may then select a third party payment processor 930 (e.g., a bank, credit card, or mobile phone service carrier) from the app. This information may be transmitted in the request 950 to the token provider.

The token provider 910 then confirms payment via the third party payment processor 930. For example, the token provider 910 may issue a payment authorization to a third-party payment processor 930, and receive payment approval from the third-party payment processor. After confirming payment, the token provider 910 may generate a token 960a and issue the token 960 to the user's mobile device 902.

After receiving the token 960a, the user may then complete the transaction by the token handler 920 for the selected parking facility 940. In an example, the parking facility 940 is configured with a token handler 920 operatively associated with a control board 921 for the parking facility 940 (e.g., configured to select a parking space and/or time to park at the parking facility 940). The token handler 920 may have a wireless certificate reader configured to receive a token 960b from the mobile device 902. The token 960a and 960b may be the same token provided by the token provider 910, or token 960b may undergo at least some degree of processing at the mobile device 902 before being issued to the token handler 920 for the parking facility 940.

The token handler 920 at the parking facility 940 may then process the token 960b to confirm payment by the user 901. If payment is confirmed, then the token handler 920 for the parking facility 940 may negotiate the transaction (e.g., opening a gate to enable access to a parking area).

As such, the system 900 provides a way for the user 901 to pay for use of the parking facility, using the user's own mobile device 902, but without having to provide direct access to payment details because those are maintained by third party payment processor(s) 950 (e.g., a bank or credit card company).

In an example, various operations of the secure payment system 900 may be implemented at least in part by program code and/or logic circuitry. Program code and/or logic used to implement features of the system can be better understood with reference to the following discussion and various example functions. To the extent program code is implemented, machine-readable instructions may be stored on a non-transient computer readable medium and are executable by one or more processor to perform the operations described herein. Examples of program code may include an end-user mobile device application (or "app"), payment processing application(s), host application (e.g., for generating the token in response to receiving confirmation of payment), and/or a token handling application (e.g., for validating the token received from the end-user device). Of course, the operations described herein are not limited to any specific implementation with any particular type of program code or logic.

It is noted, however, that the secure payment system 900 is not strictly data handling or program code for manipulating data in the traditional sense. That is, the secure payment system 900 may be implemented at least in part in program code (e.g., for generating the token and for various of the transmission protocols). It is to be understood that the secure payment system 900 is also implemented by device hardware which goes beyond a mere computing device provided to execute the program code. Example device hardware may include a wireless certificate reader with a communications interface (e.g., to the mobile device). Example device hardware may also include electronic actuators and/or motors to operate a gate or other access control device, timers, and/or other electronics operable in response to input from the wireless certificate reader and/or other processing device confirming payment.

FIGS. 9C-D show an example parking facility payment device 970, wherein C) is a front view and D) is a side view. The parking facility payment device 970 may be implemented by the parking facility 940 in FIGS. 9A and 9B.

In an example, the parking facility payment device 970 includes a display 972 showing parking spaces 974*a-f* for the parking facility 940, and the status of those spaces. The display 972 may show the parking space number. The display 972 may also display a payment indicator such as "PAID". The display 972 may be suitably mounted, such as on a post 975, wall, etc.

As shown in FIG. 9D, each space on the display 972 may include an output device 976 to illuminate the payment status (e.g., "PAID"). The output device 976 may be operatively associated with the token handler 920 and control board 921 to receive remote payment, as explained above with reference to FIGS. 9A and 9B.

It is noted, however, that the example parking facility payment device 970 shown in FIGS. 9C-9D is merely illustrative and not limiting. For example, the parking facility payment device need not be implemented as a sign, and may instead be configured as a desktop board or display on a tablet (e.g., for a valet). In addition, the parking facility payment device 970 may be operatively associated with a gate or other parking area access device to operate (e.g., open and close) the gate in response to payment for the parking space. In another example, the parking facility payment device 970 may be stand-alone. That is, the parking facility payment device 970 may be a display only, allowing the parking area owner to see which parking spaces have been paid for, and which parking spaces have not been paid for (and to evict or ticket a vehicle that is occupying an unpaid space).

These and other aspects of the secure payment system 900 will be described in more detail below such that the device hardware can be readily implemented by one having ordinary skill in the art after becoming familiar with the teachings herein.

Figure 10A:
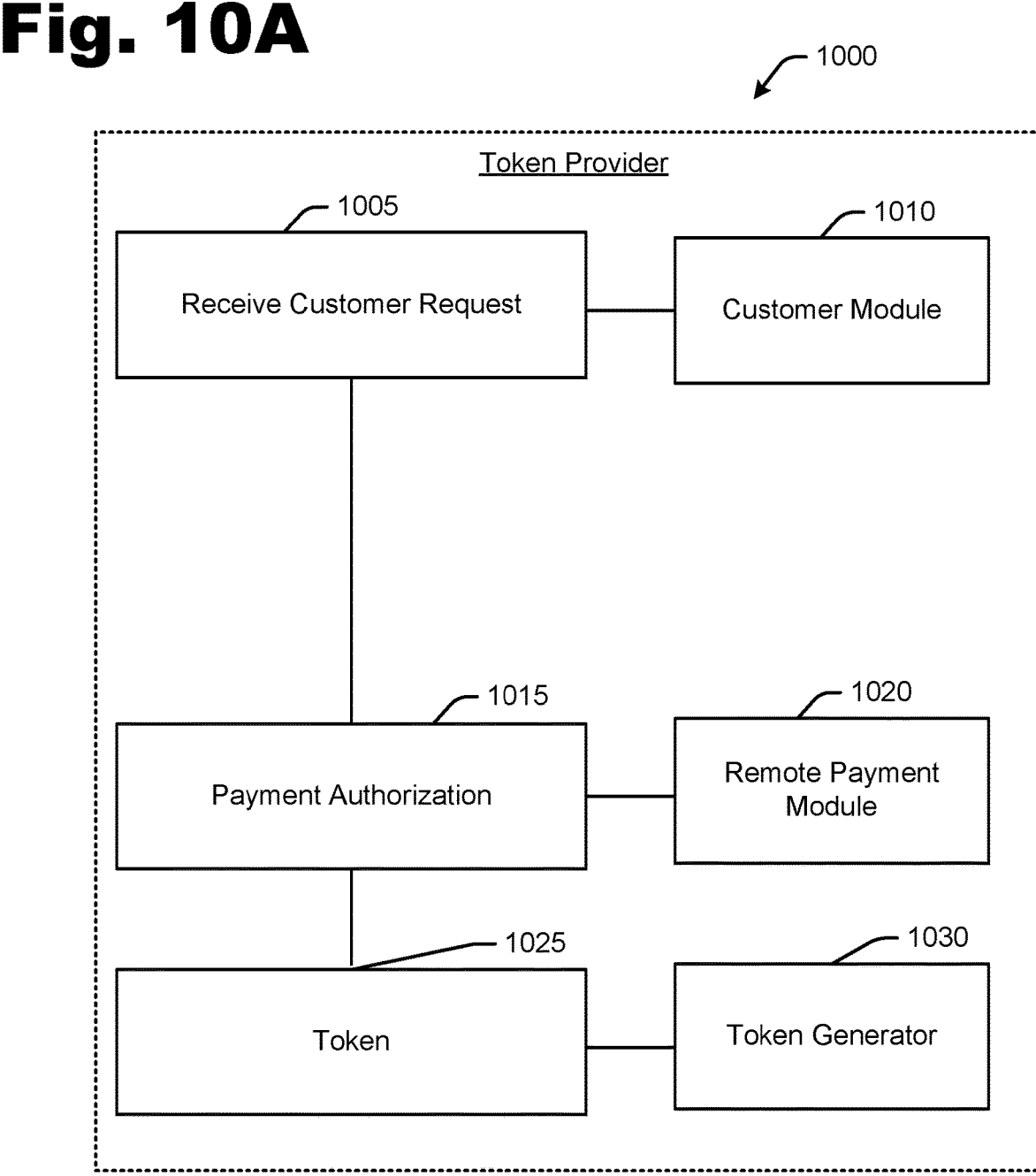
FIG. 10A is a high-level diagram of a token provider of the secure payment system for a parking facility.

FIG. 10A is a high-level diagram of a token provider 1000 (e.g., token provider 910 in FIG. 9B) of the secure payment system. The token provider 1000 may receive a request 1005 for a transaction (e.g., including a payment amount) at a token handler 920 for the parking facility via a customer module 1010. In an example, the request 1005 may include information about the parking facility (e.g., identifying information). The token provider 1000 issues a payment authorization 1015 via a remote payment module 1020 to a third-party payment processor. It is noted that the token provider 1000 does not actually receive any payment or other personal or confidential payment information from the customer. This information remains confidential as between the customer and the third party payment processor (e.g., the customer's bank or credit card processor). The token provider 1000 receives payment approval from the third-party payment processor. The token provider 1000 includes a token generator 1030 to generate a token 1025 and issues the token 1025 to the customer so that the customer can complete the transaction at the token handler device configured for the parking facility.

Figure 10B:
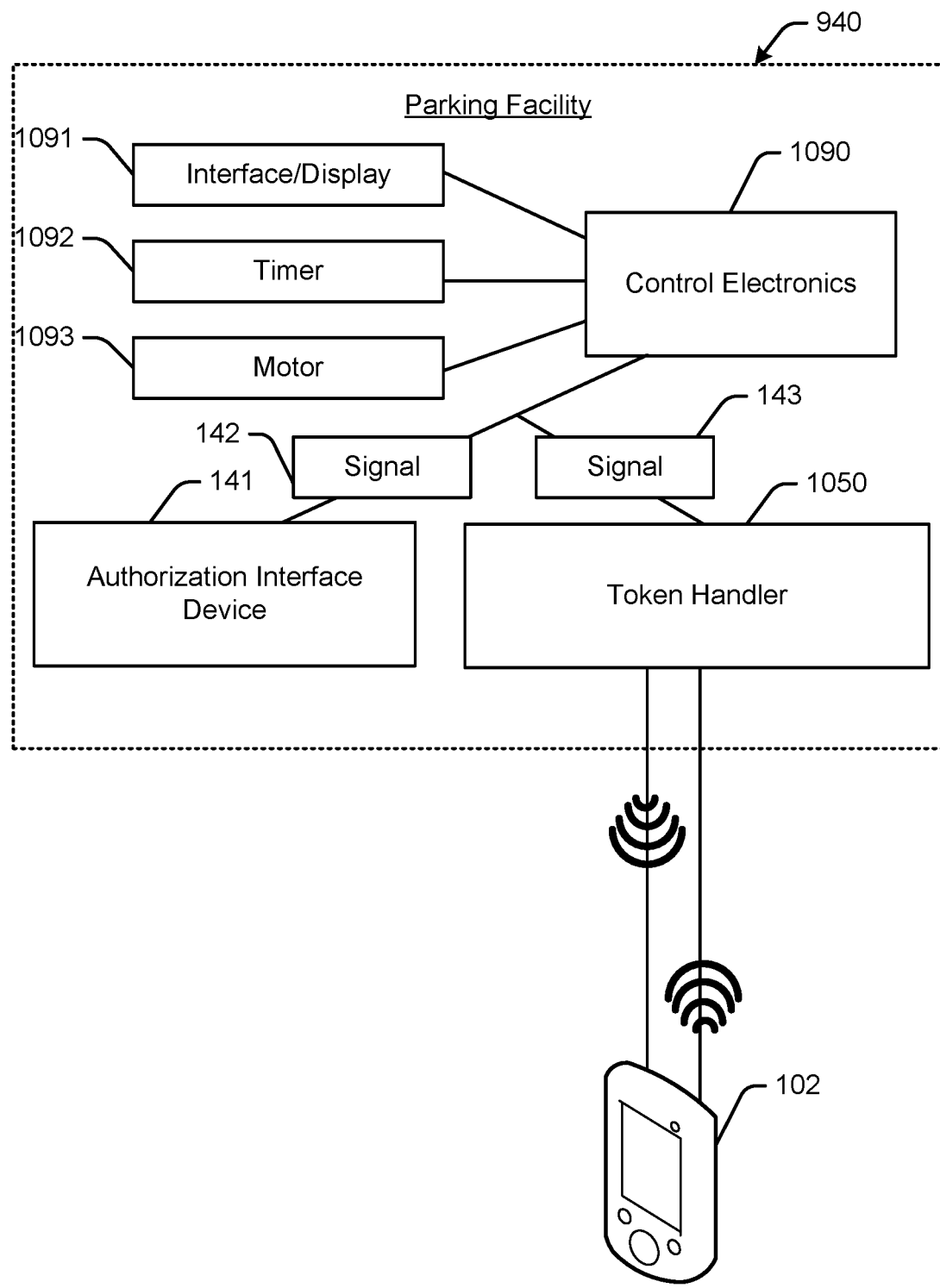
FIG. 10B is a diagram of a token handler of the secure payment system for a parking facility.

FIG. 10B is a diagram of a token handler device 1050 of the secure payment system for a parking facility (e.g., token handler 920 in FIGS. 9A and 9B). For example, the parking facility 940 may be implementing the parking facility payment device 970 shown in FIGS. 9C and 9D.

FIG. 10B illustrates an example where a payment device for the parking facility 940 has an existing payment or authorization interface 941 (e.g., coin-operated, bill-operated, or card reader), and is retrofitted with the token handler device 1050 disclosed herein. In an example, retrofitting the token handler device 1050 may enable operation by either the existing authorization interface 941 and/or via the token handler device 1050. For example, the token handler 1050 may be wired between the existing authorization interface 941 and the control electronics 1090. In an example, the token handler 1050 is connected between the authorization interface 941 and the control electronics 1090 without having to cut the existing wiring, e.g., by a coupler that splices through the wire insulation to make an electrical connection with the wiring by press-fit without having to cut the wires. It is noted, however, that the payment device for the parking facility 940 does not need to be retrofitted with the token handler device 1050, and the payment device for the parking facility 940 can also be configured from the start with the token handler device 1050.

In an example, the existing authorization interface 941 generates an electrical signal 942 or pulse in response to receiving coins or other authorization (e.g., a bill acceptor or card reader). For example, each quarter may generate an electrical pulse thereby indicating a total dollar amount at the control electronics 1090. For example, each time a user inserts a quarter, an electrical pulse is issued to the control electronics and the total dollar amount entered is displayed for the user (e.g., $0.25, $0.50, etc.) until the dollar amount is displayed for the desired function.

In an example, the token handler 1050 is configured to generate an electrical pulse for each token received by the token handler, or multiple electrical pulses for the total dollar value of the token. For example, the token handler 1050 may generate individual electrical pulses for each $0.25 token received. Or if a token is received having a value of $1.25, the token handler 1050 may generate five electrical pulses to inform the control electronics 1090 of the dollar value received. Parking can then be authorized similarly to the user inserting coins in the existing authorization interface 941, for example, by operating a gate or other access control device, or simply displaying "PAID".

Figure 10C:
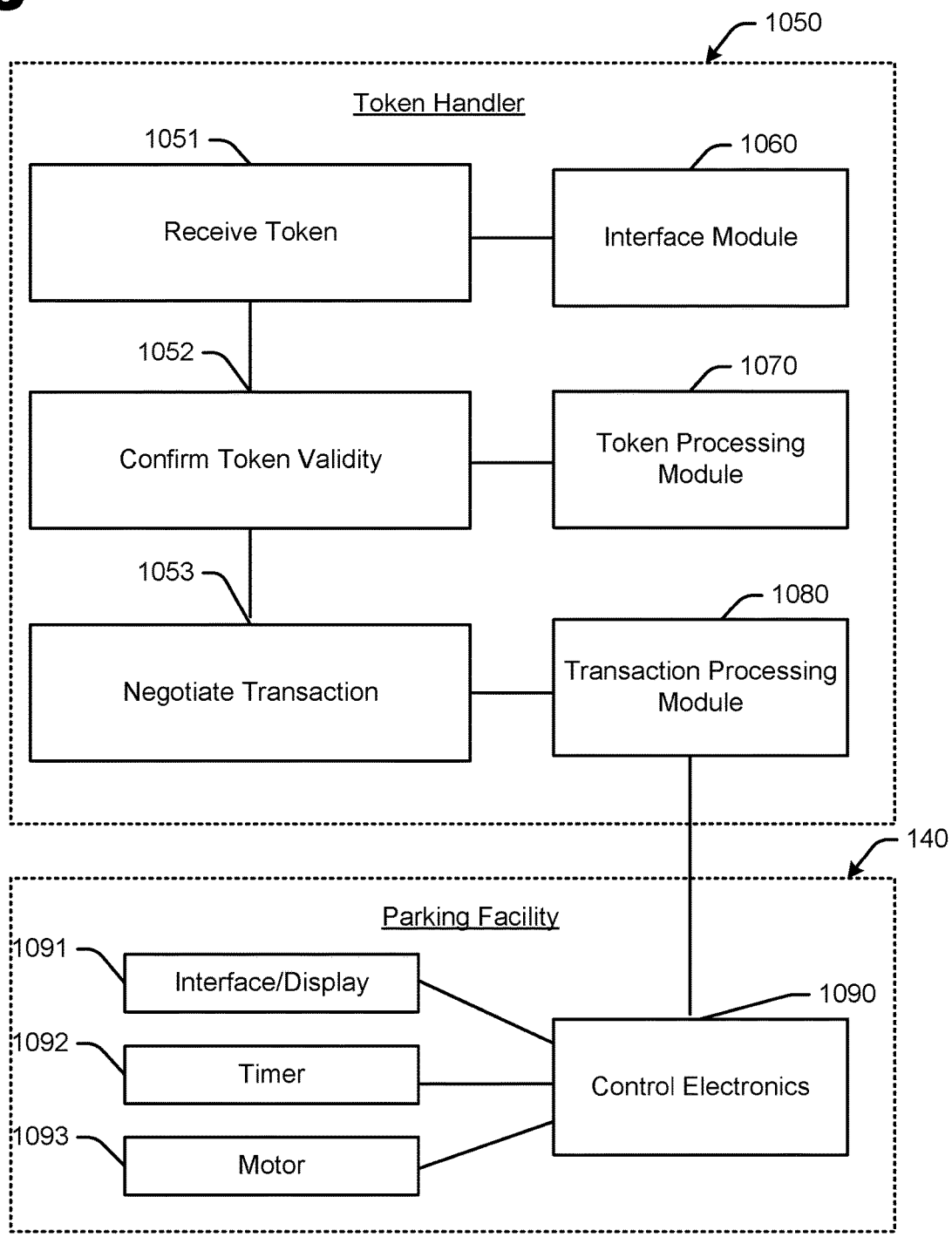
FIG. 10C is another diagram of a token handler of the secure payment system for a parking facility.

FIG. 10C is another diagram of a token handler device 1050 of the secure payment system for a laundry machine (e.g., token handler 920 for the laundry machine 940 in FIGS. 9A and 9B). Although shown as separate entities in FIG. 10C, as already noted above the token handler 1050 may be mounted in or otherwise provided at an access control gate; or the token handler 1050 may be provided at physically remote location such as a sign (see, e.g., FIGS. 9C and 9D) indicating a payment status for a parking space.

In an example operation, the token handler device 1050 receives a token 1051 from the customer (e.g., the token 1025 issued to the customer by the token provider 1000 in FIG. 10A) via an interface module 1060. The token handler device 1050 may receive the token 1051 from the customer's mobile device via a BLUETOOTH™ or other near-field communication protocol. A token processing module 1070 compares data value(s) of the token to data value(s) stored at the token handler device 1050. For example, the token processing module 1070 may translate the hex value to determine the transaction code and the transaction index, and then compare these to the corresponding device code stored at the associated index location.

The token handler device 1050 confirms that the token is valid at 1052. If the token is valid, a transaction processing module 1080 may negotiate the transaction 1053 to enable parking. In an example, the transaction processing module 1080 may actuate control electronics 1090 of a gate or other access control device, for example by issuing a signal to the control electronics 1090. The control electronics 1090 may include a computer board on the gate or other access control device, which in turn actuates the motor to open and close the gate. Or the control electronics 990 may actuate an interface or display (see, e.g., FIGS. 9C and 9D), a timer (e.g., as a parking meter), etc. Even a door may be actuated, permitting a valet to enter a garage to retrieve a parked vehicle. Other components and/or functions can also be controlled by actuating via the token handler device 1050.

It is noted that the term "module" as used herein means electronic devices (e.g., logic circuitry) and/or machine readable instructions (e.g., firmware) specifically configured to carry out the operations described herein.

Figure 11:
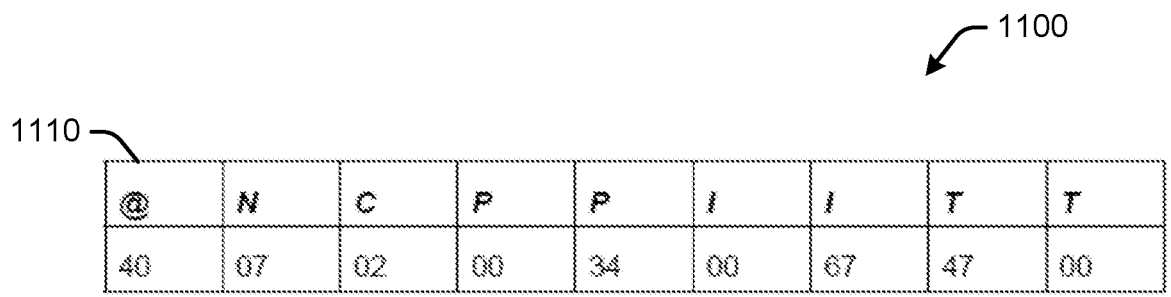
FIG. 11 illustrates example communication and commands which may be implemented by the secure payment system for a parking facility.

FIG. 11 illustrates example communication and commands 1100 which may be implemented by the secure payment system. First, a communications connection may be established. According to the BLUETOOTH™ protocol (e.g., BLUETOOTH™ LE or "BLE," BLUETOOTH™ 4.0, and BLUETOOTH™ Smart), the token handler has a role of a server or peripheral device, and the user's mobile device has a role of a client or central device.

The token handler advertises its presence (e.g., every 1.00 to 1.25 seconds). The mobile devices scans for nearby token handlers at an interval that is less (e.g., faster) than the advertise interval. In an example, the scan interval and window can be configured with the mobile device. The mobile device may have two methods of scanning for devices (e.g., scan for all devices, or scan only for devices offering a specific service). The latter example is by scanning for a specific UUID that represents a service. By way of illustration, the token handler is represented by the following UUID: c9cab968-3abf-4043-a5af-9ad00c6074d5.

After executing the Generic Access Protocol (GAP) to find a device, the Generic Attribute Profile (GATT) can be executed for "service discovery" to find the supported "characteristics" for each service. Each characteristic has an associated UUID and handle, and can be read or written. In an example, UUID's have two lengths (e.g., 16-bit UUID is a standard service or characteristic described by the Bluetooth specification, or a 128-bit UUID is a custom service that is vendor specific). The following table illustrates services and characteristics supported by the token handler in an example.

TABLE 1

| Services Provided By Token Handler | |
|---|---|
| 1800 | GAP Service |
| 2A00 | Device Name |
| 2A01 | Appearance (0 = Unknown) |
| 180A | Device Information Service |
| 2A29 | Manufacturer Name String (Clancy Systems) |
| 2A24 | Model Number String (Clear Token Meter) |
| 2A27 | Hardware Revision String (B) |
| 2A26 | Firmware Revision String (001.003.000.110) |
| 2A28 | Software Revision String (1.31) |
| c9cab9b8-3abf-4043-a5af-9ad00c6074d5 | Token Handler Service |
| 0f314942-e257-46a9-a8c8-4c8ecee2cf2b | ID (currently the 5 character ID on label, e.g. AAA01) |
| d5dee9b5-456f-4baa-ad5c-a3f14fd2653c | Command |
| 2902 | Client Characteristic Configuration (for Command) |
| d5dee9b6-456f-4baa-ad5c-a3f14fd2653d | Beacon Data (Data1) |

In the table above, three services provided by the token handler are shown in boldface font. Below each service are the characteristics for each service. The characteristics can be read or written to obtain the values. A handle is assigned to each characteristic. There are routines used to determine the handle based on UUID.

In this example, a GAP service has two characteristics. Device name is currently the ID of the Clear Token Device. The Appearance always reads zero ("unknown") because the CTD doesn't fall into a pre-defined category of Heart Rate Monitor, Phone, etc.

Some devices (e.g., APPLE™ devices) require that a Device Information Service be provided on each Bluetooth device. The characteristics are self-explanatory.

The Token Handler Service has three characteristics and one Client Characteristic Configuration. The ID is read only and is the ID that is on the label of the meter. The command characteristic can be written and a return code can be read. Before the command characteristic can be used, a value of 0001 is written to the Client Characteristic Configuration. Some Bluetooth stacks do this automatically. Also, some clients may need to send the value as 0100 instead of 0001. Other examples are also contemplated.

Commands and data can now be exchanged with the token handler. Commands are sent to the token handler by writing up to 20 bytes to the Command characteristic handle. Data is received back through the same handle with "notification".

After communication, the connection is disconnected. The token handler finishes carrying out any tasks, then goes back to sleep. This strategy helps to minimize connection time to the token handler device to conserve battery power.

In an example, the commands and data are in arrays of bytes, with values from 0x00 to 0xFF. The number of bytes sent or received through the FIFO handle is 20 or less at a time. All commands to the CTD begin with a 0x40 (@). The next byte in the array is the number of remaining bytes in the command. In an example, the general format of a command is @N C P P I I T T, where:
@=0x40
N=Number of bytes to follow
C=Command code (1 byte)
P=Parameters for the command (number of bytes varies with each command)
I=Index of the validating token (2 bytes, most significant first)
T=validating token (2 bytes, most significant first)

To make the process even more secure, the code can be sent from the user's mobile device as a two part message, wherein part one is a gatekeeper command or message including a unique code and informing the token handler for the parking facility that part two is following, and then another unique code is sent as part two as an activating command or message. This technique implements two codes for each transaction.

In this example, all replies from the CTD begin with a 0x52. The next byte in the array is the remaining number of bytes in the reply. In an example, the general format of a reply is: R N S, where:
R=0x52
N=number of bytes to follow
S=status (0x01 if command was successful or 0x00 if there was an error)

Validating tokens may also be implemented with the commands. For example, there may be 65536 index positions (0-65535), with each index containing a token with a value from 1-65535. Once a token is used, it is zeroed to prevent re-use and thus reduce fraud.

If an incorrect index/token combination is received, the device responds with a status of 0x00, and not respond to further commands until some time has passed.

In FIG. 11, the following abbreviations are used:
@=0x40—Start of the command
N=Number of bytes to follow
C=Command Code
P=Time (used in Closure & Backlight)
I=Index Value
T=Token Value
H=Hours
M=Minutes
S=Seconds
R=Reset (00=No Reset—01=Reset)

Command 1110 is an example Contact Closure Command. This command closes the relay contact for the specified length of time. The length of time the contact remain closed is the number of 3.90625 millisecond units (1/256 of a second) specified with 2 bytes. For example, to close the contact for 1 second, a value of 0x0100 is used; to close the contact for a half second, a value of 0x0080 is used. A value of less than 0x0034 (200 mS) should not be used for this example. @N C P P I I T T, where:
@=0x40
N=0x07, number of bytes to follow
C=0x02
P=length of time for contact closure, MSB first, range 0x0034-0xFFFF I=index of validating token, MSB first
T=validating token, MSB first
Reply: R N S R=0x52, where:
N=0x01, number of bytes to follow
S=0x01 if command and token were successful, 0x00 if index/token was not valid or some other error.

Other commands (not shown in FIG. 11), include by way of illustration, an Enable Beacon Command (0x05). This command enables the token handler to alternate advertising between any of several supported beacon formats. For example, with the uriBeacon, the final 18 bytes of the advertisement data are the encoded URL including prefix byte. This data is written to the GATT attribute database (Beacon Data, see table above) prior to sending the command. In another example, with the iBeacon, 20 bytes of the advertisement data are the UUID and the "major" and "minor" fields. This data is written to the GATT attribute database (Beacon Data, see table above) prior to sending the command.

The rate at which advertising packets are sent doubles when the beacon function is enabled, thus impacting battery life. @N C B I I T T, where:
@=0x40
N=0x06, number of bytes to follow C=0x05
B=0: no beacon, 1: uriBeacon, 2: Apple iBeacon I=index of validating token, MSB first T=validating token, MSB first
Reply: R N S R=0x52 N=0x01
S=0x01 if command and token were successful, 0x00 if index/token was not valid or some other error.

In another example, a Change Transmit Power Command (0x06) changes the transmit power of the CTD. In an example, there are three power levels: low, medium, and high. The default transmit power level after cycling the device power is medium. @N C P I I T T, where:
@=0x40
N=0x06, number of bytes to follow C=0x05
P=0: Low, 1: Medium
(default), 2: max I=index of
validating token, MSB first
T=validating token, MSB
first
Reply: RNSR=0x52 N=0x01
S=0x01 if command and token were successful, 0x00 if index/token was not valid or some other error.

In another example, a Contact Pulse Command (0x08) momentarily closes (pulses) the relay contact, a specified number of times, for a specified length of time, with a specified spacing between pulses. This can be implemented to mimic coins passing through a coin acceptor in vending applications. @N C P D S I I T T, where:
@=0x40
N=0x08, number of bytes to follow C=0x08
P=Number of pulses, 0-255 (0x00-0xFF)
D=Pulse duration, 1=200 mS, 2=500 mS S=Time between pulses, 1=200 mS, 2=500 mS, 3=one second.
I=index of validating token, MSB first T=validating token, MSB first
Reply: R N S R=0x52
N=0x01, number of bytes to follow
S=0x01 if command and token were successful, 0x00 if index/token was not valid or some other error.

The above example commands are provided for purposes of illustration, but are not intended to be limiting. Still other commands are contemplated as being within the scope of the disclosure herein, as will be readily appreciated by those having ordinary skill in the art after becoming familiar with the teachings herein.

Figure 12:
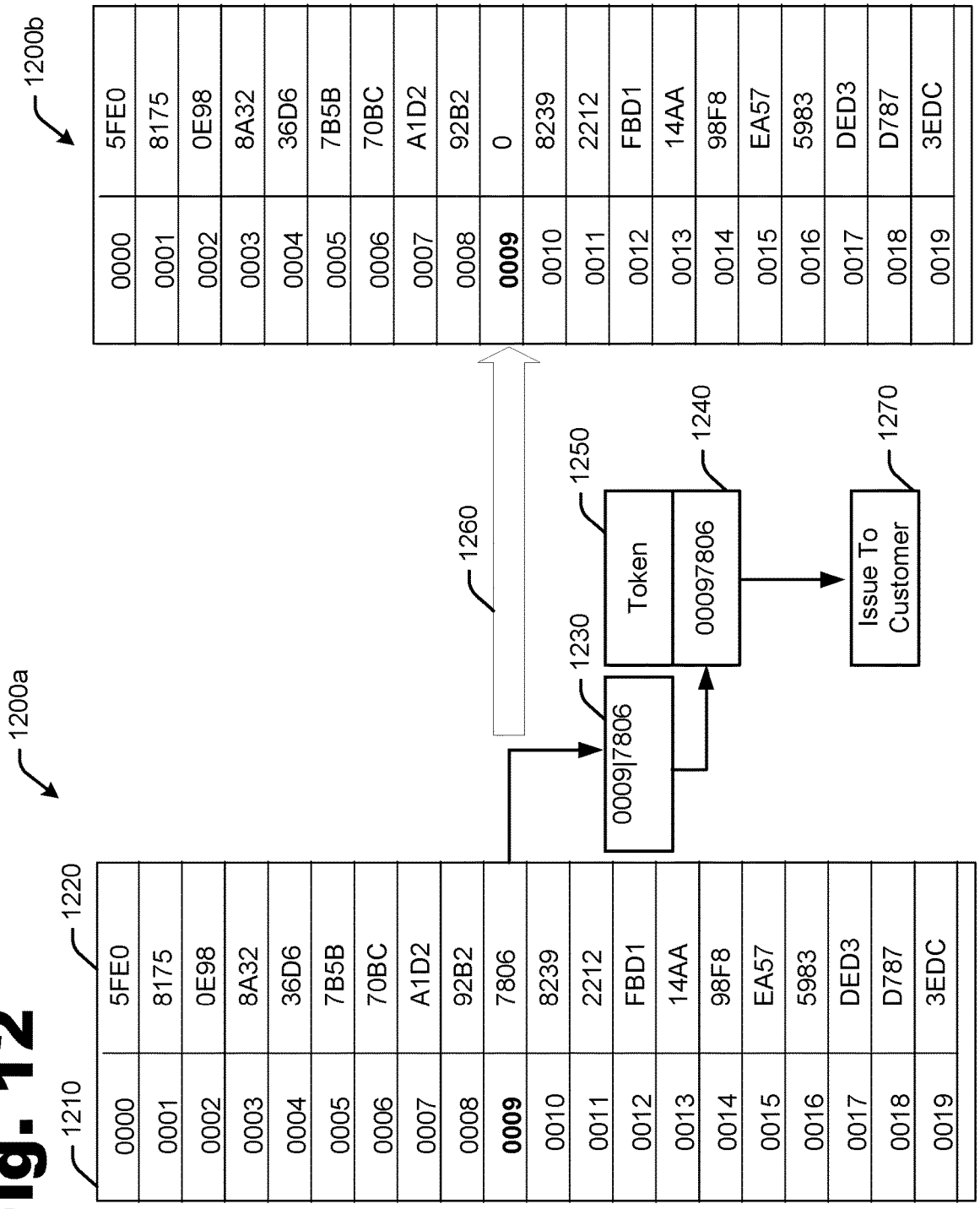
FIG. 12 illustrates an example coding scheme to build a token.
Figure 13:
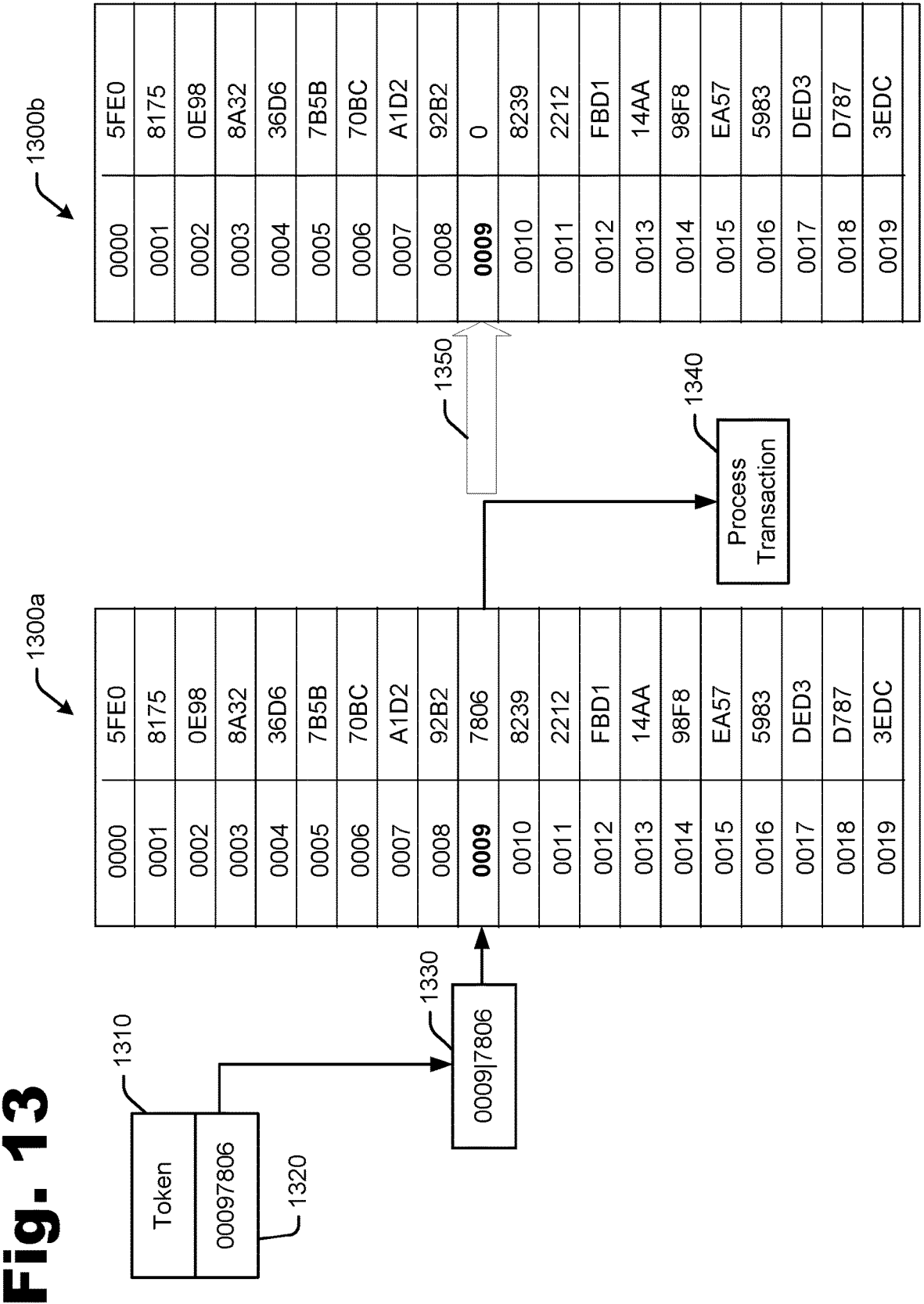
FIG. 13 illustrates an example coding scheme to validate a token and process a transaction at a parking facility.

FIG. 12 illustrates an example coding scheme to build a token at a token provider. FIG. 13 illustrates an example coding scheme to validate the token illustrated in FIG. 12, and process a transaction by a token handler for the parking facility. The tables 400a-b in FIG. 12 and the tables in FIG. 13 illustrate a code sample (the first 20 entries of 65,536 entries are shown). The first column represents an index (1 through the number of entries), and the second column represents the corresponding code for the index entry. The codes shown in FIG. 12 may be stored at the token provider and used to generate the token. These same codes (shown in FIG. 13) may also be written to the token handler for the parking facility by "injecting" the codes in hardware stored in or associated with the token handler for the parking facility. Each token handler includes its own set of unique codes in an indexed array, stored in memory internal to the token handler for the parking facility.

During set up, the token handler may be read (e.g., for device ID or location number, and a corresponding code). The codes may be compared to a database record stored by the token provider. If there is a match, then the token handler has been properly set up, and is ready for use by the customer.

During use, the user may open a phone app and select the location or other ID of the parking facility. The location or other ID of the parking facility may be transmitted by nearby mobile devices (e.g., using Bluetooth or other communications protocol), or the user may manually enter the location or other ID. A request is generated on the user's mobile device, including the location and/or other information for the parking facility. Additional information may also be included in the request (e.g., time duration paid for parking, ID number for a parking space, ID of a valet, etc.). The user may also select a payment processor (e.g., a bank, credit card processor, PayPal®, etc.) to be included in the request. The user may be prompted to use the last payment processor used or enter a new payment processor.

The request is sent to the token provider to authorize payment. The payment processor may charge the user's account and return "Approved" or "Declined" to the token provider. The digital payment service may notify the user (e.g., if payment was declined). But the token provider never receives personal or financial information or credit card information of the user.

If the payment is approved, then the token provider may build a token for the user to deliver to the token handler for the parking facility. In an example, the token may include a location code, duration or activation code, security code (FIG. 12), and optionally an advertisement or other information for the user to view. For example, the token provider may select transaction index (e.g., index location 0009) from the index column 1210 and read a corresponding transaction code (e.g., hex 7806 representing decimal 30726) from the code column 1220, as illustrated by the numbers 1230 in FIG. 12. It is noted that any suitable system (e.g., alphanumeric) may be used, and is not limited to a numbering system.

In this example, the numbers are in hexadecimal and added (e.g., as packet 1240) to the token 1250. The table 1200a may be updated as illustrated by arrow 1260 and shown as updated table 1200b, wherein the code at index location 0009 is set to "0". The token 1250 may then be issued to the customer as illustrated by block 1260.

The user may then relay the token 1310 including the hexadecimal 1320 to the token handler, as illustrated in FIG. 13. The token handler receives the token, and validates the transaction code in the token (FIG. 13), for example by reading the token packet 1320 and comparing the index and hex code 1330 with the corresponding index location 0009 of the device index. If the device code at index location 0009 in table 1300a matches the transaction code in the token 1310, the token handler may negotiate or process the transaction 1340 by executing a device command (e.g., operate a gate or parking timer).

The token handler may also update/modify the table 1300a, as illustrated by arrow 1350, to indicate that the code has been used (e.g., by setting the code in index 9 to all 0's) as shown by updated table 1300b in FIG. 13. As such, the index location 9 cannot be re-used, thereby preventing fraudulent use.

In this example, a small 128K file contains 65,536 unique codes. For a parking facility being used on average 20 times a day, the original codes are predicted to last about 9½ years. For a busy location being accessed 100 times a day, the original codes are predicted to last about 2 years. In the event that the codes need to be changed or updated, a secure update procedure may be implemented to refresh the codes in the field.

It should be understood that the systems and techniques described above may be modified within the scope of the disclosure herein, and are not limited to any particular implementation. For example, the example code and indexing illustrated in the figures is illustrative and not limiting.

Figure 14:
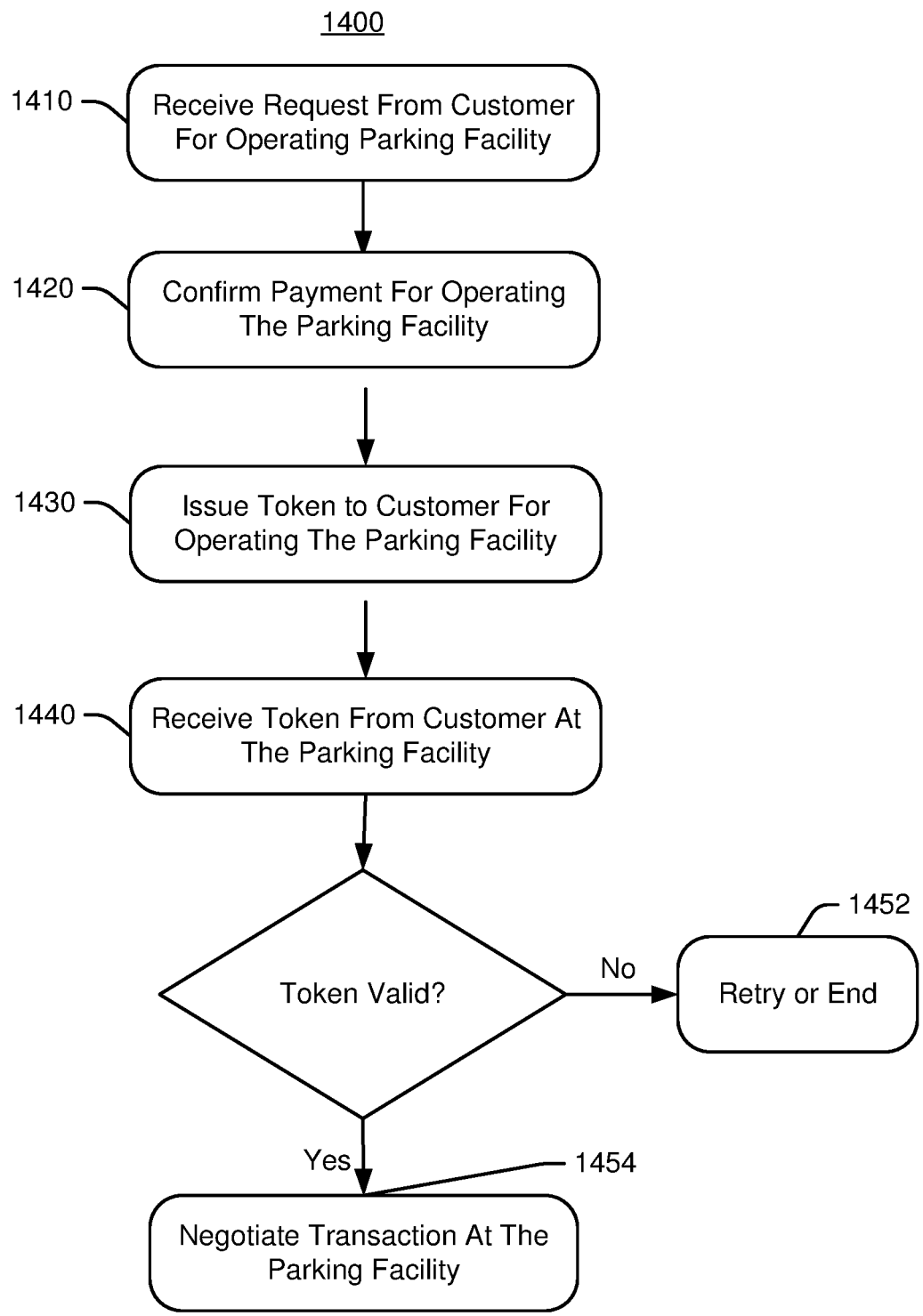
FIG. 14 is a flow chart illustrating example operations which may implement a secure payment method at a parking facility.

FIG. 14 is a flow chart illustrating example operations 1400 which may implement a digital payment method. In example operation 1410, a request for a transaction for a parking facility may be received from a customer by a token provider. The token provider confirms payment for the transaction in operation 1420, and then issues a token to the customer in operation 1430. In an example, the token has a transaction index and a corresponding transaction code.

In operation 1440, the token is received from the customer. For example, the token may be received from the customer's mobile device via a BLUETOOTH™ or other near-field communication protocol with the token handler for the parking facility. In operation 1450, the token handler for the parking facility confirms validity of the token, e.g., based on the transaction index and the transaction code. If the token is not valid, operations may end with operation 1452. In another example, the token handler may issue feedback to the user (e.g., to retry by sending a different token). If the token is valid, the token handler may negotiate the transaction for the parking facility in operation 1454. In an example, the token handler may start, set (or add) an operating time for the customer to use the parking facility.

Figure 15:
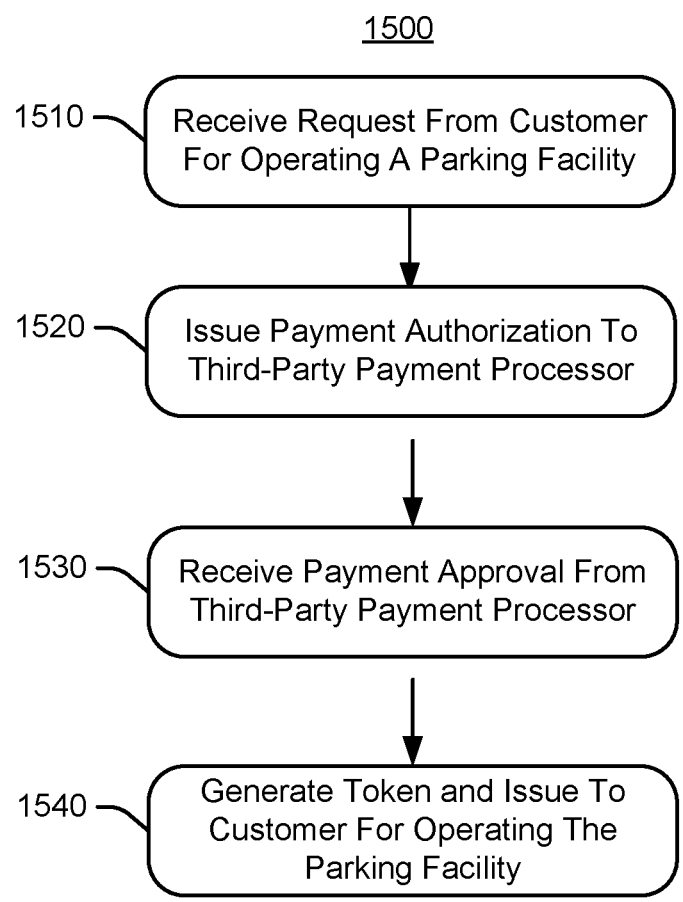
FIG. 15 is a flow chart illustrating example operations of a token provider to implement a secure payment method at a parking facility.

FIG. 15 is a flow chart illustrating example operations 1500 of a token provider to implement a digital payment method. In operation 1510, the token provider may receive a request for a transaction for a parking facility from a customer. In an example, the request may include information about the parking facility (e.g., identifying information). In operation 1520, the token provider issues a payment authorization to a third-party payment processor. It is noted that the token provider does not actually receive any payment or other personal or confidential payment information from the customer. This information remains confidential as between the customer and the third party payment processor (e.g., the customer's bank or credit card processor). In operation 1530, the token provider receives payment approval from the third-party payment processor.

In operation 1540, the token provider generates a token and issues the token to the customer so that the customer can complete the transaction for the parking facility. In an example, the token includes a hex value representing the transaction code and the transaction index.

Figure 16:
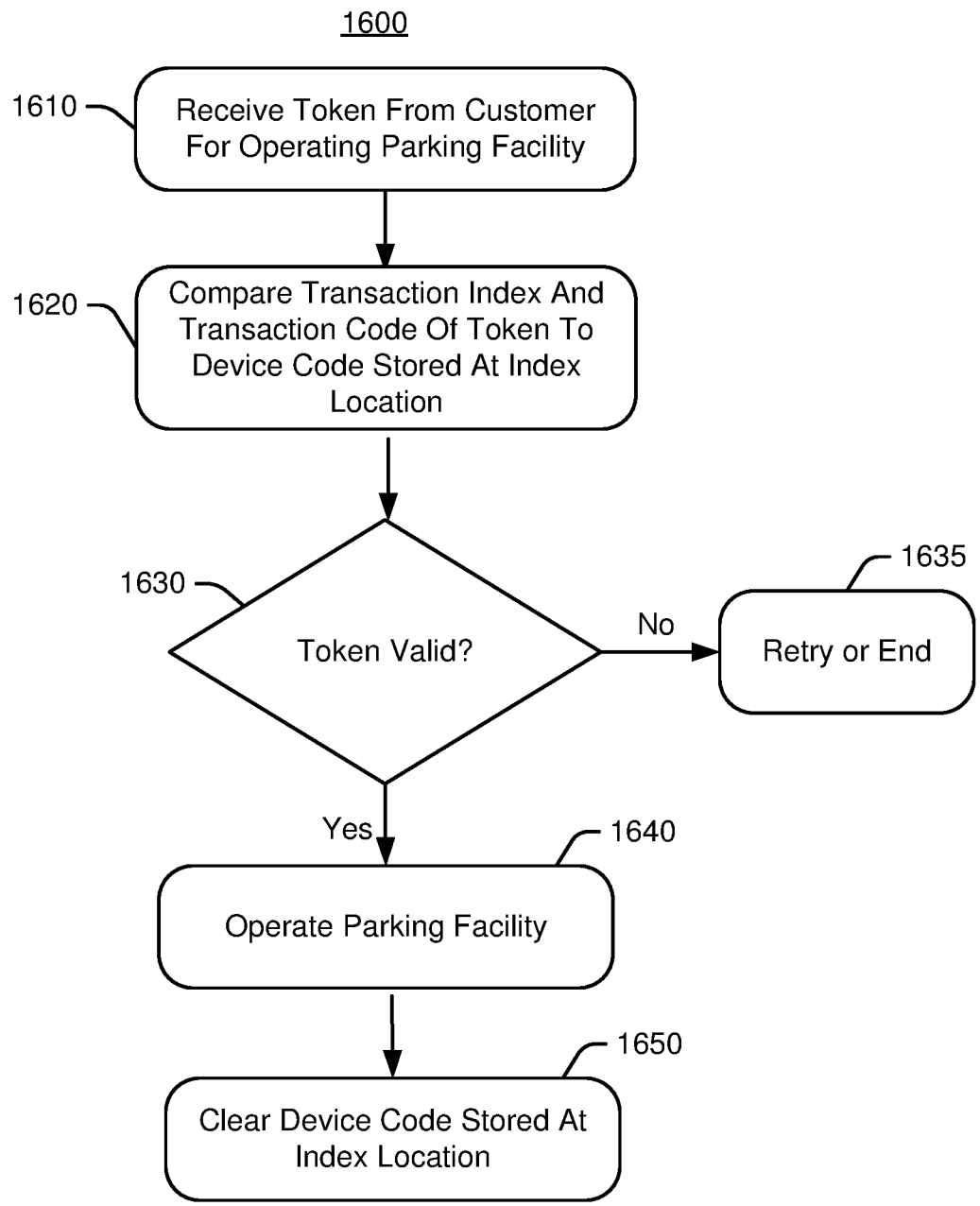
FIG. 16 is a flow chart illustrating example operations to implement a secure payment method at a parking facility.

FIG. 16 is a flow chart illustrating example operations 1600 of a token handler to implement a digital payment method. In operation 1610, the token handler for the parking facility receives a token from the customer (e.g., the token issued to the customer by the token provider in operation 740). The token handler may receive the token from the customer's mobile device via a BLUETOOTH™ or other near-field communication protocol. In an example, the token includes a hex value representing the transaction code and the transaction index.

In operation 1620, the token handler compares the transaction index and transaction code of the token to a device code stored at corresponding index location at the token handler. For example, the token handler may translate the hex value to determine the transaction code and the transaction index, and then compare these to the corresponding device code stored at the associated index location at the token handler.

In operation 1630, the token handler determines whether the token is valid. If the token is not valid, operations at the token handler may end with operation 1635. In another example, the token handler may issue feedback to the user (e.g., to retry by sending a different token).

If the token is valid, the token handler may negotiate the transaction at operation 1640. In an example, the token handler may activate, set (or add) a time duration for the customer to use the parking facility.

In operation 1650, the token handler clears the device code stored at the index location so that the token cannot be reused.

Example operations are illustrative and not intended to be limiting. The ordering of operations is not limited to the ordering shown in the drawings. Still other operations are also contemplated, as will become readily apparent to those having ordinary skill in the art after becoming familiar with the teachings herein.

Laundry Facility.

Secure electronic payment is also disclosed which may be implemented for laundry facility equipment. For example, secure electronic payment may be implemented to pay for use of a laundry machine (e.g., washer, dryer, soap dispenser, or other laundry facility equipment) using an electronic device such as, but not limited to, a mobile phone, without needing to have a physical credit card or traditional cash on hand. In an example, a user (e.g., a customer) may issue a request for a transaction for a laundry machine at the laundry facility. The request is processed to confirm payment, and a token (e.g., a secure digital certificate such as an electronic data file) is issued to the customer.

The customer may then transmit (e.g., wirelessly transmit) the token to a token handler for a laundry machine. In an example, the token handler is provided on (or as an integral part of) an individual laundry machine (e.g., a clothes washer or clothes dryer). In another example, the token handler is provided in the laundry facility remote from the individual laundry machines, and the token handler is interconnected (wired or wirelessly) to the individual laundry machines to actuate operation of a selected laundry machine. The token handler validates the token and negotiates the transaction (e.g., actuate operation of the selected laundry machine).

An example token handler includes a wireless certificate reader configured to receive a digital certificate or "token" from a mobile computing device. In use, a mobile computing device (e.g., mobile phone) may include an installed application or "app". When the mobile computing device is activated via the app, it searches for any token handlers in the area (e.g., a laundry facility) which may be operated with the digital payment system. In an example, the app may display a list of token handlers in the user's vicinity which accept payment via the secure payment system. In other examples, the customer may manually identify the token handler (e.g., by entering an ID for a laundry machine and/or laundry facility in the app).

It is noted that the wireless certificate reader does not need to establish a connection to the payment provider or other entity. As such, the token handler does not need to be configured with an expensive to install and maintain modem or other communications system. The wireless certificate reader can instead be a BLUETOOTH™ or other near-field communication protocol for communicating with the mobile computing device in proximity to the token handler.

In addition, the laundry machine and/or laundry facility does not need to be in an area having mobile phone/data service. For example, the user may request a token at their home, and then use that token at a laundry machine or laundry facility that is out of a service area by providing it to the token handler for the laundry machine via the BLUETOOTH™ or other near-field communication protocol.

In an example, data to validate the token received at the token handler is stored in the local memory of the token handler before a transaction is initiated at the token handler. As such, no communication connection is required between the digital payment system and the third party payment system. This enables use of the digital payment system without having to provide expensive communication connections in each laundry facility and/or laundry machine.

The token may be a one-time-use digital certificate. In an example, after the token has been confirmed and the transaction negotiated (i.e., the laundry machine has been actuated), the corresponding information stored in the token handler may be "wiped" clean (e.g., the code set to zero or otherwise erased). This helps ensure that the goods and/or services delivered by the token handler have been paid for and that the same digital certificate is not being re-used. In another example, the token may include an expiration, so that a customer cannot purchase tokens in advance to avoid price increases.

In an example, the secure payment system may operate with a third-party payment processor to handle payments for the user without the user having to provide any credit card or other form of payment (or personal or other information) at the laundry machine (or the owner or anyone operating the laundry facility). For example, the user may have already provided payment information (e.g., credit card or bank account information) to the third-party payment processor, who is a trusted payment processor such as the user's bank, credit card issuer, direct carrier billing (e.g., billing to a cell phone account), digital currency, or other payment service, and therefore the user does not have to provide any payment information to the token handler or the token provider. As such, the secure payment system reduces the opportunity for fraud, while providing the user with the convenience of a so-called "cashless" transaction. Likewise, the owner of the laundry machine or laundry facility receives payment from a trusted third-party payment processor without risk that the payment form (e.g., credit card) is stolen or unauthorized.

It is noted that the systems and methods described herein are not limited to any particular type of laundry facility, laundry machine, mobile device, and/or payment processor. The digital payment system may be used in an attended and/or unattended environment, and may be used to enable operation of any type of laundry machine and/or to provide product (e.g., detergent, softener, etc.).

Figure 17A:
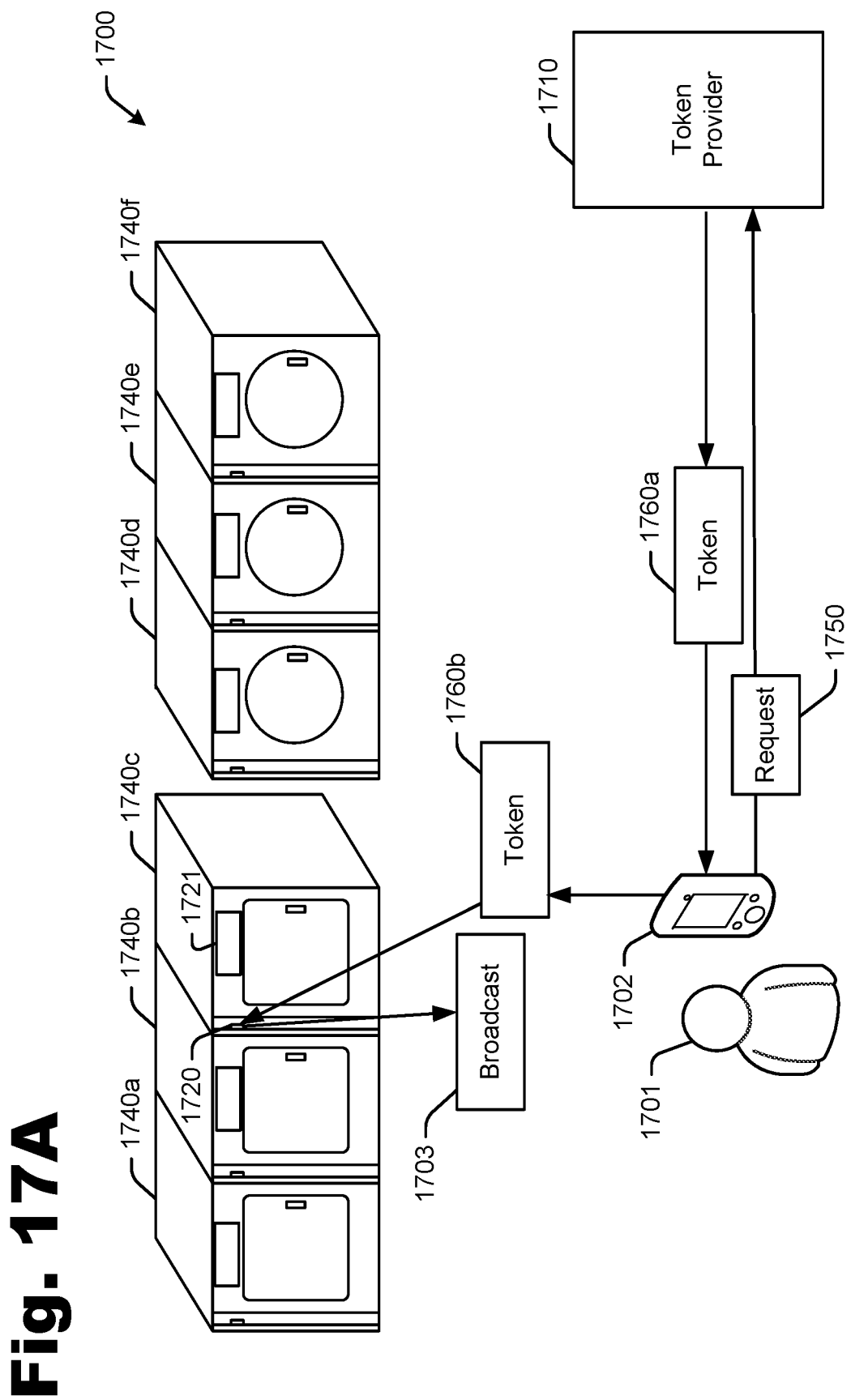
FIG. 17A is an illustration of an example secure payment system implemented by a laundry machine.
Figure 17B:
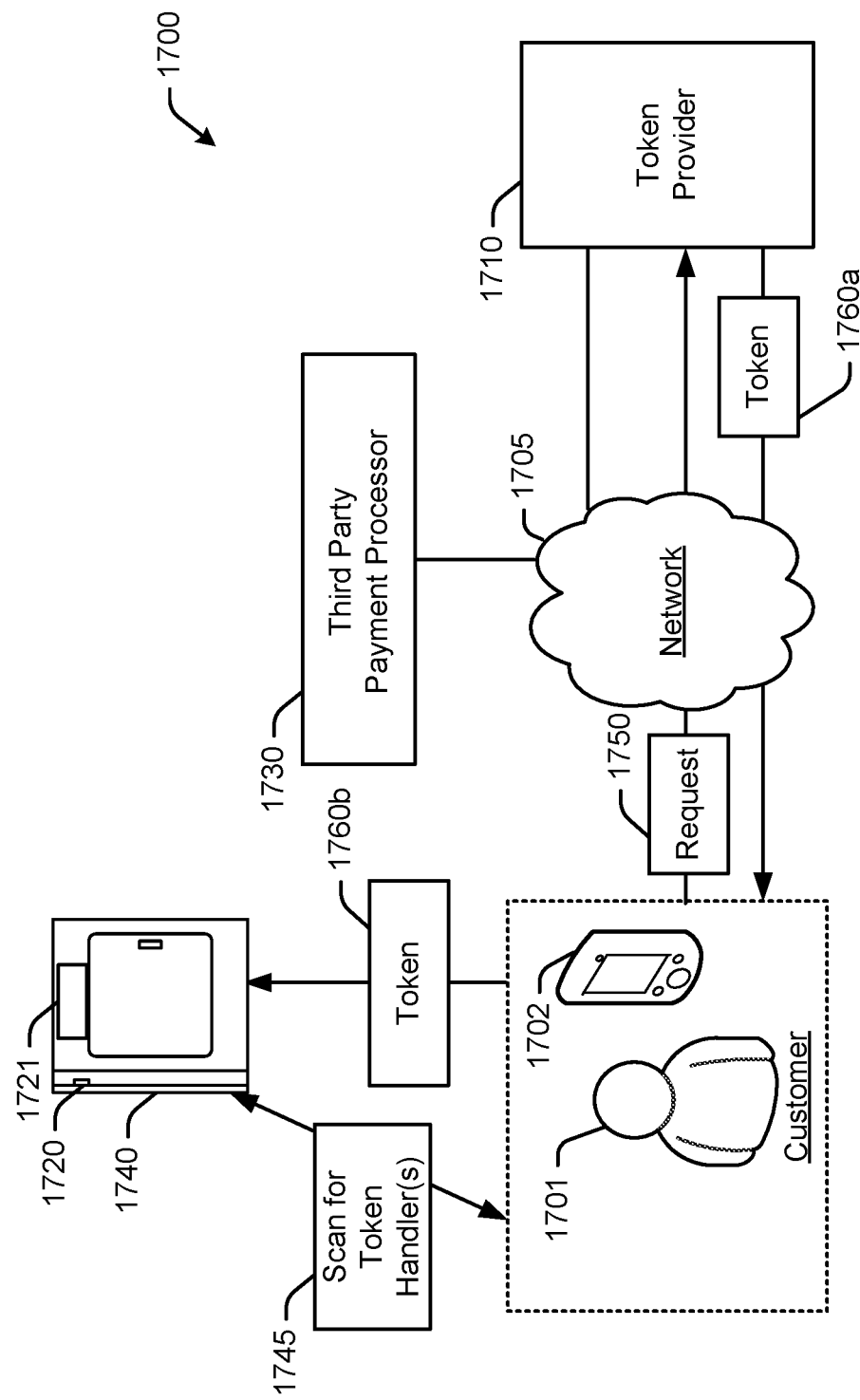
FIG. 17B is a block diagram of an example secure payment system for a laundry machine.

FIG. 17A is an illustration of an example secure payment system 1700 as it may be implemented for a laundry machine. FIG. 17B is a block diagram of an example secure payment system 1700. System 1700 may be implemented with any of a wide variety of computing devices. Each of the computing devices may include memory, storage, and a degree of data processing capability at least sufficient to manage a communications connection either directly with one another or indirectly (e.g., via a network). At least one of the computing devices is also configured with sufficient processing capability to execute program code and/or other logic described herein.

In an example, the secure payment system 1700 may be implemented by a token provider 1710 providing a digital payment service accessed by a user 1701 via a client device 1702 (referred to herein collectively as the "customer"). The client device 1702 may be any suitable computer or computing device (e.g., laptop computer or other mobile device such as a phone or tablet) capable of accessing a third party payment processor 1730.

Of course, the token provider 1710 and client device 1702 are not limited to any particular type of devices (e.g., watches and other wearable technology), and may also include other devices that are traditionally not considered to be a part of the mobile environment (e.g., desktop computing devices or terminals).

In an example, the secure payment system 1700 may be implemented with one or more communication network 1705, such as a local area network (LAN) and/or wide area network (WAN) and/or other communications platform such as a mobile communications network. In an example, the network includes the Internet and/or other mobile communications network (e.g., a 3G or 4G mobile device network).

In an example, the secure payment system 1700 provides a way for the user 1701 to pay to use laundry machine(s) 1740*a-f* (referred to generally herein as laundry machine 1740), using the user's own mobile device 1702, via the digital payment service implemented by the token provider 1710, but without having to provide payment at the laundry machine 1740 because access to payment information is maintained by third party payment processor(s) 1730 (e.g., a bank or credit card company).

In use, a mobile device 1702 (e.g., a mobile phone) may include an installed application or "app". When the mobile device 1702 is activated via the app, the mobile device 1702 searches 1745 for any laundry machines 1740 in the area which are configured for operation in the environment of the secure payment system 1700. In an example, the laundry machine(s) 1740 may broadcast 1703 its presence. The mobile device 1702 within range of the broadcast enables the app may display a list on the mobile device 1702 of laundry machines in the user's vicinity which are configured to accept payment via the payment technique described herein. In another example, the laundry machines 1740 may be pre-stored in a database accessed by the app via the Internet.

In an example, the user may issue a request 1750 to the token provider 1710. The request 1750 may include the laundry machine ID (e.g., a number shown on the laundry machine) or other identifying information. The request 1750 may also include other information about the intended purchase (e.g., laundry machine location and time of use) and a payment authorization. For example, the amount of payment may be displayed for the user by the app for the user to accept or approve the item and amount. The user may then select a third party payment processor 1730 (e.g., a bank, credit card, or mobile phone service carrier) from the app. This information may be transmitted in the request 1750 to the token provider.

The token provider 1710 then confirms payment via the third party payment processor 1730. For example, the token provider 1710 may issue a payment authorization to a third-party payment processor 1730, and receive payment approval from the third-party payment processor. After confirming payment, the token provider 1710 may generate a token 1760*a* and issue the token 1760 to the user's mobile device 1702.

After receiving the token 1760*a*, the user may then complete the transaction by the token handler 1720 at the laundry machine 1740. In an example, the laundry machine 1740 is configured with a token handler 1720 operatively associated with a control board 1721 on the laundry machine 1740 (e.g., configured to select a wash or dry cycle and/or other functions at the laundry machine 1740). The token handler 1720 may have a wireless certificate reader configured to receive a token 1760*b* from the mobile device 1702. The token 1760*a* and 1760*b* may be the same token provided by the token provider 1710, or token 1760*b* may undergo at least some degree of processing at the mobile device 1702 before being issued to the token handler 1720 at the laundry machine 1740.

The token handler 1720 at the laundry machine 1740 may then process the token 1760*b* to confirm payment by the user 1701. If payment is confirmed, then the token handler 1720 at the laundry machine 1740 may negotiate the transaction (e.g., starting or continuing operation of the laundry machine).

As such, the system 1700 provides a way for the user 1701 to pay for use of the laundry machine 1740, using the user's own mobile device 1702, but without having to provide direct access to payment details because those are maintained by third party payment processor(s) 1750 (e.g., a bank or credit card company).

In an example, various operations of the secure payment system 1700 may be implemented at least in part by program code and/or logic circuitry. Program code and/or logic used to implement features of the system can be better understood with reference to the following discussion and various example functions. To the extent program code is implemented, machine-readable instructions may be stored on a non-transient computer readable medium and are executable by one or more processor to perform the operations described herein. Examples of program code may include an end-user mobile device application (or "app"), payment processing application(s), host application (e.g., for generating the token in response to receiving confirmation of payment), and/or a token handling application (e.g., for validating the token received from the end-user device and actuating a laundry machine). Of course, the operations described herein are not limited to any specific implementation with any particular type of program code or logic.

It is noted, however, that the secure payment system 1700 is not strictly data handling or program code for manipulating data in the traditional sense. That is, the secure payment system 1700 may be implemented at least in part in program code (e.g., for generating the token and for various of the transmission protocols). It is to be understood that the secure payment system 1700 is also implemented by device hardware which goes beyond a mere computing device provided to execute the program code. Example device hardware may include a wireless certificate reader with a communications interface (e.g., to the mobile device). Example device hardware may also include electronic actuators, motors, timers, and/or other electronics which operate the laundry machine 1740 in response to input from the wireless certificate reader and/or other processing device confirming payment.

These and other aspects of the secure payment system 1700 will be described in more detail below such that the device hardware can be readily implemented by one having ordinary skill in the art after becoming familiar with the teachings herein.

Figure 18A:
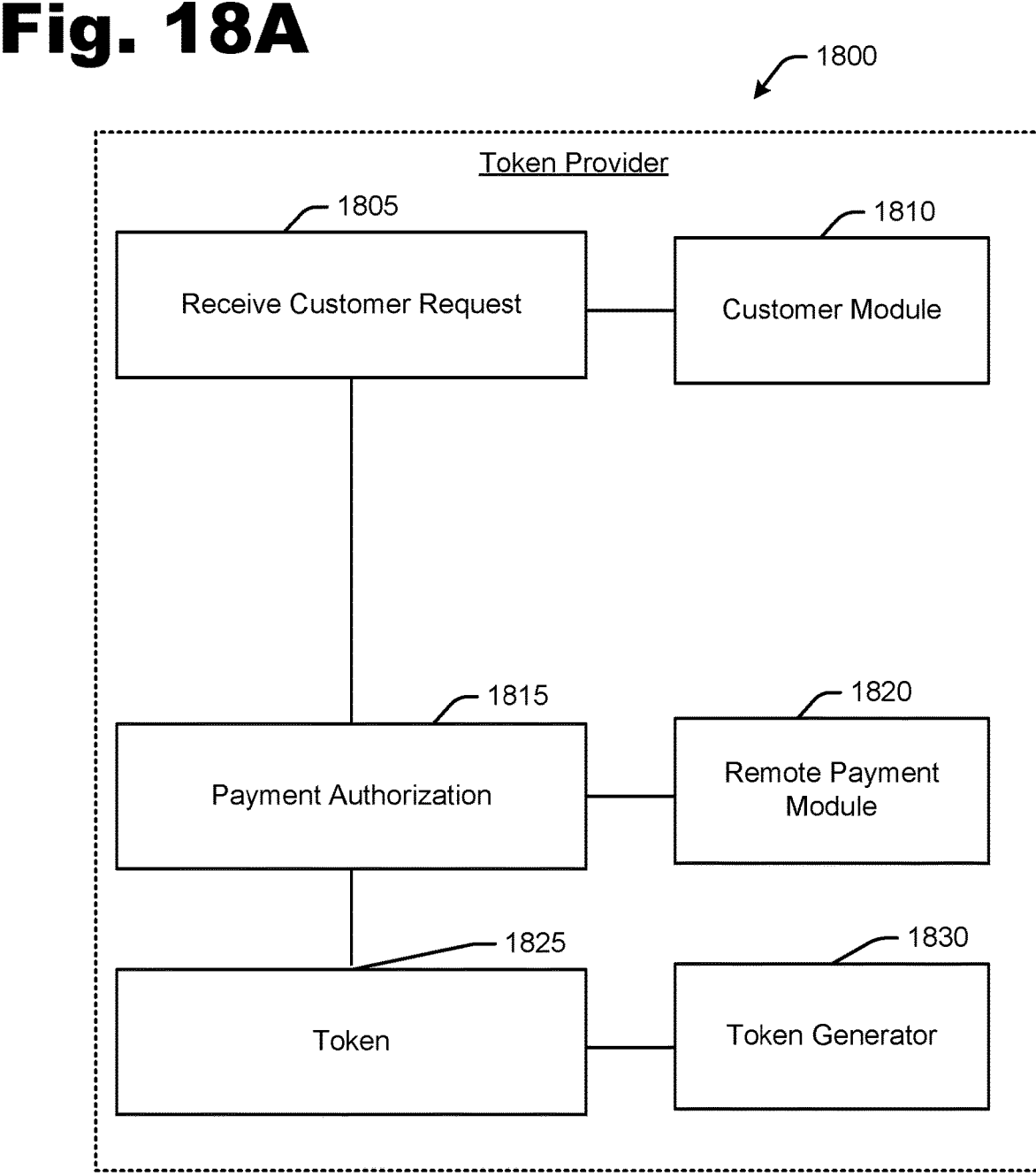
FIG. 18A is a high-level diagram of a token provider of the secure payment system for a laundry machine.

FIG. 18A is a high-level diagram of a token provider 1800 (e.g., token provider 1710 in FIG. 17B) of the secure payment system. The token provider 1800 may receive a request 1805 for a transaction (e.g., including a payment amount) at a token handler 1720 at the laundry machine 1740 via a customer module 1810. In an example, the request 1805 may include information about the laundry machine 1740 (e.g., identifying information). The token provider 1800 issues a payment authorization 1815 via a remote payment module 1820 to a third-party payment processor. It is noted that the token provider 1800 does not actually receive any payment or other personal or confidential payment information from the customer. This information remains confidential as between the customer and the third party payment processor (e.g., the customer's bank or credit card processor). The token provider 1800 receives payment approval from the third-party payment processor. The token provider 1800 includes a token generator 1830 to generate a token 1825 and issues the token 1825 to the customer so that the customer can complete the transaction at the token handler device configured for operating the laundry machine.

Figure 18B:
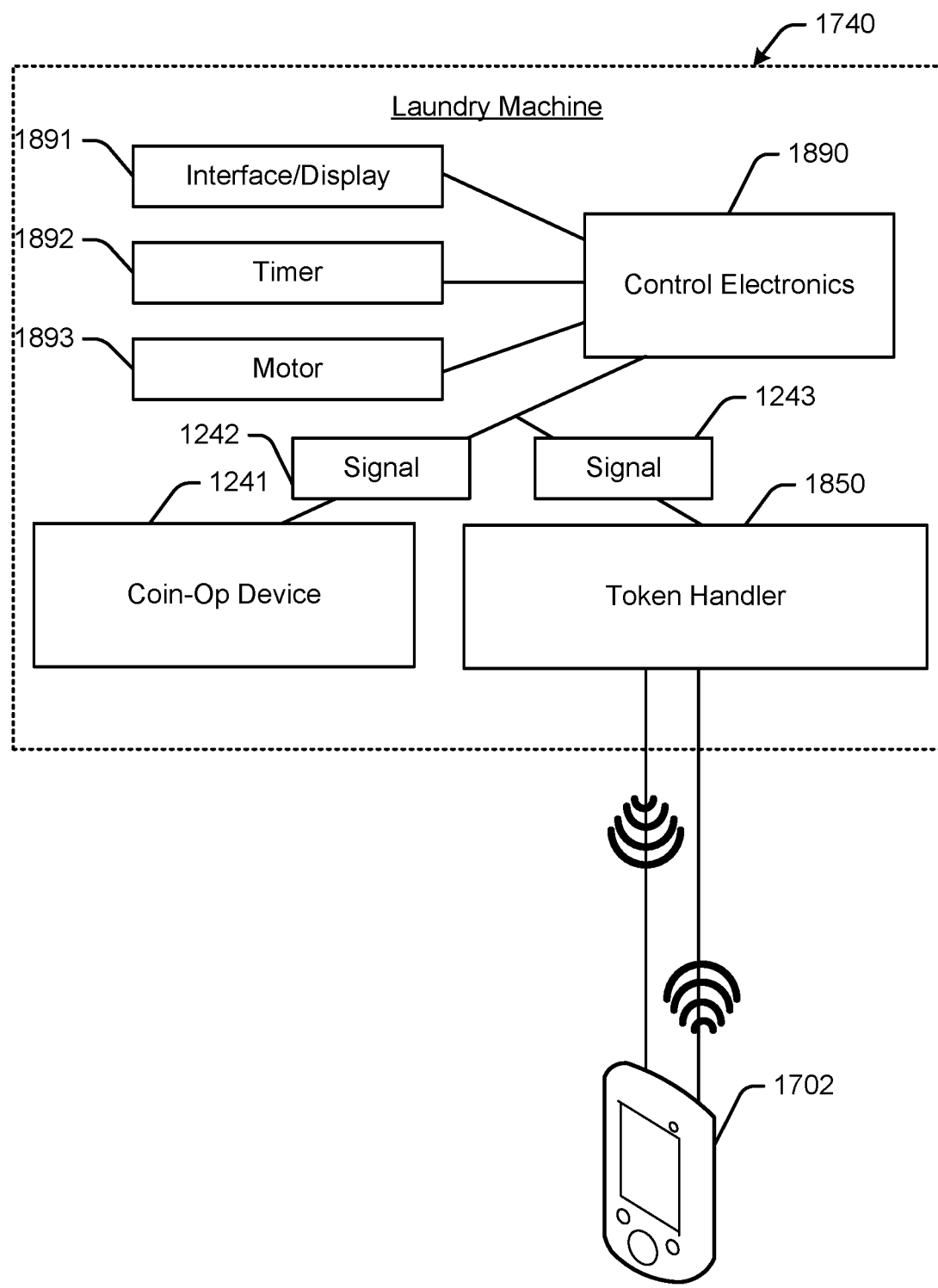
FIG. 18B is a diagram of a token handler of the secure payment system for a laundry machine.

FIG. 18B is a diagram of a token handler device 1850 of the secure payment system for a laundry machine (e.g., token handler 1720 for the laundry machine 1740 in FIGS. 17A and 17B). FIG. 18B illustrates an example where a laundry machine 1740 having an existing coin-operated interface is retrofitted with the token handler device 1850 disclosed herein. In an example, retrofitting the token handler device 1850 may enable operation of the laundry machine 1740 by either the existing coin-operated interface 1741 and/or via the token handler device 1850. For example, the token handler 1850 may be wired between the coin-op device 1741 and the control electronics 1890. In an example, the token handler 1850 is connected between the coin-op device 1741 and the control electronics 1890 without having to cut the existing wiring, e.g., by a coupler that splices through the wire insulation to make an electrical connection with the wiring by press-fit without having to cut the wires. It is noted, however, that the laundry machine 1740 does not need to be retrofitted with the token handler device 1850, and the laundry machine 1740 can also be configured from the start with the token handler device 1850.

In an example, the coin-op device 1741 generates an electrical signal 1742 or pulse in response to receiving coins. For example, each quarter may generate an electrical pulse thereby indicating a total dollar amount at the control electronics 1890. For example, each time a user inserts a quarter, an electrical pulse is issued to the control electronics and the total dollar amount entered is displayed for the user (e.g., $0.25, $0.50, etc.) until the dollar amount is displayed for the desired function (e.g., $1.25 for a light duty wash cycle or $2.25 for a heavy duty wash cycle).

In an example, the token handler 1850 is configured to generate an electrical pulse for each token received by the token handler, or multiple electrical pulses for the total dollar value of the token. For example, the token handler 1850 may generate individual electrical pulses for each $0.25 token received. Or if a token is received having a value of $1.25, the token handler 1850 may generate five electrical pulses to inform the control electronics 1890 of the dollar value received. The laundry machine 140 can then be operated similarly to the user inserting coins in the coin-op device 141.

Figure 18C:
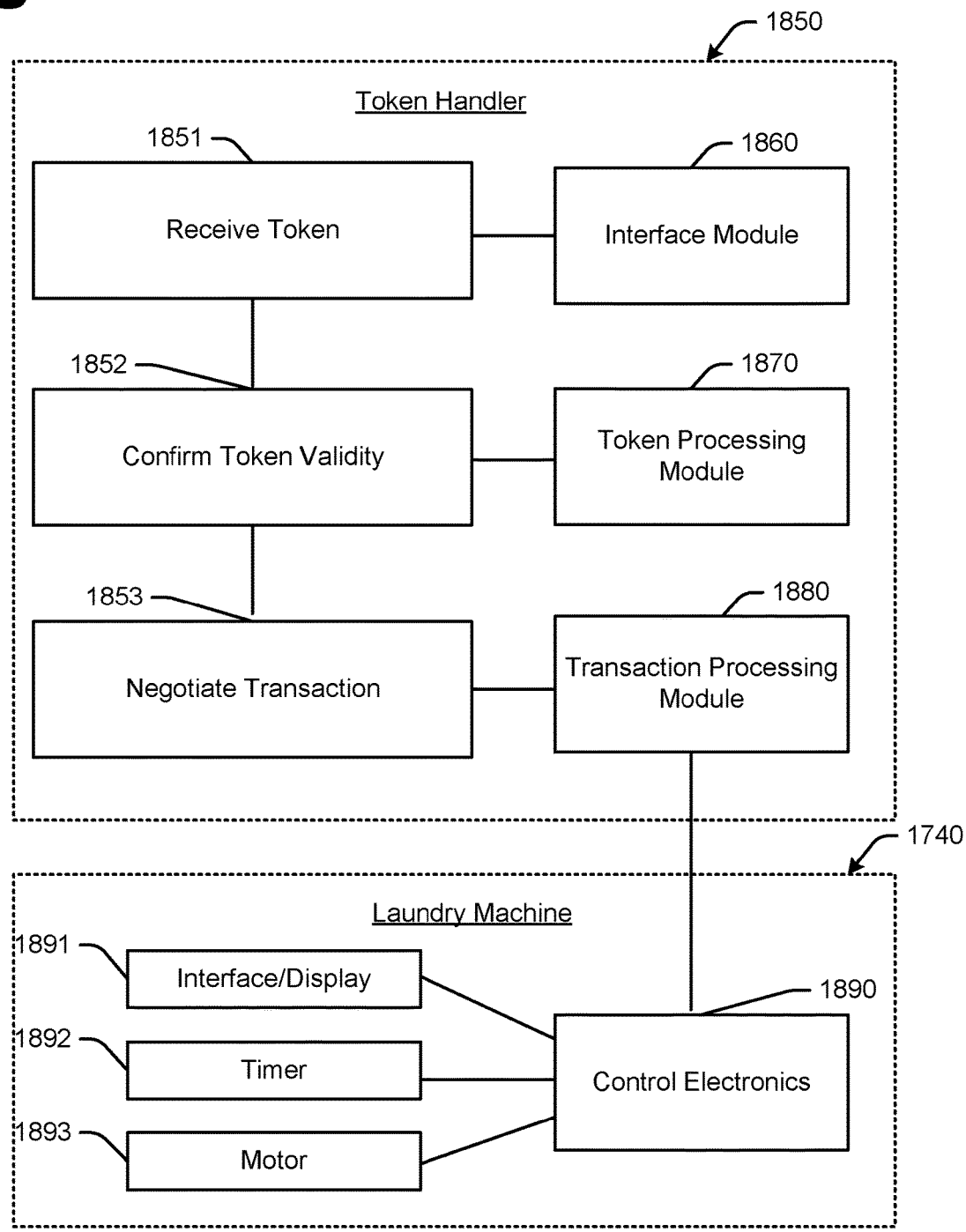
FIG. 18C is another diagram of a token handler of the secure payment system for a laundry machine.

FIG. 18C is another diagram of a token handler device 1850 of the secure payment system for a laundry machine (e.g., token handler 1720 for the laundry machine 1740 in FIGS. 17A and 17B). Although shown as separate entities in FIG. 18C, as already noted above the token handler 1850 may be mounted in or otherwise provided at the laundry machine 1740; or the token handler 1850 may be provided at physically remote location from the laundry machine 1740.

In an example operation, the token handler device 1850 receives a token 1851 from the customer (e.g., the token 1825 issued to the customer by the token provider 1800 in FIG. 18A) via an interface module 1860. The token handler device 1850 may receive the token 1851 from the customer's mobile device via a BLUETOOTH™ or other near-field communication protocol. A token processing module 1870 compares data value(s) of the token to data value(s) stored at the token handler device 1850. For example, the token processing module 1870 may translate the hex value to determine the transaction code and the transaction index, and then compare these to the corresponding device code stored at the associated index location.

The token handler device 1850 confirms that the token is valid at 1852. If the token is valid, a transaction processing module 1880 may negotiate the transaction 1853 for the laundry machine. In an example, the transaction processing module 1880 may actuate control electronics 1890 of a laundry machine 1740, for example by issuing a signal to the control electronics 1890. The control electronics 1890 may include a computer board on the laundry machine 1740 which in turn actuates the laundry machine, such as an interface or display 1891 on the laundry machine (e.g., to start/stop or select a wash cycle on the laundry machine), a timer (e.g., to set or add a time of operation of the laundry machine), a motor (e.g., to drive the clothes tumbler). Other components and/or functions can also be controlled by actuating via the token handler device 1850, such as but not limited to different cycles (e.g., heavy duty, rinse, spin, etc.).

It is noted that the term "module" as used herein means electronic devices (e.g., logic circuitry) and/or machine readable instructions (e.g., firmware) specifically configured to carry out the operations described herein.

FIG. 3 illustrates example communication and commands 300 which may be implemented by the secure payment system. First, a communications connection may be established. According to the BLUETOOTH™ protocol (e.g., BLUETOOTH™ LE or "BLE," BLUETOOTH™ 4.0, and BLUETOOTH™ Smart), the token handler has a role of a server or peripheral device, and the user's mobile device has a role of a client or central device.

The token handler advertises its presence (e.g., every 1.00 to 1.25 seconds). The mobile devices scans for nearby token handlers at an interval that is less (e.g., faster) than the advertise interval. In an example, the scan interval and window can be configured with the mobile device. The mobile device may have two methods of scanning for devices (e.g., scan for all devices, or scan only for devices offering a specific service). The latter example is by scanning for a specific UUID that represents a service. By way of illustration, the token handler is represented by the following UUID: c9cab968-3abf-4043-a5af-9ad00c6074d5.

After executing the Generic Access Protocol (GAP) to find a device, the Generic Attribute Profile (GATT) can be executed for "service discovery" to find the supported "characteristics" for each service. Each characteristic has an associated UUID and handle, and can be read or written. In an example, UUID's have two lengths (e.g., 16-bit UUID is a standard service or characteristic described by the Bluetooth specification, or a 128-bit UUID is a custom service that is vendor specific). The following table illustrates services and characteristics supported by the token handler in an example.

TABLE 2

Services Provided By Token Handler

| | |
|---|---|
| 1800 | GAP Service |
| 2A00 | Device Name |
| 2A01 | Appearance (0 = Unknown) |
| 180A | Device Information Service |
| 2A29 | Manufacturer Name String (Clancy Systems) |
| 2A24 | Model Number String (Clear Token Meter) |
| 2A27 | Hardware Revision String (B) |
| 2A26 | Firmware Revision String (001.003.000.110) |
| 2A28 | Software Revision String (1.31) |
| c9cab9b8-3abf-4043-a5af-9ad00c6074d5 | Token Handler Service |
| 0f314942-e257-46a9-a8c8-4c8ecee2cf2b | ID (currently the 5 character ID on label, e.g. AAA01) |
| d5dee9b5-456f-4baa-ad5c-a3f14fd2653c | Command |
| 2902 | Client Characteristic Configuration (for Command) |
| d5dee9b6-456f-4baa-ad5c-a3f14fd2653d | Beacon Data (Data1) |

In the table above, three services provided by the token handler are shown in boldface font. Below each service are the characteristics for each service. The characteristics can be read or written to obtain the values. A handle is assigned to each characteristic. There are routines used to determine the handle based on UUID.

In this example, a GAP service has two characteristics. Device name is currently the ID of the Clear Token Device. The Appearance always reads zero ("unknown") because the CTD doesn't fall into a pre-defined category of Heart Rate Monitor, Phone, etc.

Some devices (e.g., APPLE™ devices) require that a Device Information Service be provided on each Bluetooth device. The characteristics are self-explanatory.

The Token Handler Service has three characteristics and one Client Characteristic Configuration. The ID is read only and is the ID that is on the label of the meter. The command characteristic can be written and a return code can be read. Before the command characteristic can be used, a value of 0001 is written to the Client Characteristic Configuration. Some Bluetooth stacks do this automatically. Also, some clients may need to send the value as 0100 instead of 0001. Other examples are also contemplated.

Commands and data can now be exchanged with the token handler. Commands are sent to the token handler by writing up to 20 bytes to the Command characteristic handle. Data is received back through the same handle with "notification".

After communication, the connection is disconnected. The token handler finishes carrying out any tasks, then goes back to sleep. This strategy helps to minimize connection time to the token handler device to conserve battery power.

In an example, the commands and data are in arrays of bytes, with values from 0x00 to 0xFF. The number of bytes sent or received through the FIFO handle is 20 or less at a time. All commands to the CTD begin with a 0x40 (@). The next byte in the array is the number of remaining bytes in the command. In an example, the general format of a command is @N C P P I I T T, where:
  @=0x40
  N=Number of bytes to follow
  C=Command code (1 byte)
  P=Parameters for the command (number of bytes varies with each command)
  I=Index of the validating token (2 bytes, most significant first)
  T=validating token (2 bytes, most significant first)

To make the process even more secure, the code can be sent from the user's mobile device as a two part message, wherein part one is a gatekeeper command or message including a unique code and informing the token handler at the laundry machine that part two is following, and then another unique code is sent as part two as an activating command or message. This technique implements two codes for each transaction.

In this example, all replies from the CTD begin with a 0x52. The next byte in the array is the remaining number of bytes in the reply. In an example, the general format of a reply is: R N S, where:
  R=0x52
  N=number of bytes to follow
  S=status (0x01 if command was successful or 0x00 if there was an error)

Validating tokens may also be implemented with the commands. For example, there may be 65536 index positions (0-65535), with each index containing a token with a value from 1-65535. Once a token is used, it is zeroed to prevent re-use and thus reduce fraud.

If an incorrect index/token combination is received, the device responds with a status of 0x00, and not respond to further commands until some time has passed.

Figure 19:
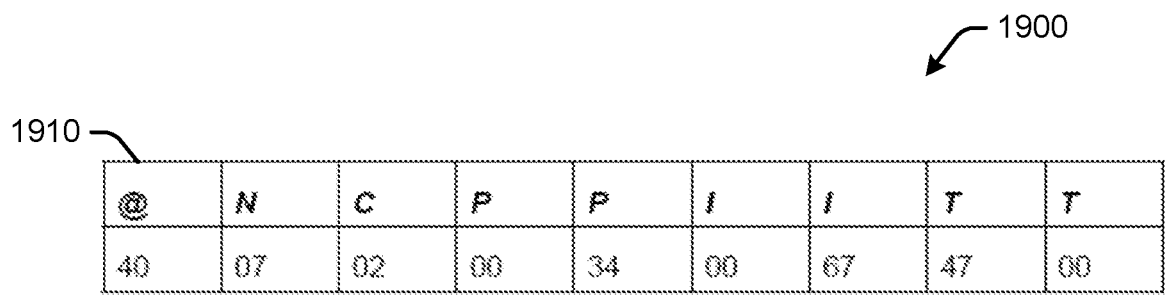
FIG. 19 illustrates example communication and commands which may be implemented by the secure payment system for a laundry machine.

In FIG. 19, the following abbreviations are used:
  @=0x40—Start of the command
  N=Number of bytes to follow
  C=Command Code
  P=Time (used in Closure & Backlight)
  I=Index Value
  T=Token Value
  H=Hours
  M=Minutes
  S=Seconds
  R=Reset (00=No Reset—01=Reset)

Command 1910 is an example Contact Closure Command. This command closes the relay contact for the specified length of time. The length of time the contact remain closed is the number of 3.90625 millisecond units (1/256 of a second) specified with 2 bytes. For example, to close the contact for 1 second, a value of 0x0100 is used; to close the contact for a half second, a value of 0x0080 is used. A value of less than 0x0034 (200 mS) should not be used for this example. @N C P P I I T T, where:
  @=0x40
  N=0x07, number of bytes to follow
  C=0x02
  P=length of time for contact closure, MSB first, range 0x0034-0xFFFF I=index of validating token, MSB first
  T=validating token, MSB first
  Reply: R N S R=0x52, where:
  N=0x01, number of bytes to follow
  S=0x01 if command and token were successful, 0x00 if index/token was not valid or some other error.

Other commands (not shown in FIG. 19), include by way of illustration, an Enable Beacon Command (0x05). This command enables the token handler to alternate advertising between any of several supported beacon formats. For example, with the uriBeacon, the final 18 bytes of the advertisement data are the encoded URL including prefix byte. This data is written to the GATT attribute database (Beacon Data, see table above) prior to sending the command. In another example, with the iBeacon, 20 bytes of the advertisement data are the UUID and the "major" and "minor" fields. This data is written to the GATT attribute database (Beacon Data, see table above) prior to sending the command.

The rate at which advertising packets are sent doubles when the beacon function is enabled, thus impacting battery life. @N C B I I T T, where:
@=0x40
N=0x06, number of bytes to follow C=0x05
B=0: no beacon, 1: uriBeacon, 2: Apple iBeacon I=index of validating token, MSB first T=validating token, MSB first
Reply: R N S R=0x52 N=0x01
S=0x01 if command and token were successful, 0x00 if index/token was not valid or some other error.

In another example, a Change Transmit Power Command (0x06) changes the transmit power of the CTD. In an example, there are three power levels: low, medium, and high. The default transmit power level after cycling the device power is medium. @N C P I I T T, where:
@=0x40
N=0x06, number of bytes to follow C=0x05
P=0: Low, 1: Medium (default), 2: max I=index of validating token, MSB first
T=validating token, MSB first
Reply: R N S R=0x52 N=0x01
S=0x01 if command and token were successful, 0x00 if index/token was not valid or some other error.

In another example, a Contact Pulse Command (0x08) momentarily closes (pulses) the relay contact, a specified number of times, for a specified length of time, with a specified spacing between pulses. This can be implemented to mimic coins passing through a coin acceptor in vending applications. @N C P D S I I T T, where:
@=0x40
N=0x08, number of bytes to follow C=0x08
P=Number of pulses, 0-255 (0x00-0xFF)
D=Pulse duration, 1=200 mS, 2=500 mS S=Time between pulses, 1=200 mS, 2=500 mS, 3=one second.
I=index of validating token, MSB first T=validating token, MSB first
Reply: R N S R=0x52
N=0x01, number of bytes to follow
S=0x01 if command and token were successful, 0x00 if index/token was not valid or some other error.

The above example commands are provided for purposes of illustration, but are not intended to be limiting. Still other commands are contemplated as being within the scope of the disclosure herein, as will be readily appreciated by those having ordinary skill in the art after becoming familiar with the teachings herein.

Figure 20:
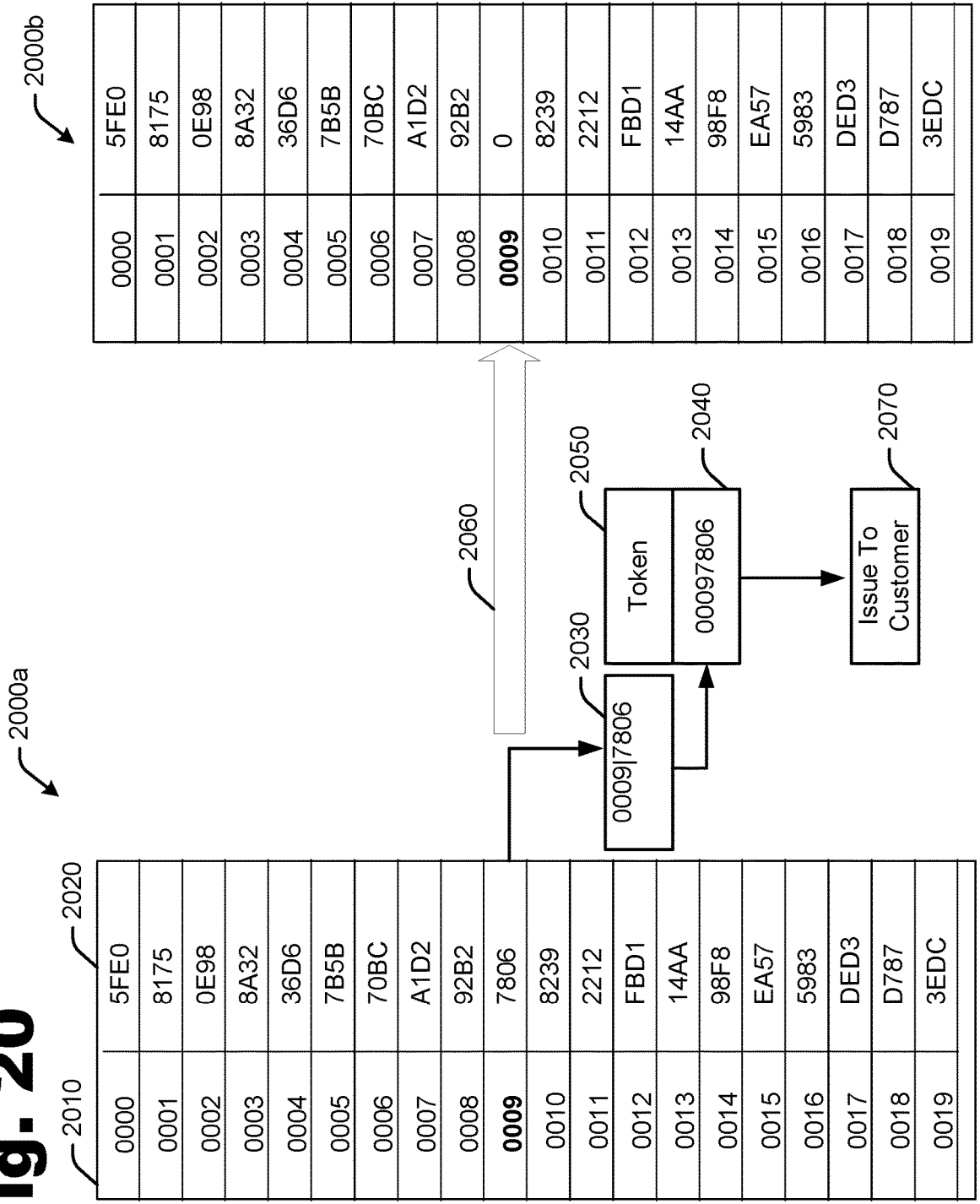
FIG. 20 illustrates an example coding scheme to build a token.
Figure 21:
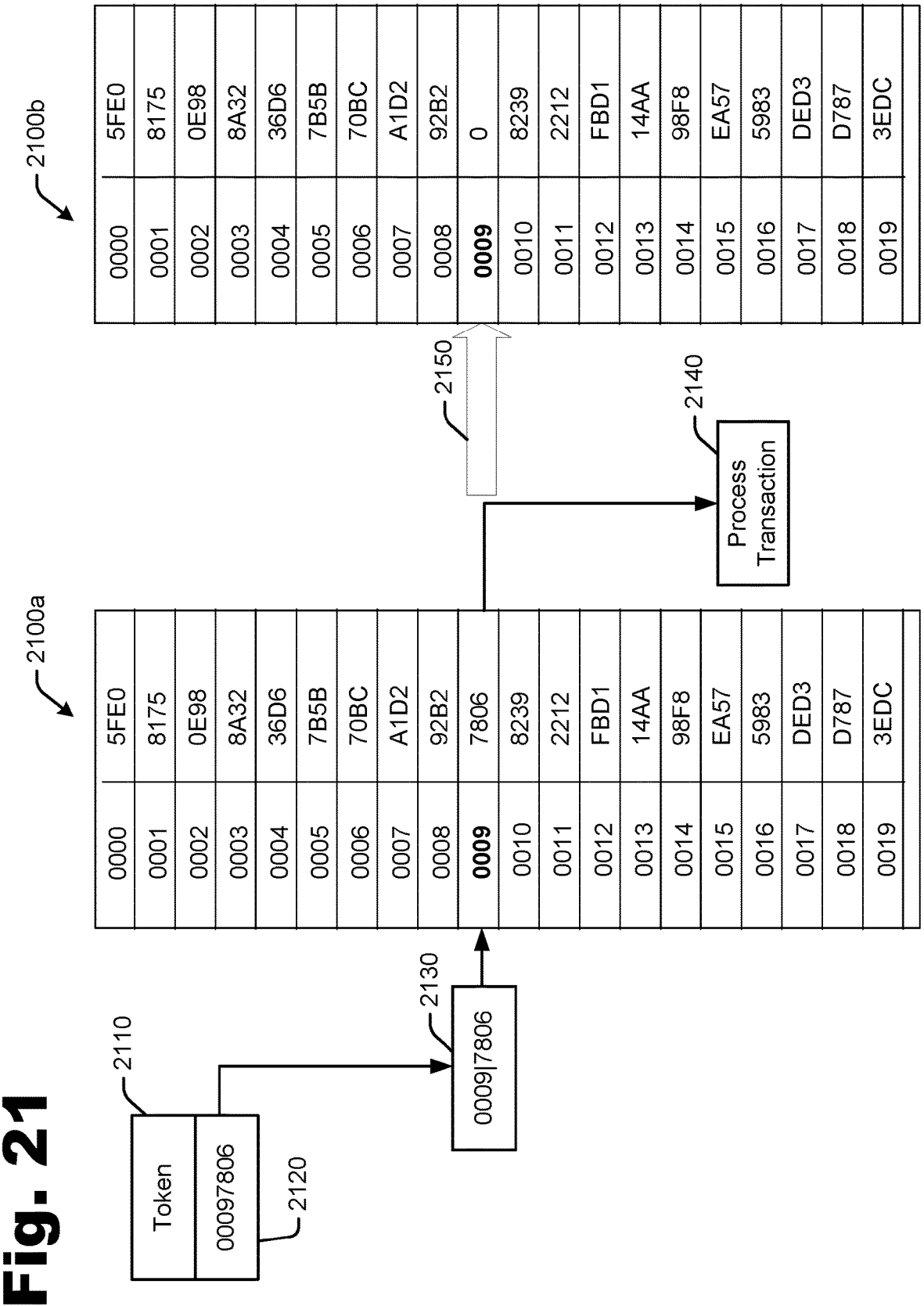
FIG. 21 illustrates an example coding scheme to validate a token and process a transaction at a laundry machine.

FIG. 20 illustrates an example coding scheme to build a token at a token provider. FIG. 21 illustrates an example coding scheme to validate the token illustrated in FIG. 20, and process a transaction by a token handler at the laundry machine. The tables 2000a-b in FIG. 20 and tables 2100a-b in FIG. 21 illustrate a code sample (the first 20 entries of 65,536 entries are shown). The first column represents an index (1 through the number of entries), and the second column represents the corresponding code for the index entry. The codes shown in FIG. 20 may be stored at the token provider (e.g., token provider 1710 shown in FIG. 17B) and used to generate the token. These same codes (shown in FIG. 21) may also be written to the token handler at the laundry machine by "injecting" the codes in hardware stored in or associated with the token handler at the laundry machine. Each token handler includes its own set of unique codes in an indexed array, stored in memory internal to the token handler at the laundry machine.

During set up, the token handler may be read (e.g., for device ID or location number, and a corresponding code). The codes may be compared to a database record stored by the token provider. If there is a match, then the token handler has been properly set up, and is ready for use by the customer.

During use, the user may open a phone app and select the location or other ID of the laundry machine. The location or other ID of the laundry machine may be transmitted by nearby mobile devices (e.g., using Bluetooth or other communications protocol), or the user may manually enter the location or other ID. A request is generated on the user's mobile device, including the location and/or other information for the laundry machine. Additional information may also be included in the request (e.g., operating time for a laundry machine, ID number for the laundry machine). The user may also select a payment processor (e.g., a bank, credit card processor, PayPal®, etc.) to be included in the request. The user may be prompted to use the last payment processor used or enter a new payment processor.

The request is sent to the token provider to authorize payment. The payment processor may charge the user's account and return "Approved" or "Declined" to the token provider. The digital payment service may notify the user (e.g., if payment was declined). But the token provider never receives personal or financial information or credit card information of the user.

If the payment is approved, then the token provider may build a token for the user to deliver to the token handler at the laundry machine. In an example, the token may include a location code, duration or activation code, security code (FIG. 19), and optionally an advertisement or other information for the user to view. For example, the token provider may select transaction index (e.g., index location 0009) from the index column 2010 and read a corresponding transaction code (e.g., hex 7806 representing decimal 30726) from the code column 200, as illustrated by the numbers 2030 in FIG. 20. It is noted that any suitable system (e.g., alpha-numeric) may be used, and is not limited to a numbering system.

In this example, the numbers are in hexadecimal and added (e.g., as packet 2040) to the token 2050. The table 2000a may be updated as illustrated by arrow 2060 and shown as updated table 2000b, wherein the code at index location 0009 is set to "0". The token 2050 may then be issued to the customer as illustrated by block 2060.

The user may then relay the token 2110 including the hexadecimal 2120 to the token handler, as illustrated in FIG. 21. The token handler receives the token, and validates the transaction code in the token (FIG. 21), for example by reading the token packet 2120 and comparing the index and hex code 2130 with the corresponding index location 0009 of the device index. If the device code at index location 0009 in table 2100a matches the transaction code in the token

2110, the token handler may negotiate or process the transaction 2140 by executing a device command (e.g., activate the laundry machine).

The token handler may also update/modify the table 2100a, as illustrated by arrow 2150, to indicate that the code has been used (e.g., by setting the code in index 9 to all 0's) as shown by updated table 2100b in FIG. 21. As such, the index location 9 cannot be re-used, thereby preventing fraudulent use.

In this example, a small 128K file contains 65,536 unique codes. For a laundry machine being used on average 20 times a day, the original codes are predicted to last about 9½ years. For a busy location being accessed 100 times a day, the original codes are predicted to last about 2 years. In the event that the codes need to be changed or updated, a secure update procedure may be implemented to refresh the codes in the field.

It should be understood that the systems and techniques described above may be modified within the scope of the disclosure herein, and are not limited to any particular implementation. For example, the example code and indexing illustrated in the figures is illustrative and not limiting.

Figure 22:
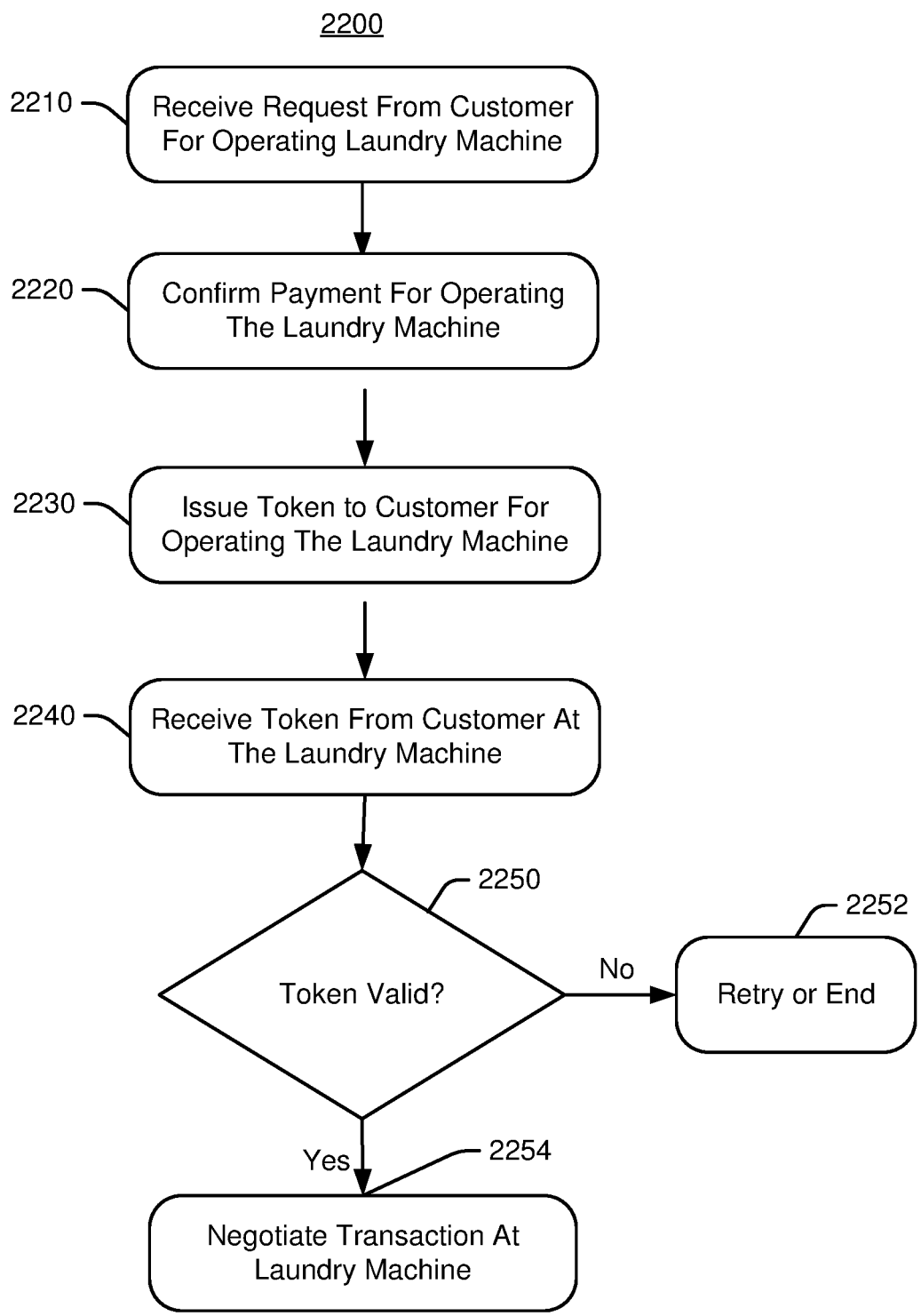
FIG. 22 is a flow chart illustrating example operations which may implement a secure payment method at a laundry machine.

FIG. 22 is a flow chart illustrating example operations 2200 which may implement a digital payment method. In example operation 2210, a request for a transaction at a laundry machine may be received from a customer by a token provider. The token provider confirms payment for the transaction in operation 2220, and then issues a token to the customer in operation 2230. In an example, the token has a transaction index and a corresponding transaction code.

In operation 2240, the token is received from the customer. For example, the token may be received from the customer's mobile device via a BLUETOOTH™ or other near-field communication protocol with the token handler at the laundry machine. In operation 2250, the token handler at the laundry machine confirms validity of the token, e.g., based on the transaction index and the transaction code. If the token is not valid, operations may end with operation 2252. In another example, the token handler may issue feedback to the user (e.g., to retry by sending a different token). If the token is valid, the token handler may negotiate the transaction at the laundry machine in operation 2254. In an example, the token handler may start, set (or add) an operating time for the customer to use the laundry machine.

Figure 23:
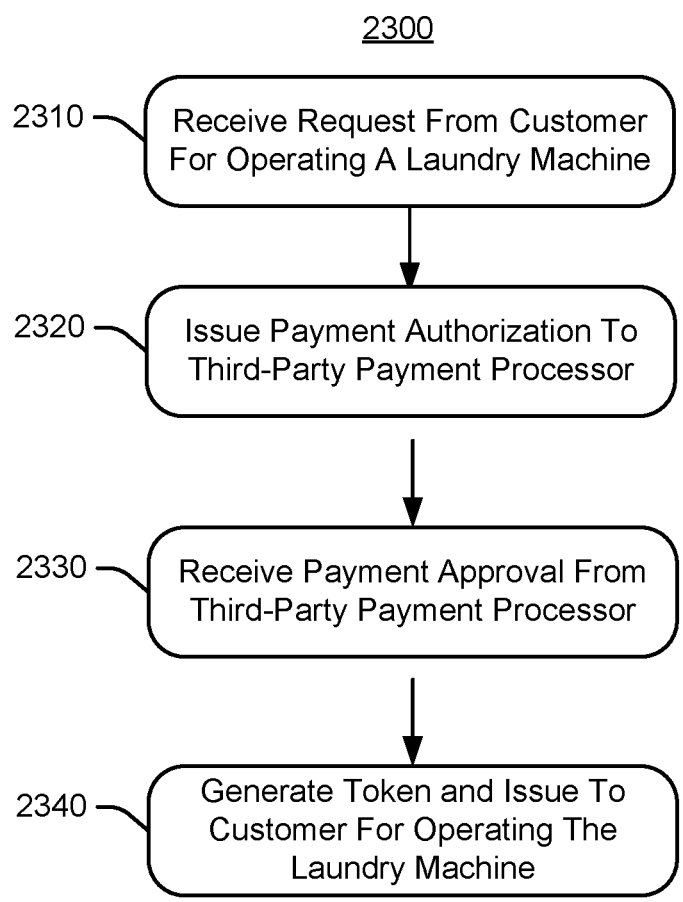
FIG. 23 is a flow chart illustrating example operations of a token provider to implement a secure payment method at a laundry machine.

FIG. 23 is a flow chart illustrating example operations 2300 of a token provider to implement a digital payment method. In operation 2310, the token provider may receive a request for a transaction at a laundry machine from a customer. In an example, the request may include information about the laundry machine (e.g., identifying information). In operation 2320, the token provider issues a payment authorization to a third-party payment processor. It is noted that the token provider does not actually receive any payment or other personal or confidential payment information from the customer. This information remains confidential as between the customer and the third party payment processor (e.g., the customer's bank or credit card processor). In operation 2330, the token provider receives payment approval from the third-party payment processor.

In operation 2340, the token provider generates a token and issues the token to the customer so that the customer can complete the transaction at the laundry machine. In an example, the token includes a hex value representing the transaction code and the transaction index.

Figure 24:
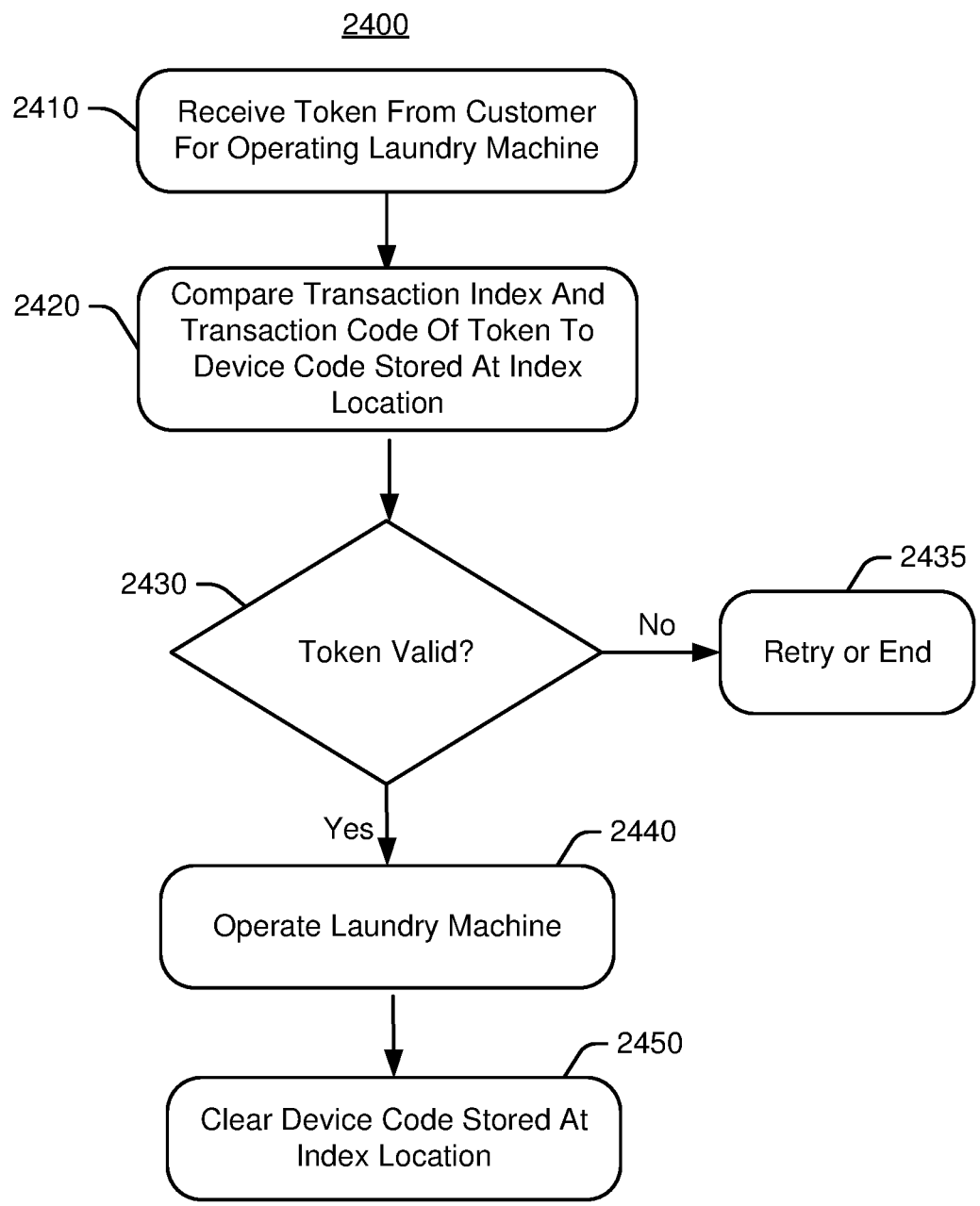
FIG. 24 is a flow chart illustrating example operations to implement a secure payment method at a laundry machine.

FIG. 24 is a flow chart illustrating example operations 2400 of a token handler to implement a digital payment method. In operation 2410, the token handler at a laundry machine receives a token from the customer (e.g., the token issued to the customer by the token provider in operation 2340). The token handler may receive the token from the customer's mobile device via a BLUETOOTH™ or other near-field communication protocol. In an example, the token includes a hex value representing the transaction code and the transaction index.

In operation 2420, the token handler compares the transaction index and transaction code of the token to a device code stored at corresponding index location at the token handler. For example, the token handler may translate the hex value to determine the transaction code and the transaction index, and then compare these to the corresponding device code stored at the associated index location at the token handler.

In operation 2430, the token handler determines whether the token is valid. If the token is not valid, operations at the token handler may end with operation 2435. In another example, the token handler may issue feedback to the user (e.g., to retry by sending a different token).

If the token is valid, the token handler may negotiate the transaction at operation 2440. In an example, the token handler may activate, set (or add) a time duration for the customer to use the laundry machine.

In operation 2450, the token handler clears the device code stored at the index location so that the token cannot be reused.

The example operations are illustrative and not intended to be limiting. The ordering of operations is not limited to the ordering shown in the drawings. Still other operations are also contemplated, as will become readily apparent to those having ordinary skill in the art after becoming familiar with the teachings herein.

It is noted that the examples shown and described herein are provided for purposes of illustration and are not intended to be limiting. Still other examples are also contemplated.

The invention claimed is:

1. A secure electronic payment method comprising:
    receiving, at a vendor processor configured as a computing device, a request from a mobile device of a user for a transaction at a point of sale device;
    issuing, by the vendor processor, an electronic token for the transaction to the mobile device, the electronic token encoding a transaction index and a transaction code;
    receiving, at the point of sale device, the electronic token from the mobile device via a local wireless communications protocol separate from a communications network established between the mobile device and the vendor processor;
    confirming by the vendor processor with a third party payment processor having no communication with the point of sale device, a payment for the transaction identified by the request, by:
        reading the transaction index in the electronic token and locating a corresponding index location in a device index stored in memory at the point of sale device;
        comparing the transaction code in the electronic token to a stored transaction code at the corresponding index location in the device index at the point of sale device;
        confirming validity of the electronic token at the point of sale device if the stored transaction code at the corresponding index location matches the transaction code in the electronic token;

wherein confirming validity is by processing a first command, the first command having at least a command code component, a component with parameters for the command, a validating token index component, and a validating token component; and negotiating the transaction in response to a second command after confirming payment for the transaction at the point of sale device, wherein negotiating the transaction according to the second command is by at least one of closing an electrical contact or changing time on a timer.

2. The method of claim 1, further comprising clearing the index location, by the point of sale device, after negotiating the transaction so that the electronic token cannot be reused.

3. The method of claim 1, further comprising, storing, by a secure field procedure, a new transaction code at the index location at the point of sale device.

4. The method of claim 1, wherein the transaction code in the token is a hex value, and the transaction code in the point of sale device is a hex value, wherein the hex values must match to validate the token by the point of sale device.

5. The method of claim 1, wherein negotiating the transaction comprises at least actuating mechanics of the point of sale device to dispense a purchased product from a vending machine.

6. The method of claim 1, wherein negotiating the transaction comprises at least starting a timer for a parking meter device.

7. The method of claim 1, wherein negotiating the transaction comprises at least actuating an electric motor at the point of sale device.

8. The method of claim 1, wherein negotiating the transaction comprises at least actuating a laundry machine by the point of sale device.

9. A secure electronic payment method for a parking meter, comprising:
receiving a request for a transaction from a mobile device of a customer, the request received at a vendor processor configured as a computing device;
confirming, between the vendor processor and a third party payment processor, a payment for the transaction identified by the request, wherein confirming the payment comprises the vendor processor sending the payment authorization to the third party payment processor, and receiving a payment approval from the third party payment processor;
issuing, by the vendor processor, an electronic token to the mobile device of the customer for the transaction, the electronic token encoding a transaction index and a transaction code to be independently verified at the parking meter;
receiving the electronic token from the mobile device at the parking meter via a local wireless communications protocol that is separate from a communications network established between the mobile device and the vendor processor;
reading by a token processing module at the parking meter, the transaction index in the electronic token and locating a corresponding index location in a device index stored in memory at the parking meter;
comparing the transaction code in the electronic token to a stored transaction code at the corresponding index location in the device index at the parking meter;
confirming validity of the electronic token at the parking meter if the stored transaction code at the corresponding index location matches the transaction code in the electronic token;

wherein confirming validity is by processing a first command, the first command having at least a command code component, a component with parameters for the command, a validating token index component, and a validating token component; and negotiating the transaction for the customer by changing a time on the parking meter according to a second command specifying the time to change.

10. A secure electronic payment system comprising:
a vending machine comprising a first computer processor;
a vendor computer comprising a second computer processor;
wherein the second computer processor is configured to receive a request from a mobile device of a user for a transaction at the vending machine;
wherein the second computer processor is further configured to confirm a payment for the transaction identified by the request with a third party payment processor having no communication with the vending machine;
wherein the second computer processor is further configured to issue an electronic token to the mobile device for the transaction, wherein the electronic token encodes a transaction index and a transaction code;
wherein the first computer processor is configured to receive the electronic token from the mobile device via a local wireless communications protocol separate from a communications network established between the mobile device and the vendor computer;
wherein the first computer processor is configured to confirm payment for the transaction at the vending machine and negotiate the transaction at the vending machine device, without the first computer processor contacting the third party payment processor, by:
reading the transaction index in the electronic token and locating a corresponding index location in a device index stored in memory at the vending machine device;
comparing the transaction code in the electronic token to a stored transaction code at the corresponding index location in the device index at the vending machine device;
confirming validity of the electronic token at the vending machine device if the stored transaction code at the corresponding index location matches the transaction code in the electronic token;
wherein confirming validity is by processing a first command having at least a command code component, a component with parameters for the command, a validating token index component, and a validating token component; and
wherein negotiating the transaction is by processing at least a second command.

11. The system of claim 10, wherein the first computer processor is configured to clear the index location after negotiating the transaction so that the electronic token cannot be reused.

12. The system of claim 10, wherein the first computer processor is further configured to store a new transaction code at the index location during a secure update procedure.

13. The system of claim 10, wherein the transaction code in the token is a hex value, and the transaction code in the vending machine is a hex value, wherein the hex values must match to validate the token by the first computer processor.

14. The system of claim 10, wherein processing the second command causes a purchased product to be dispensed from the vending machine.

15. The system of claim 10, wherein processing the second command causes an electric motor to be actuated.

16. The system of claim 10, further comprising the first computer processor returning a status command in response to processing the first command.

\* \* \* \* \*